US011891100B2

(12) United States Patent
Park

(10) Patent No.: US 11,891,100 B2
(45) Date of Patent: Feb. 6, 2024

(54) FOLDABLE LIGHTWEIGHT ROLL CONTAINER

(71) Applicants: GREEN PLUS CO., LTD., Yesan-gun (KR); Yeong Hwan Park, Pyeongtaek-si (KR)

(72) Inventor: Yeong Hwan Park, Pyeongtaek-si (KR)

(73) Assignees: GREEN PLUS CO., LTD., Yesan-Gun (KR); Yeong Hwan Park, Pyeongtaek-si (KR)

( * ) Notice: Subject to any disclaimer, the term of this patent is extended or adjusted under 35 U.S.C. 154(b) by 73 days.

(21) Appl. No.: 17/518,525

(22) Filed: Nov. 3, 2021

(65) Prior Publication Data

US 2023/0020451 A1    Jan. 19, 2023

(30) Foreign Application Priority Data

Jul. 2, 2021   (KR) ........................ 10-2021-0087040
Jul. 19, 2021  (KR) ........................ 10-2021-0094185

(51) Int. Cl.
    *B62B 3/02*    (2006.01)
(52) U.S. Cl.
    CPC .................................. *B62B 3/025* (2013.01)
(58) Field of Classification Search
    CPC ........... B62B 3/025; B62B 3/004; B62B 3/02; B62B 5/00
    See application file for complete search history.

(56) References Cited

U.S. PATENT DOCUMENTS

| 4,275,665 A * | 6/1981 | Silverman ............... B62B 3/005 |
| | | 108/189 |
| 8,839,743 B2 * | 9/2014 | Chandler ................ B60B 33/00 |
| | | 119/519 |

(Continued)

FOREIGN PATENT DOCUMENTS

| CN | 111923974 A | * | 11/2020 | |
| DE | 202012102052 U1 | * | 8/2012 | ............. B62B 3/002 |

(Continued)

*Primary Examiner* — Steve Clemmons
(74) *Attorney, Agent, or Firm* — STIP Law Group, LLC

(57) ABSTRACT

The present invention relates to a foldable lightweight roll container, and more particularly, to a foldable lightweight roll container which is lightweight, very easy for cleanliness and maintenance while preventing shortening of a lifetime, and may be used to carry goods in various fields such as medicines and foods in addition to various industrial products. The foldable lightweight roll container according to the present invention is configured to include including a loading frame 100 including a rear frame member 101, left and right frame members 102 and 102' coupled rotatably to left and right ends of the rear frame member 101, respectively, left and right door members 103 and 103' coupled rotatably to front ends of the left and right frame members, a bottom member 104 coupled to a lower end of an inner side of the rear frame member, a bottom support means 170 installed on each inner side of the left and right door members to support the bottom member, and door locking members 106 installed on the left and right door members, a left hinge member 200 installed to rotatably couple the left frame member to a left end of the rear frame member, a right hinge member 300 installed to rotatably couple the right frame member to a right end of the rear frame member, left and right door hinge members 400 installed to couple the left and right door members to front ends of the left and right frame members so as to be rotatable and ascend in a predetermined interval, (Continued)

left and right bottom hinge members 500 installed to couple the bottom member to a lower end of the front surface of the rear frame member so as to be rotatable up and down, and casters 600 coupled to left and right ends of the lower surface of the rear frame member and the front ends of the lower surfaces of the left and right frame members, respectively.

18 Claims, 54 Drawing Sheets

(56) References Cited

U.S. PATENT DOCUMENTS

| | | | | |
|---|---|---|---|---|
| 9,428,205 B2 * | 8/2016 | Jackson | ................. | B62B 3/004 |
| 10,960,910 B1 * | 3/2021 | Garcia | ...................... | B62B 3/02 |
| 11,498,599 B2 * | 11/2022 | Grönholm | ................. | B62B 3/02 |

FOREIGN PATENT DOCUMENTS

| | | | | | |
|---|---|---|---|---|---|
| EP | 2500495 A1 | * | 9/2012 | ............. | B62B 3/025 |
| EP | 2942262 A2 | * | 11/2015 | ............. | B62B 3/004 |
| GB | 1594394 A | * | 7/1981 | ............. | B62B 3/025 |
| GB | 2484549 A | * | 4/2012 | ............. | B62B 3/025 |
| JP | 2007099376 A | * | 4/2007 | ............. | B62B 3/025 |
| KR | 101168666 B1 | * | 7/2012 | ............. | Y02A 40/25 |
| KR | 101396518 B1 | * | 5/2014 | | |
| KR | 102051940 B1 | * | 12/2019 | | |
| KR | 102131045 B1 | * | 7/2020 | | |
| KR | 20210041926 A | * | 4/2021 | | |
| KR | 20210041934 A | * | 4/2021 | | |

* cited by examiner

[FIG. 1]
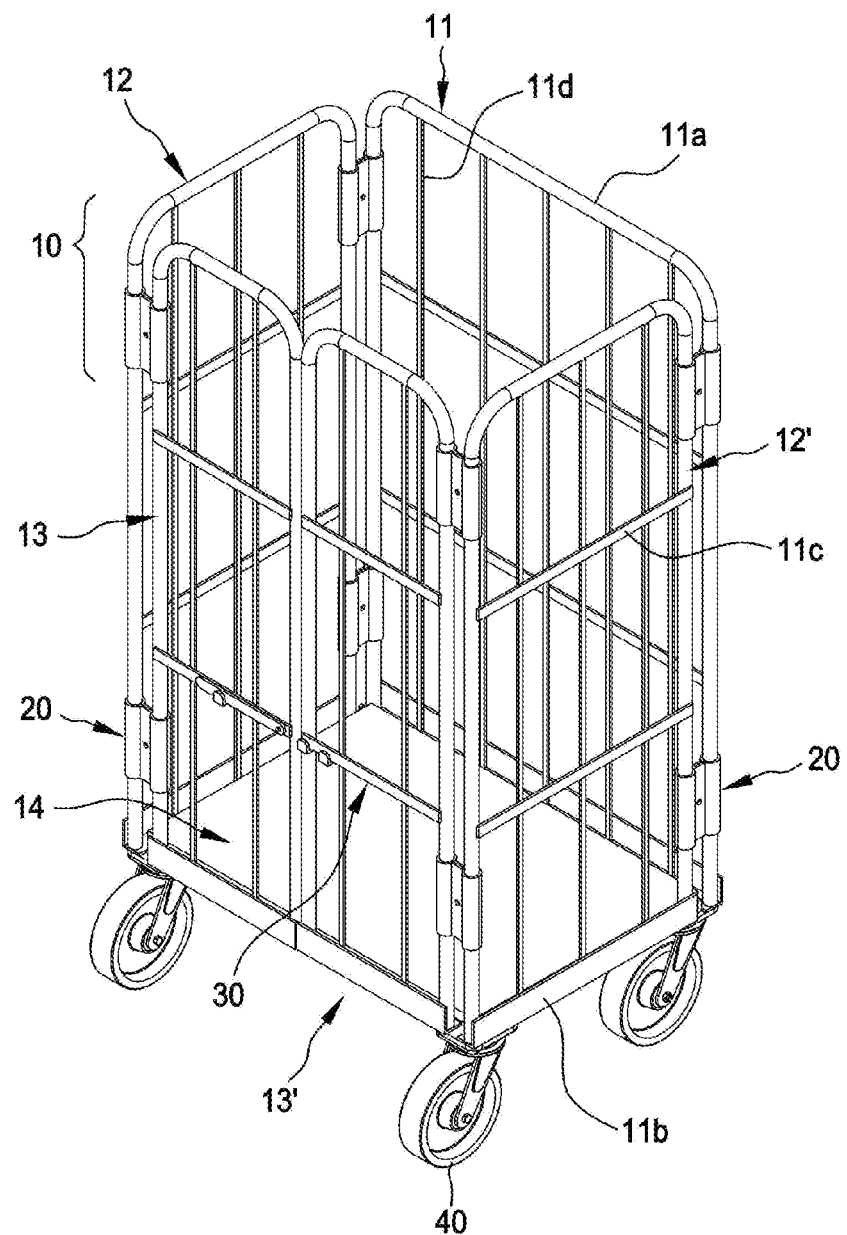

[FIG. 2]
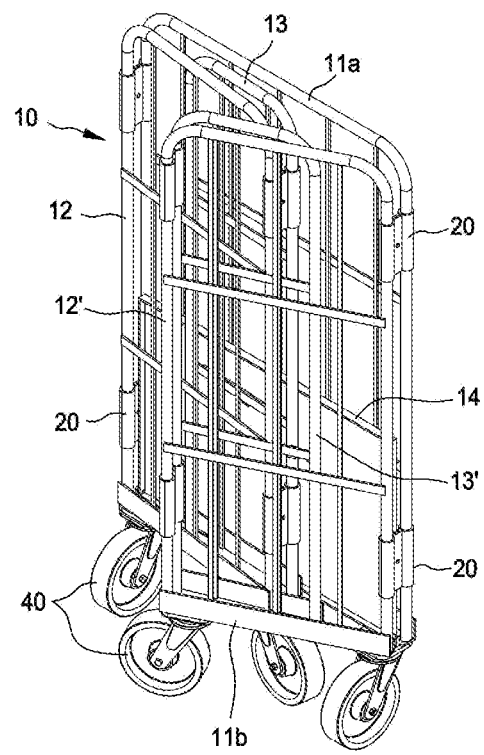
[FIG. 3]
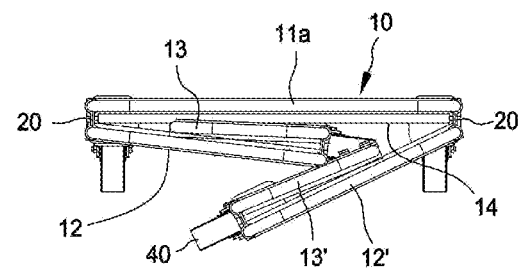

[FIG. 4a]
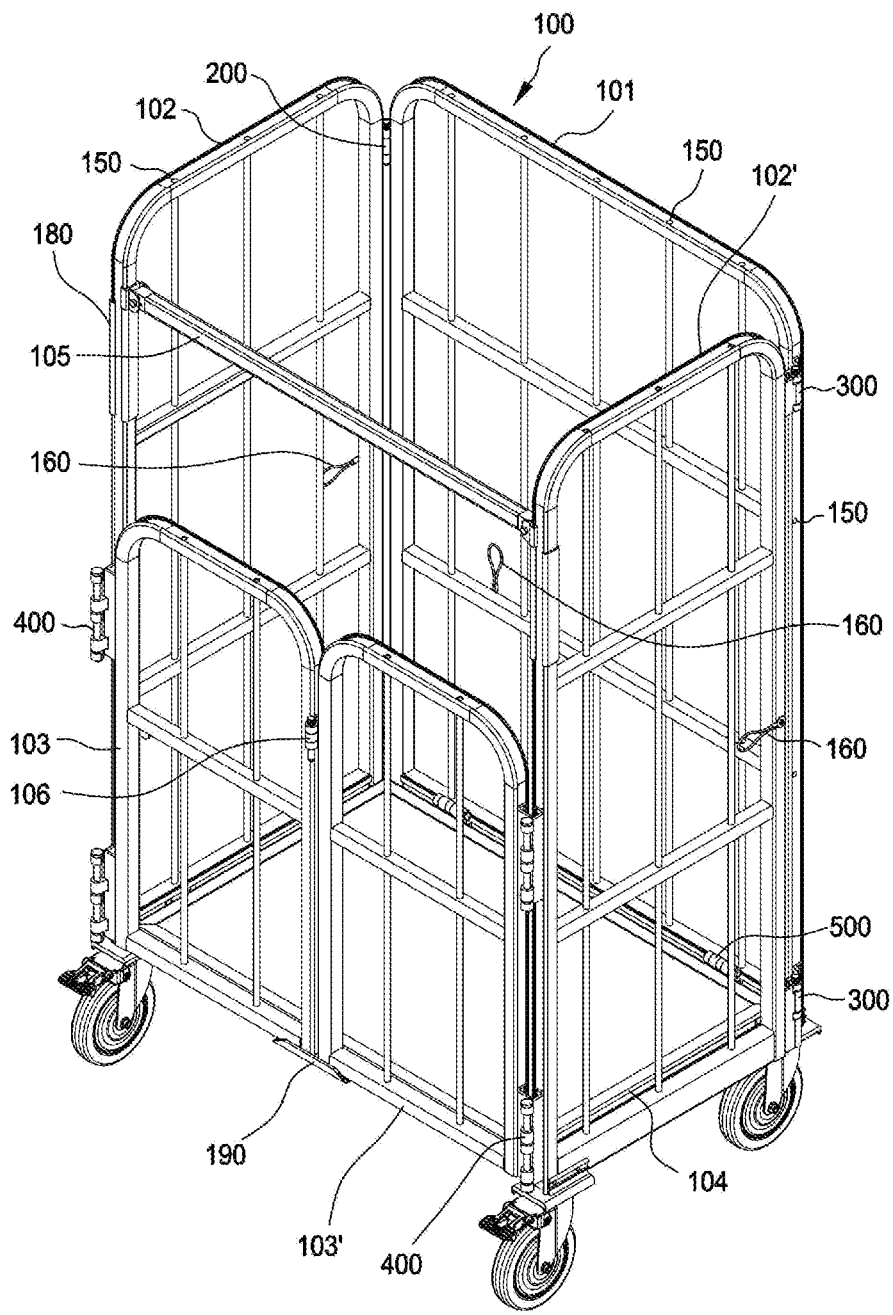

【FIG. 4b】
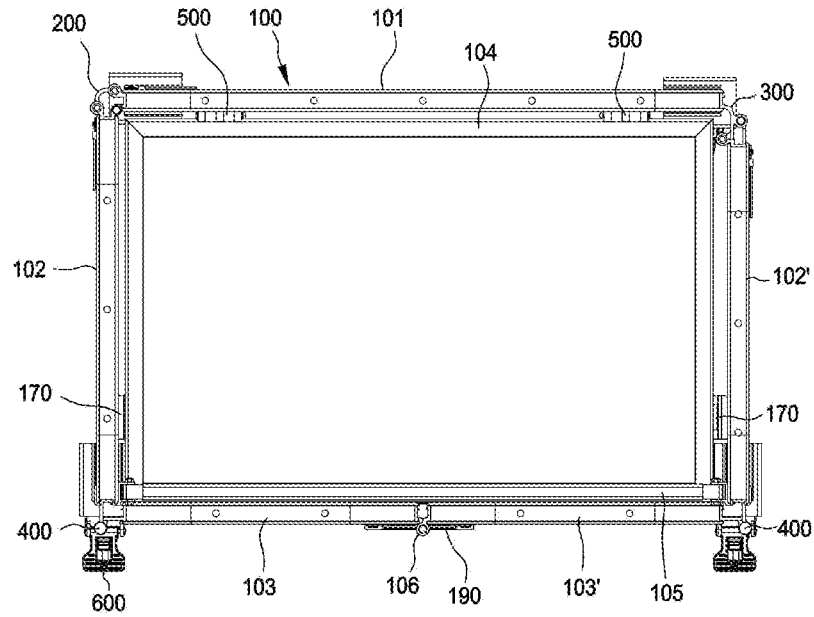
【FIG. 5】
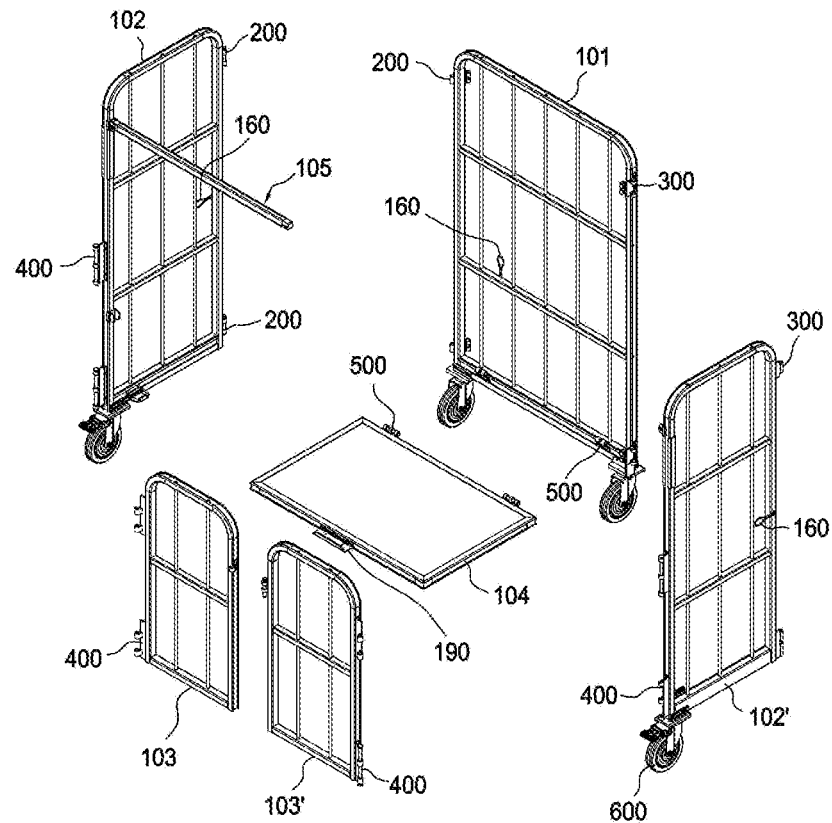

[FIG. 6]
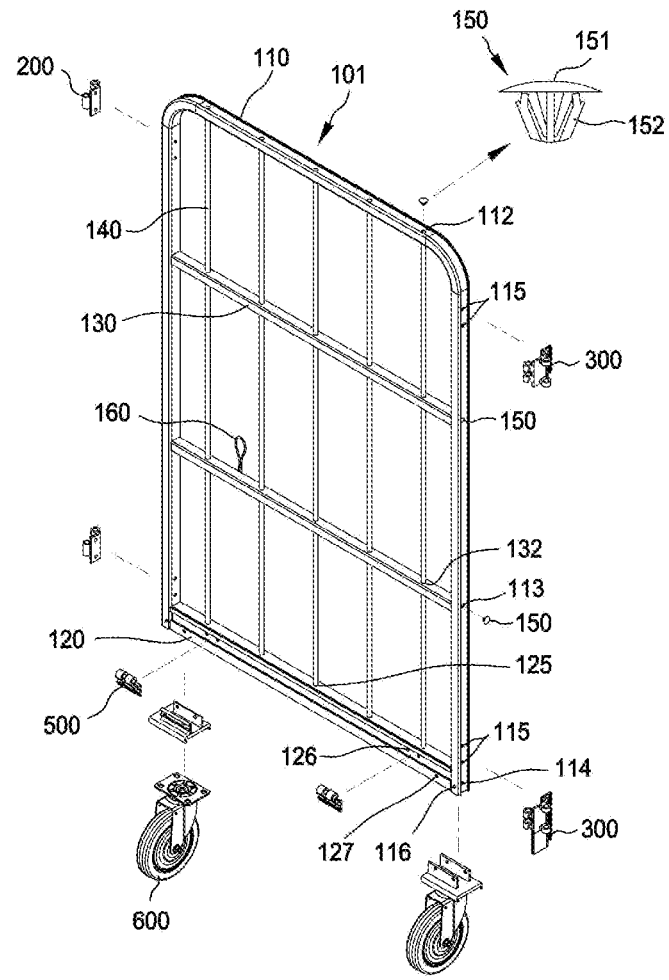
[FIG. 7]
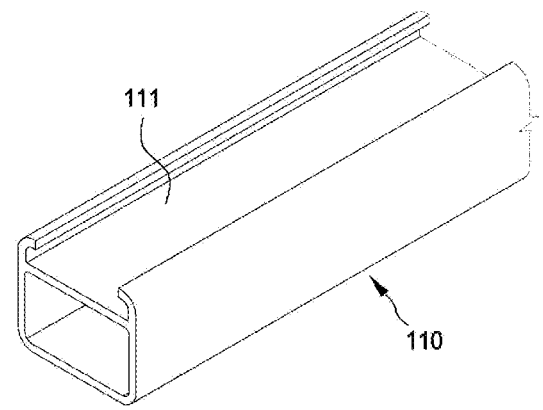

【FIG. 8a】
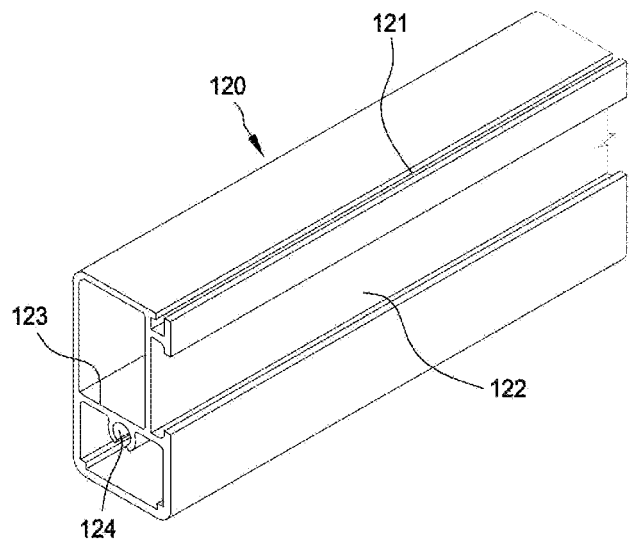
【FIG. 8b】
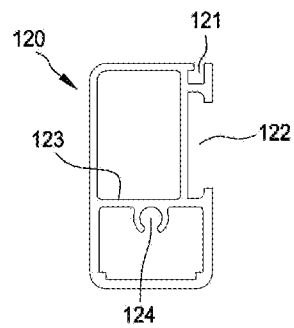
【FIG. 9a】
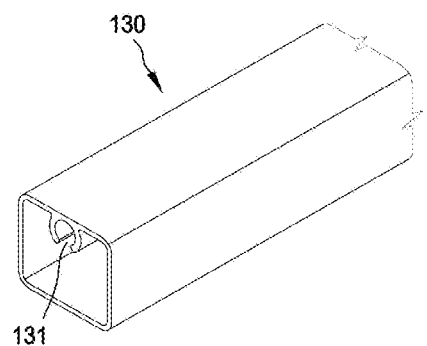

【FIG. 9b】
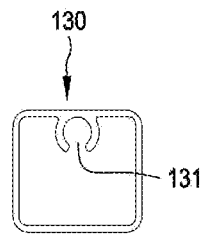
【FIG. 10a】
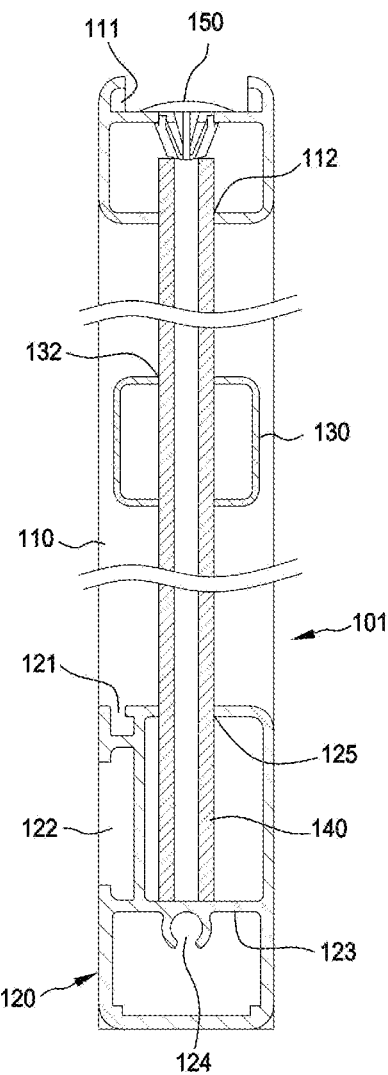

[FIG. 10b]
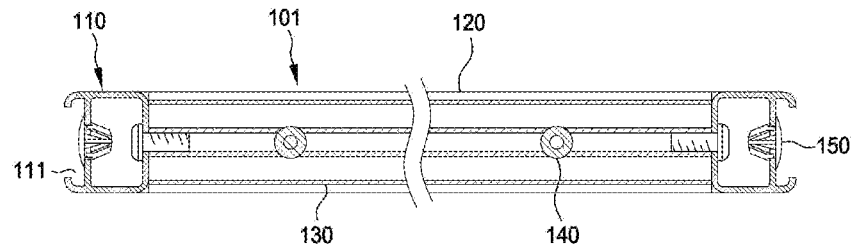
[FIG. 11a]
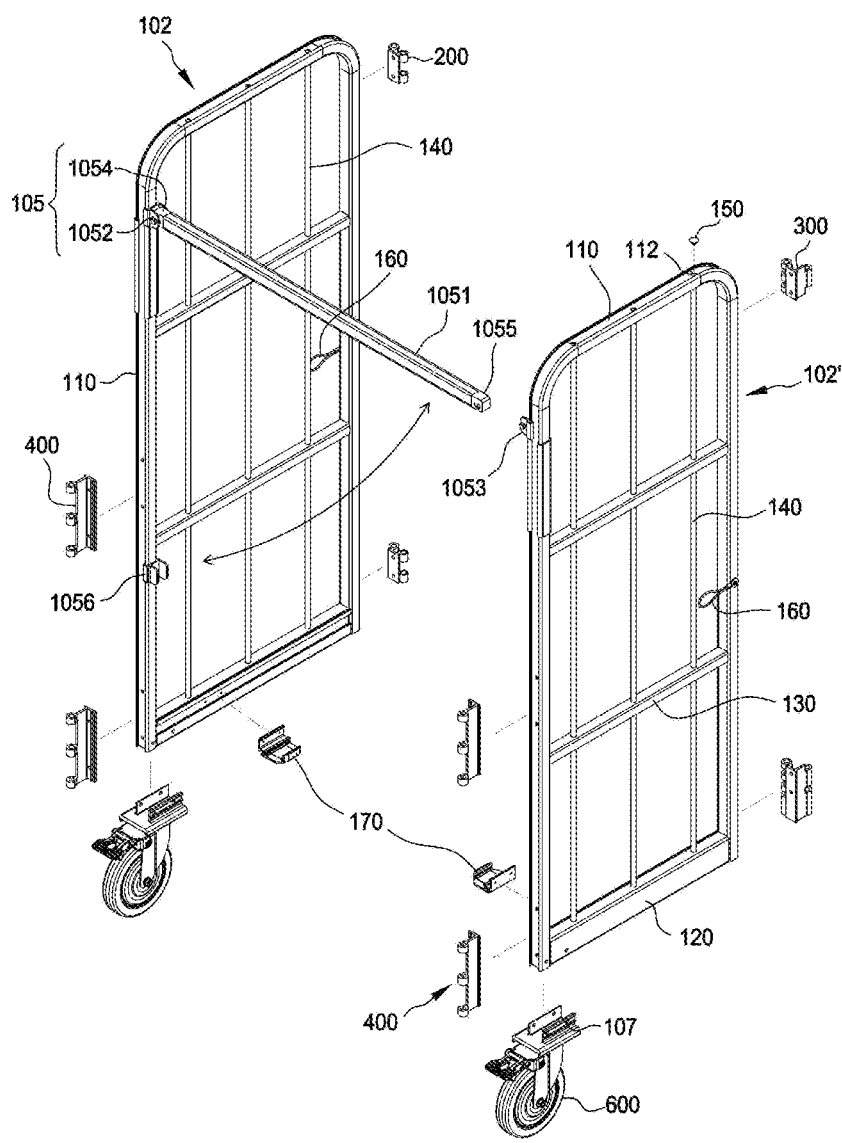

【FIG. 11b】
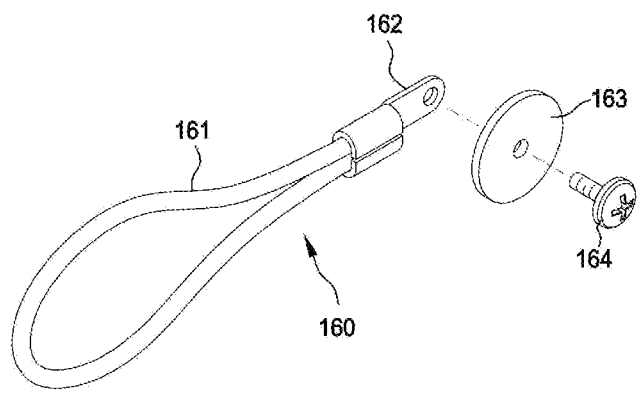
【FIG. 11c】
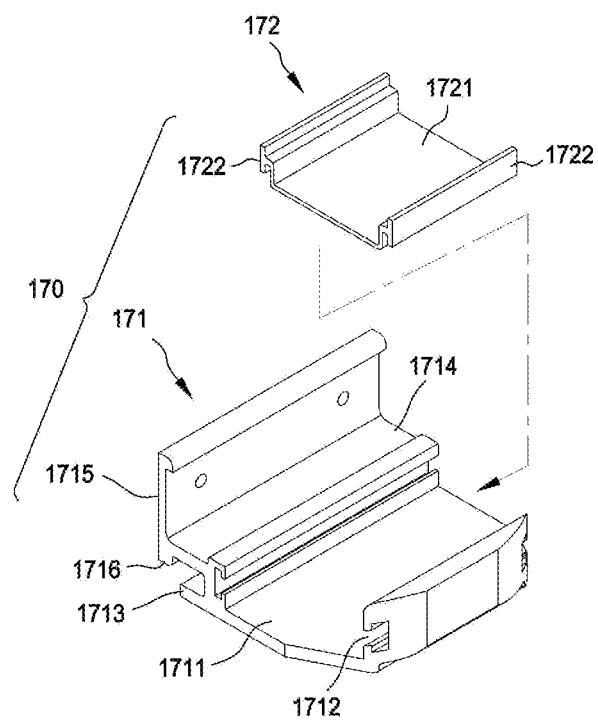

[FIG. 11d]
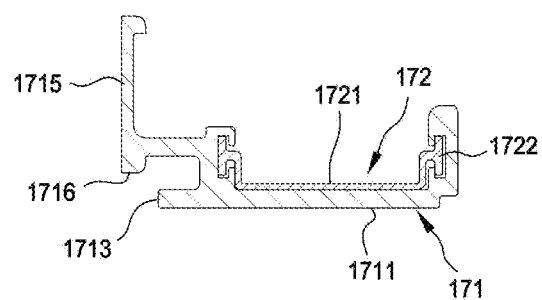
[FIG. 11e]
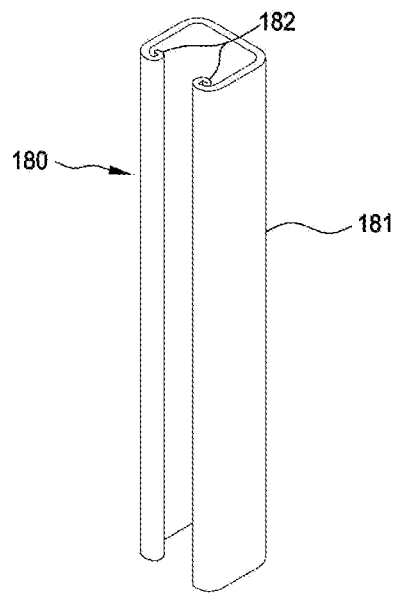

[FIG. 11f]
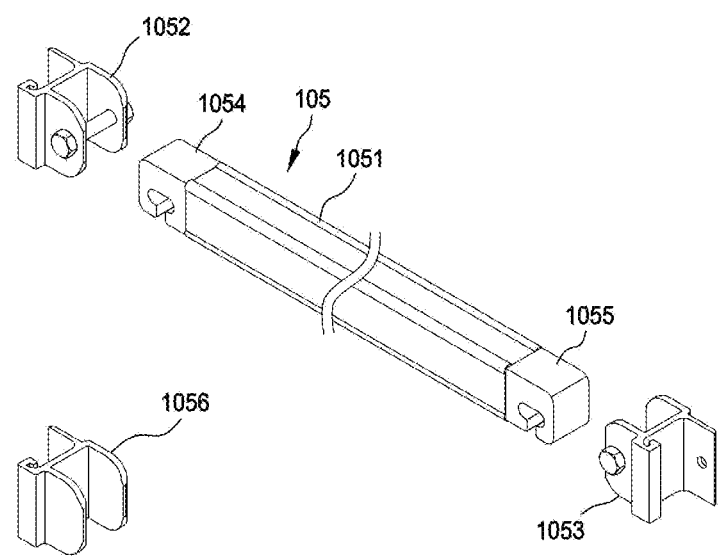

【FIG. 12a】
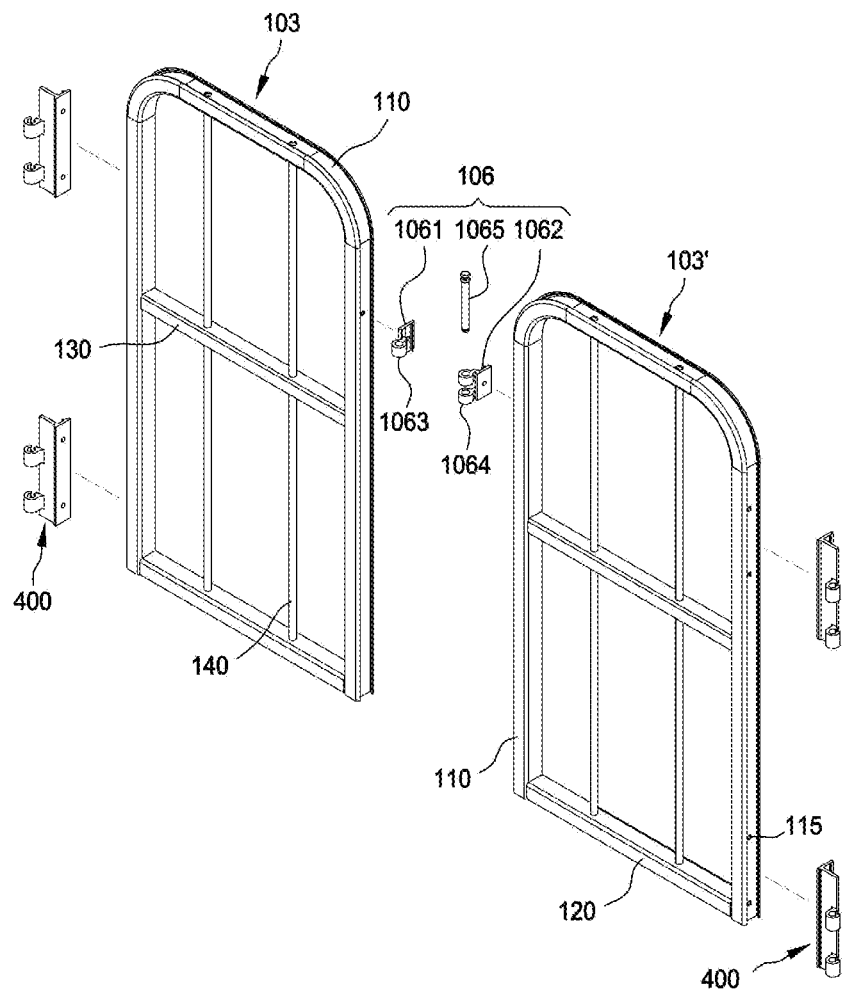
【FIG. 12b】
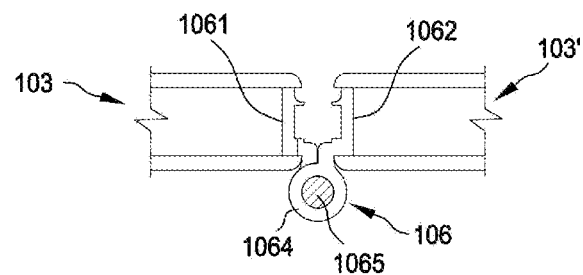

【FIG. 13a】
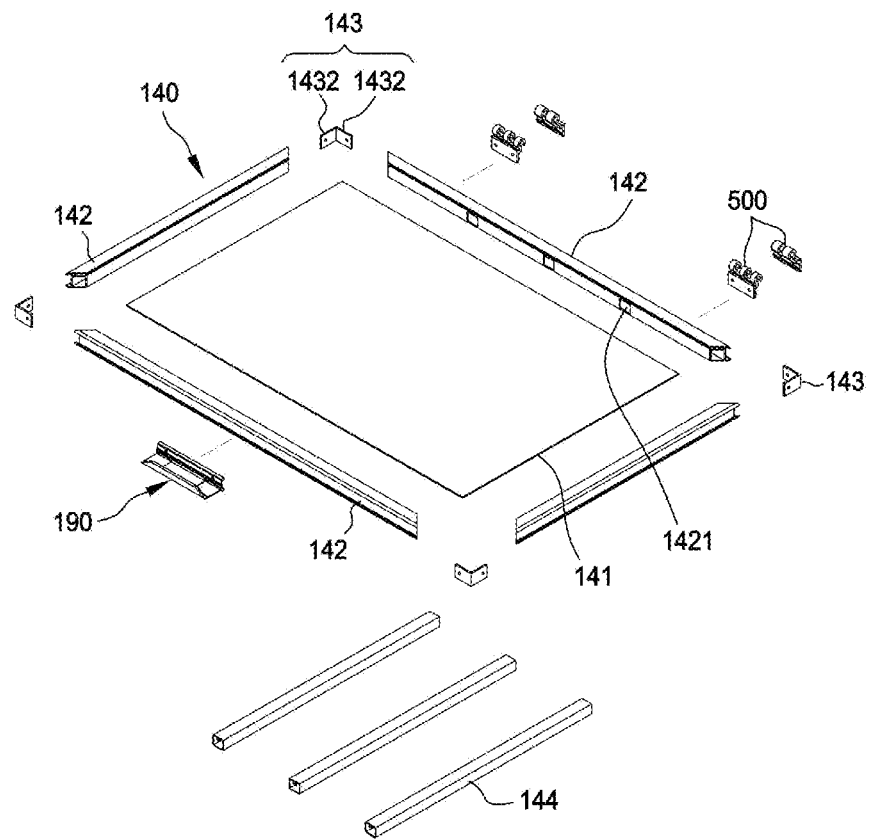
【FIG. 13b】
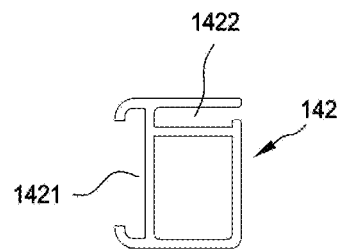

[FIG. 13c]
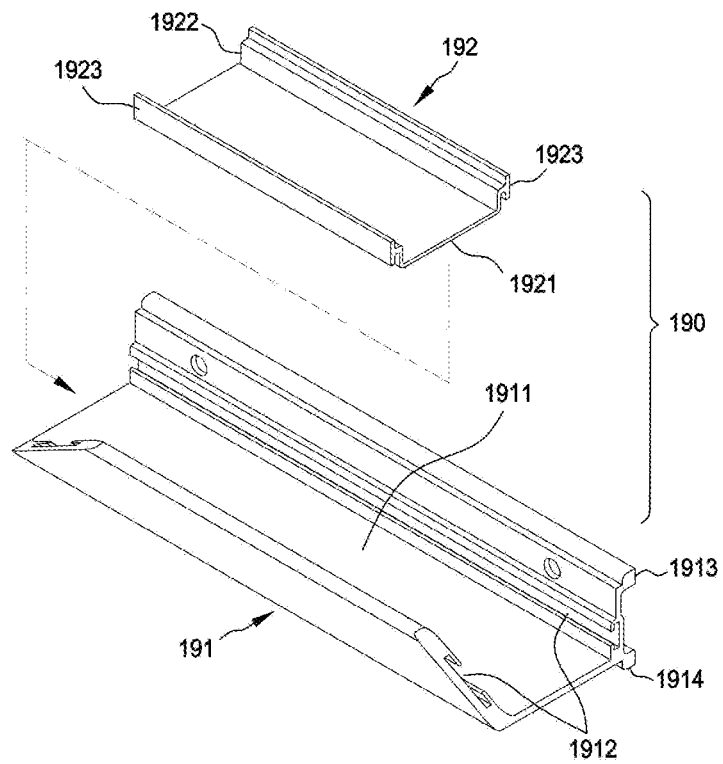
[FIG. 13d]
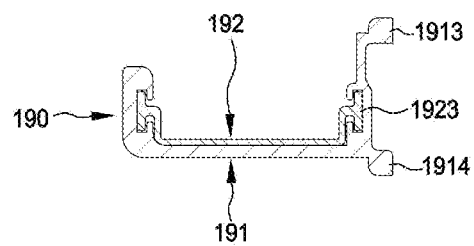
[FIG. 14a]
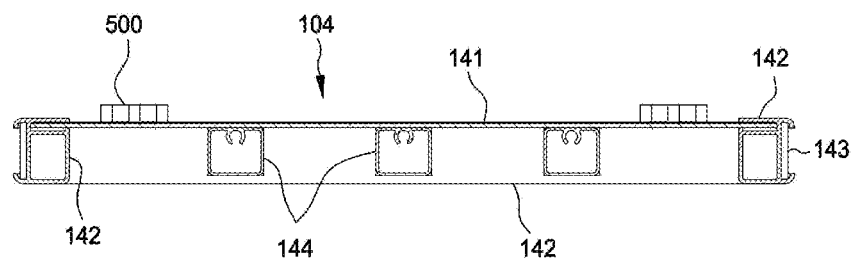

【FIG. 14b】
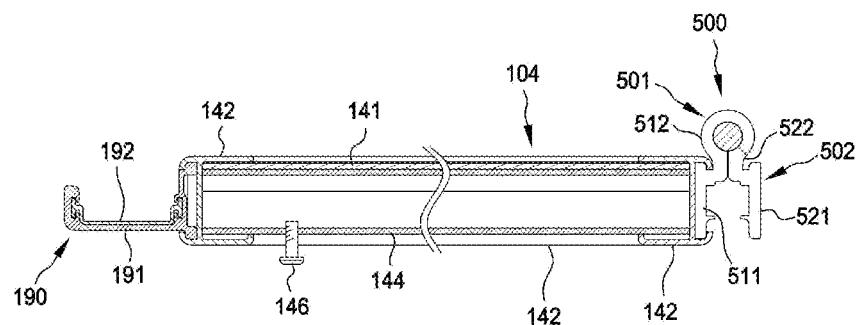
【FIG. 15】
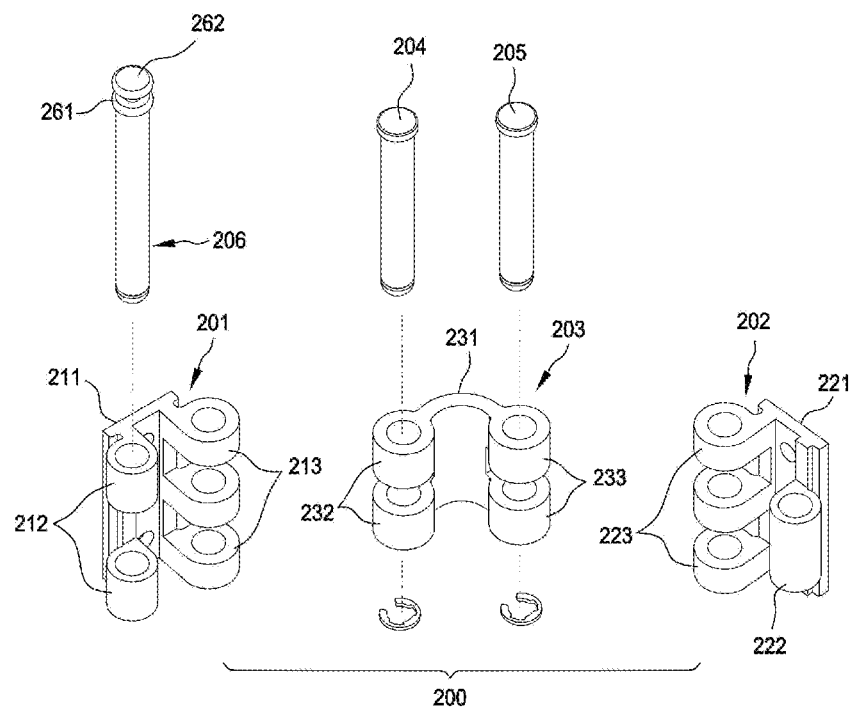

[FIG. 16]
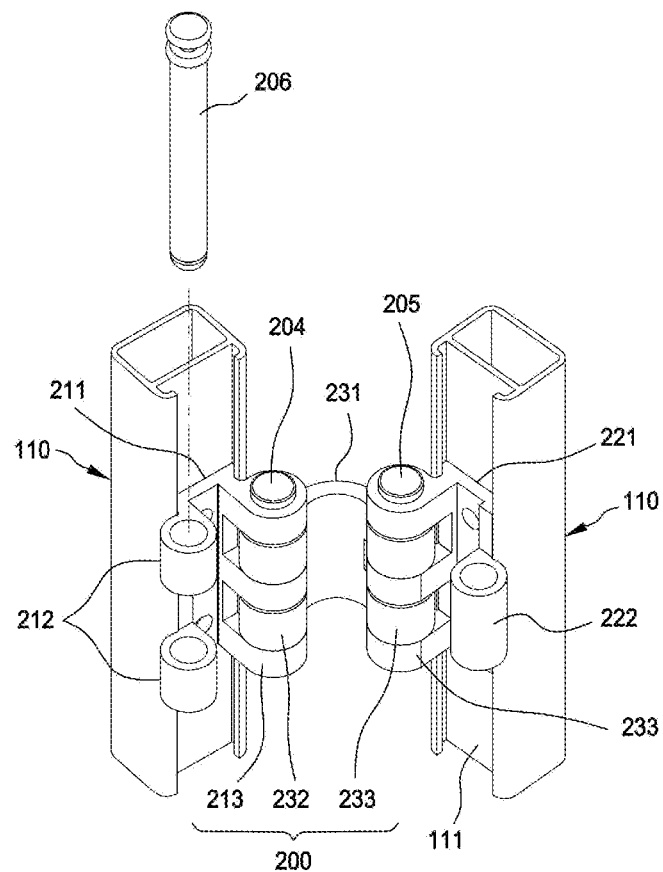

【FIG. 17a】
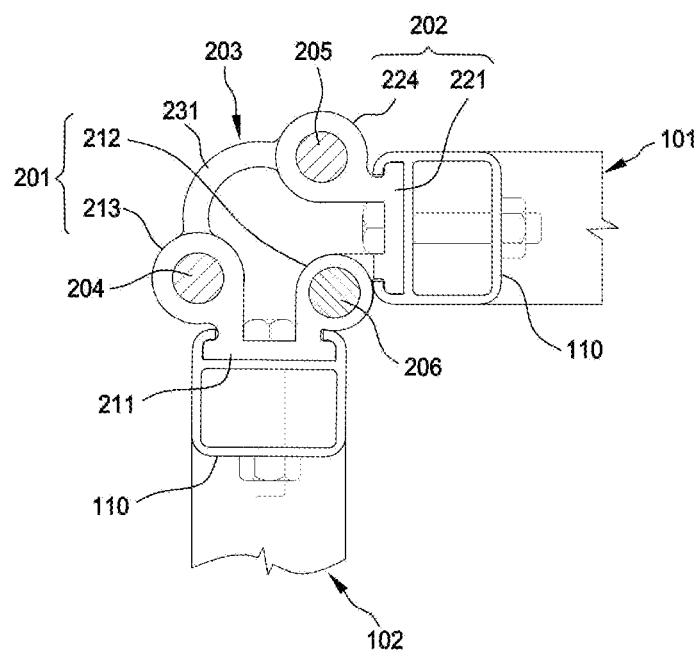
【FIG. 17b】
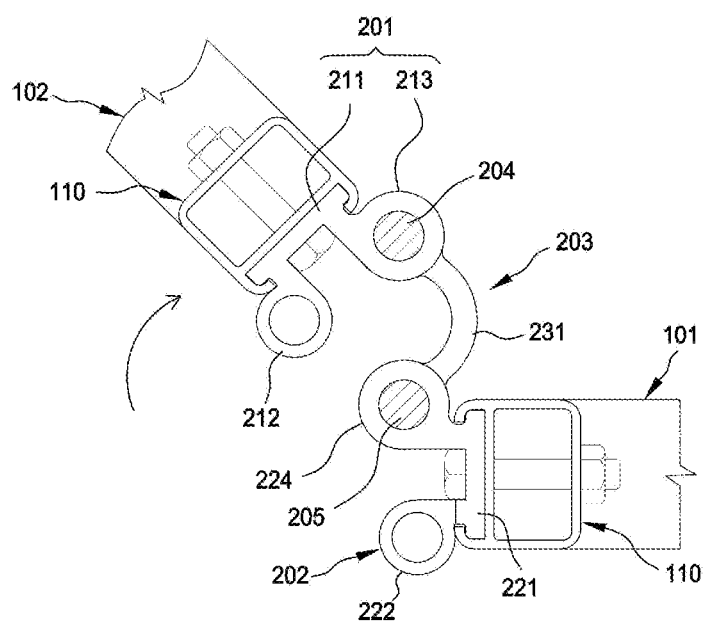

【FIG. 17c】
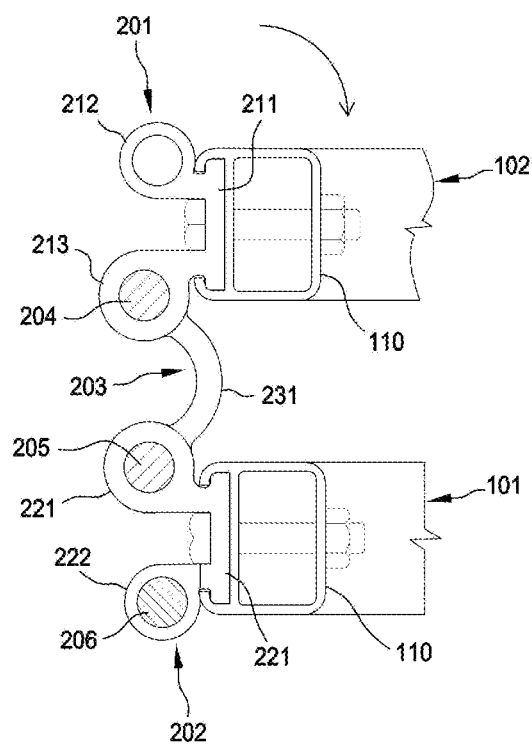

[FIG. 18]
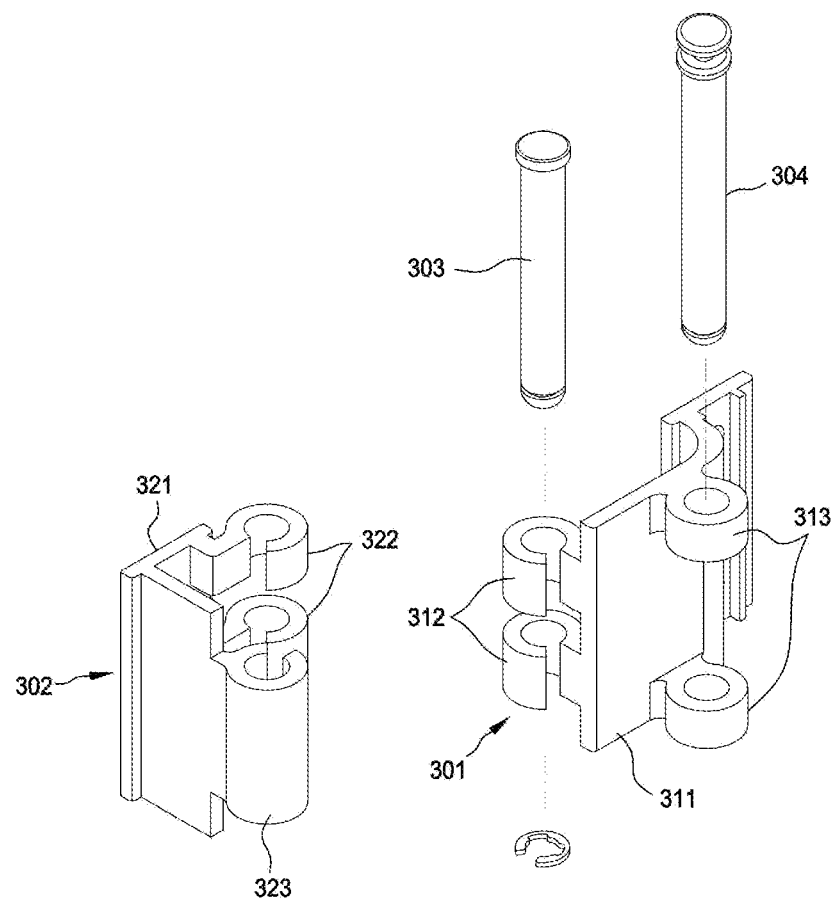

【FIG. 19】
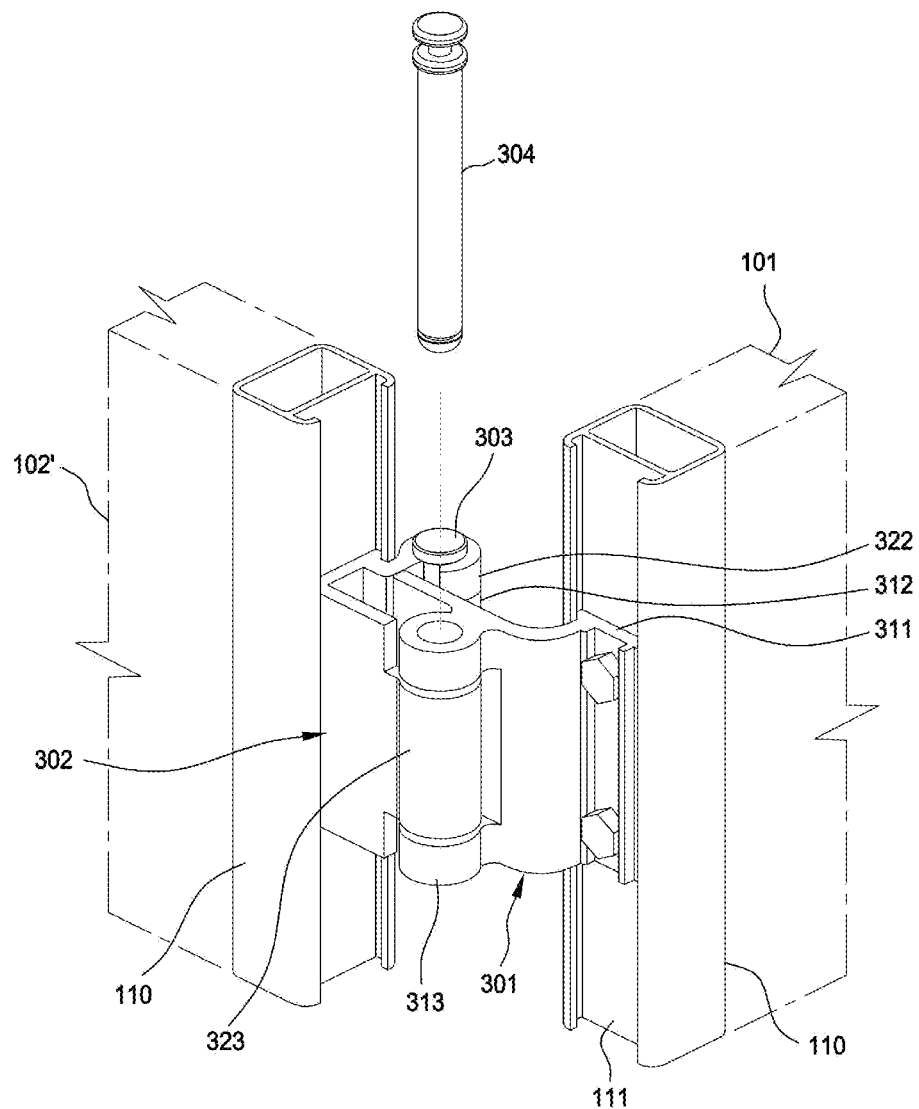

[FIG. 20a]
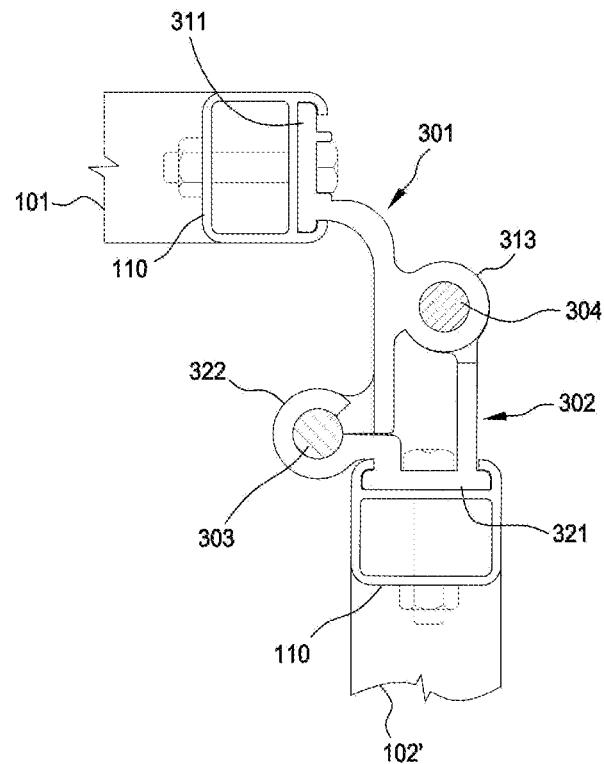
[FIG. 20b]
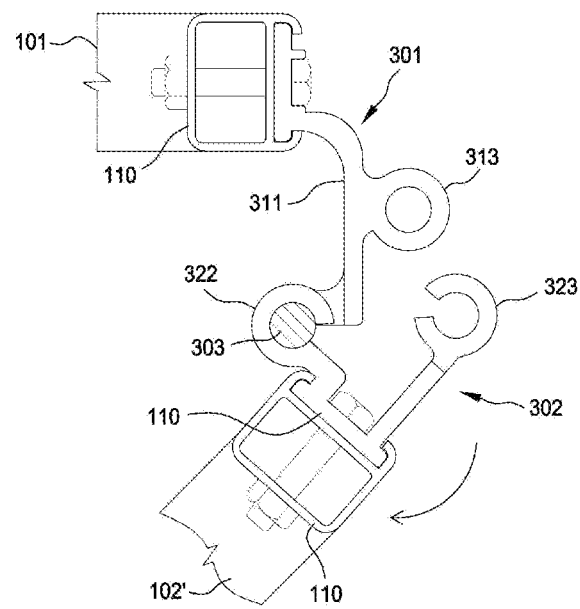

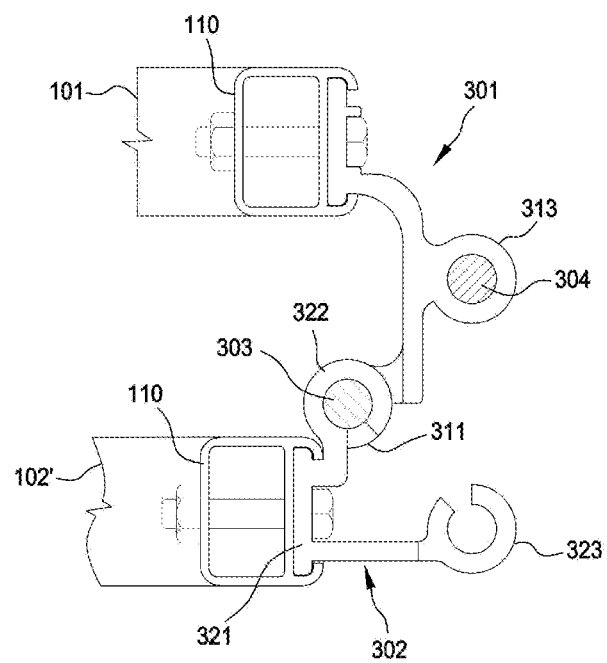
[FIG. 20c]

[FIG. 21]
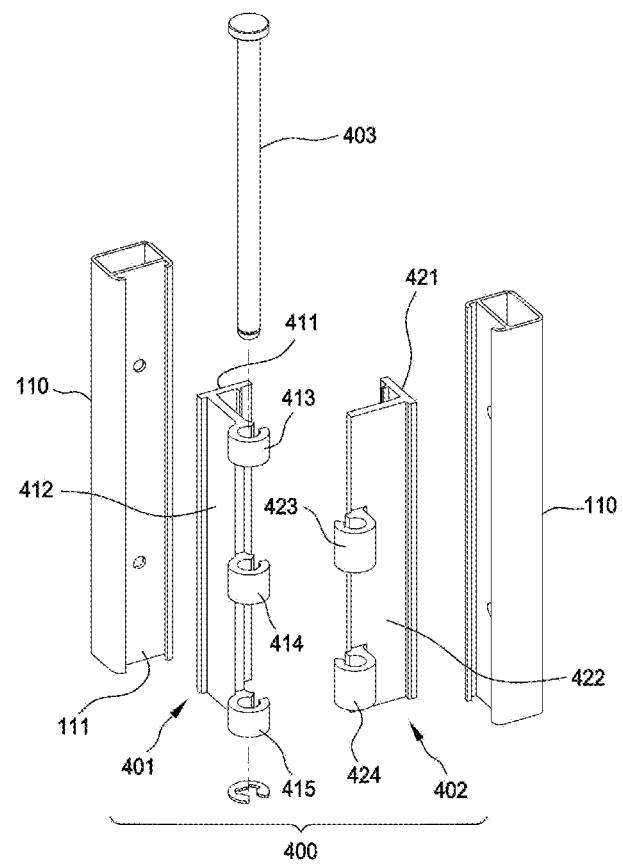

[FIG. 22]
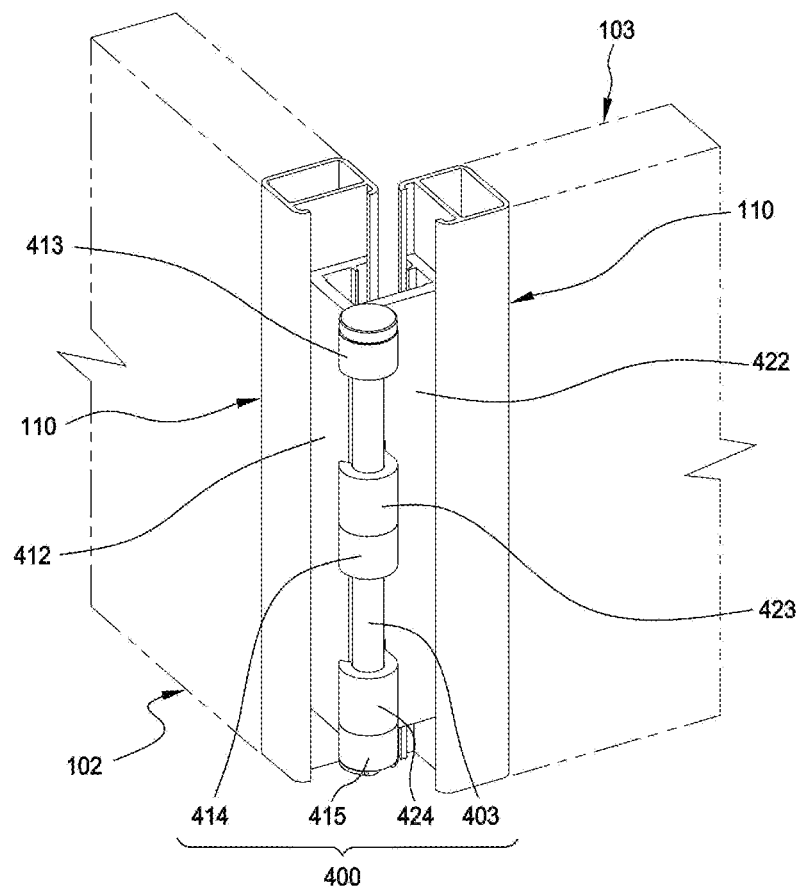

[FIG. 23a]
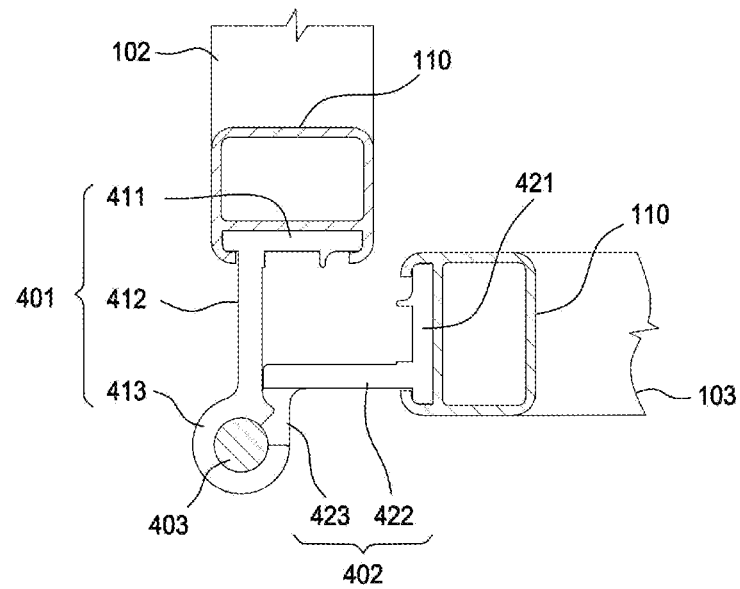
[FIG. 23b]
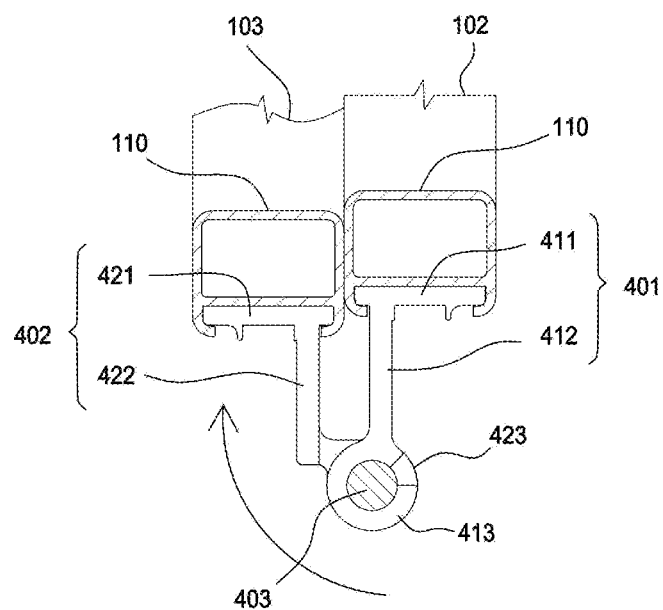

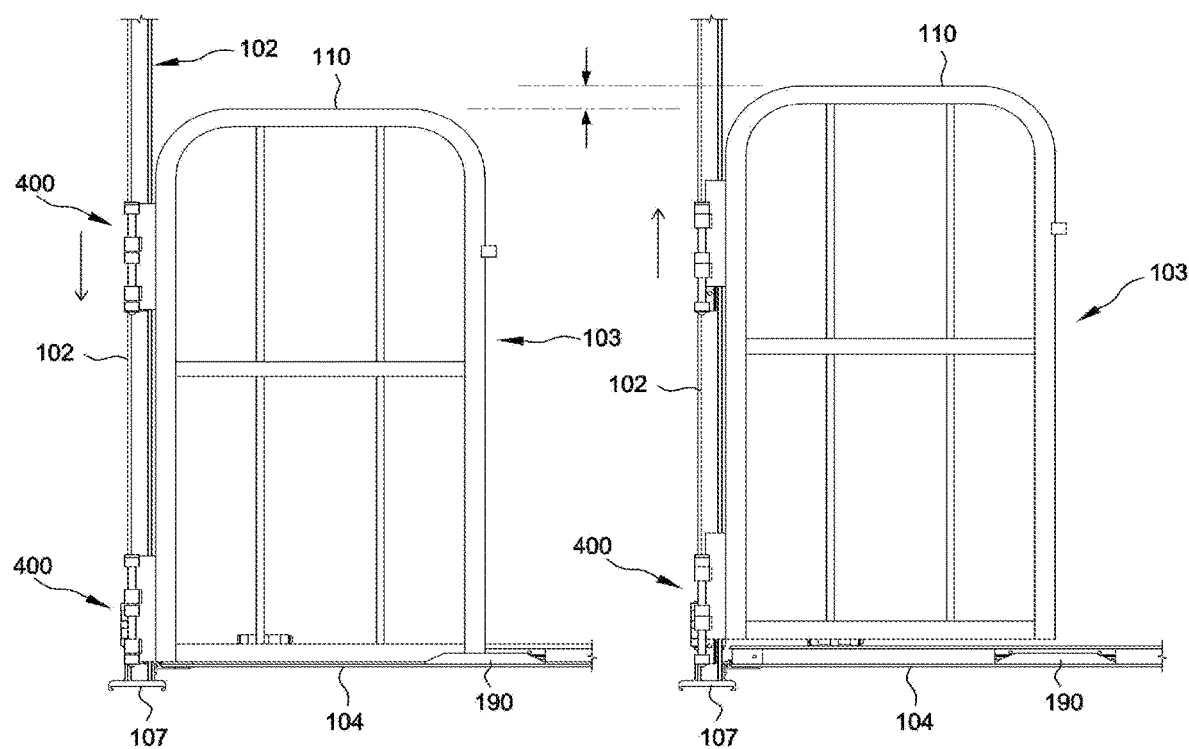
[FIG. 24]

[FIG. 25]
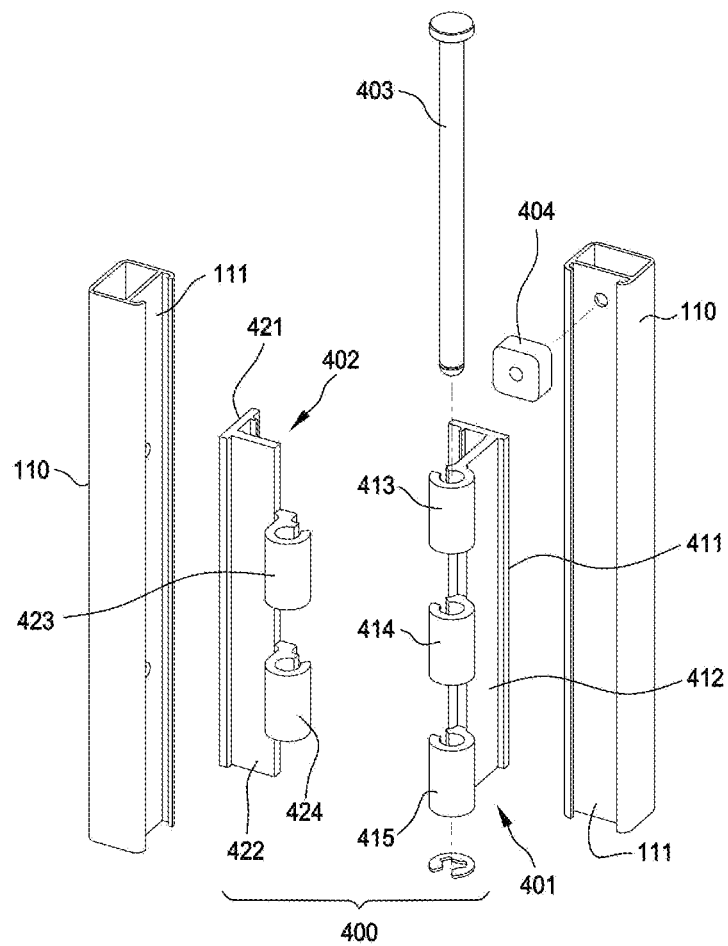

[FIG. 26]
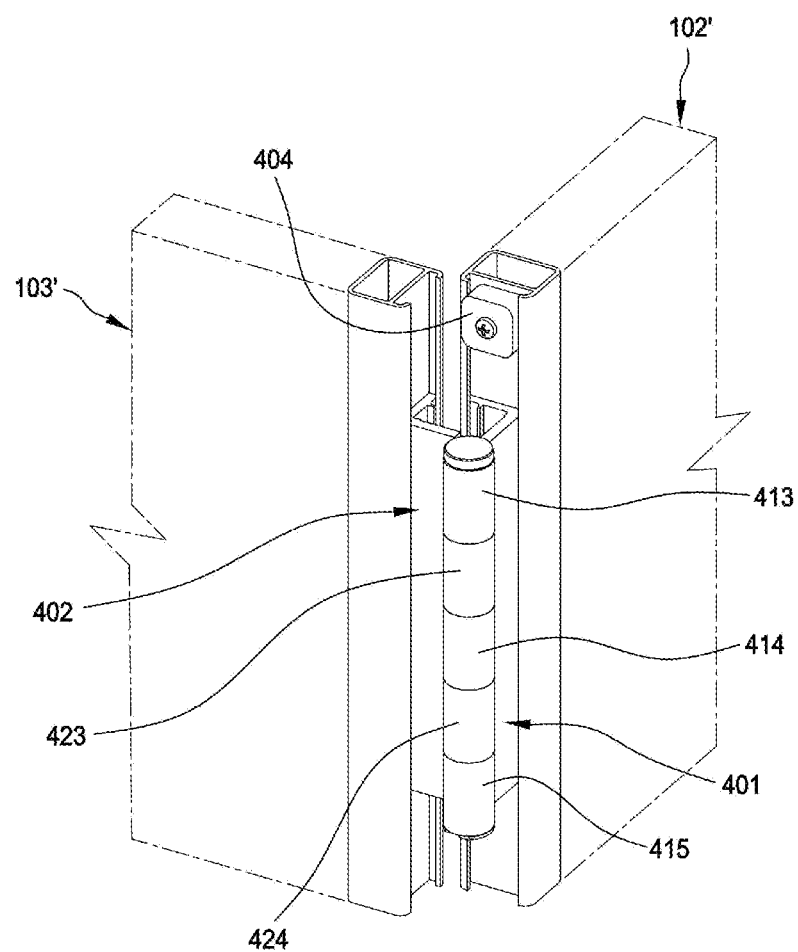

【FIG. 27a】
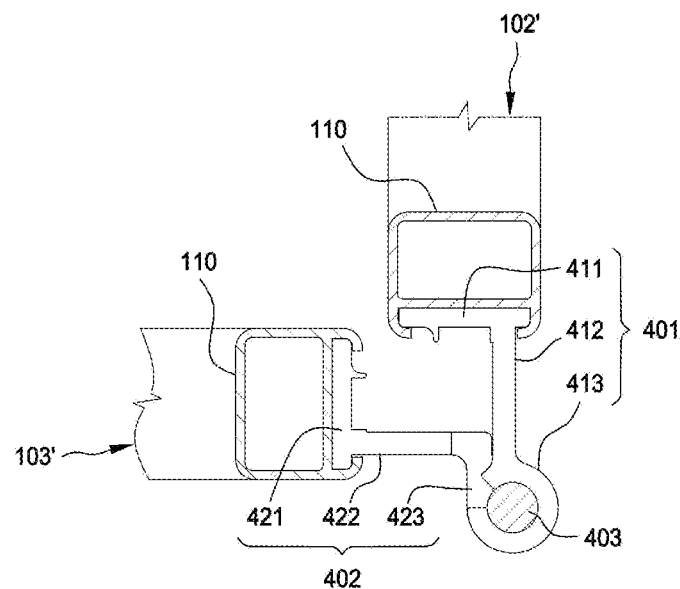
【FIG. 27b】
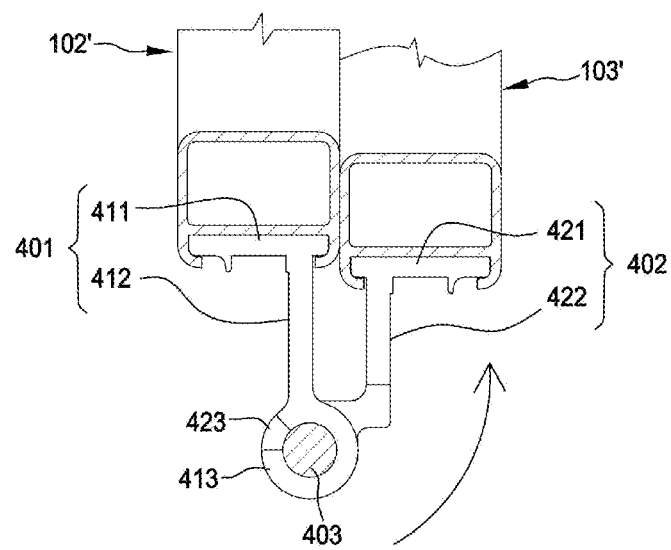

[FIG. 28]
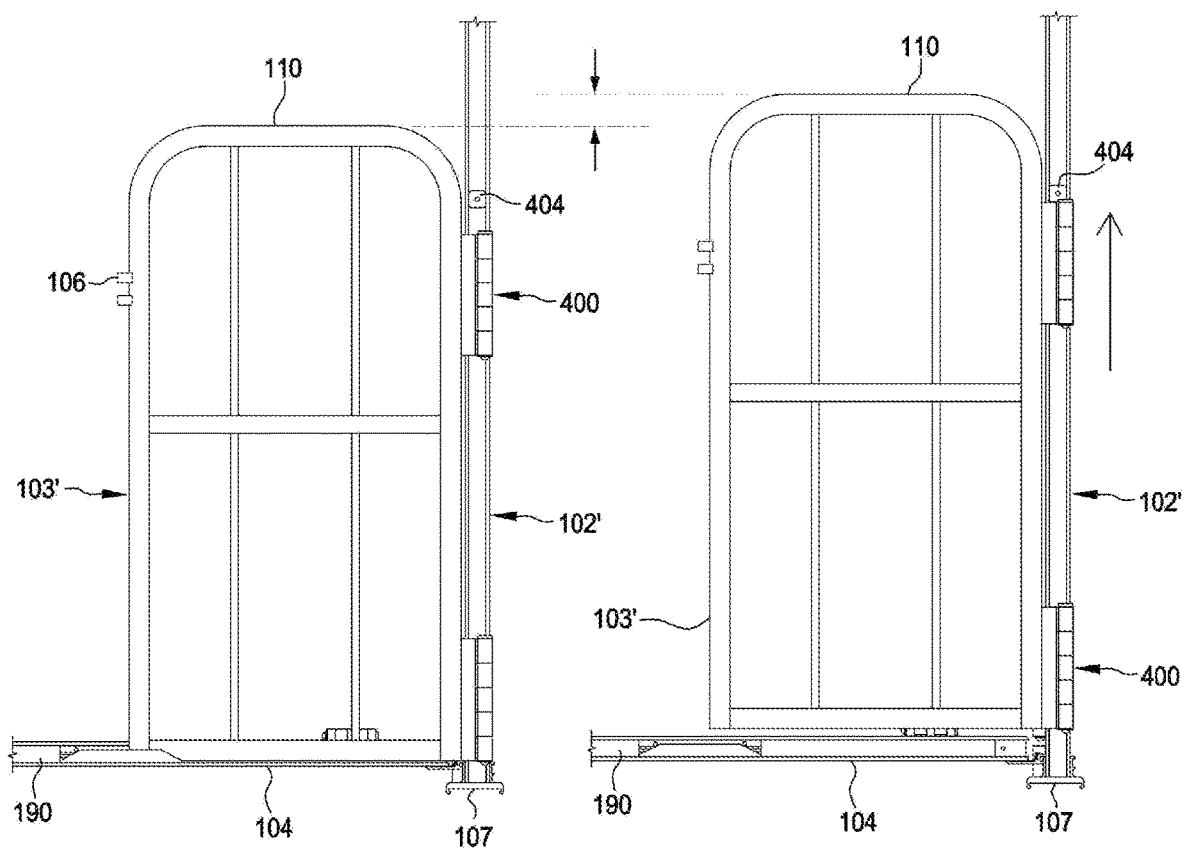

【FIG. 29】
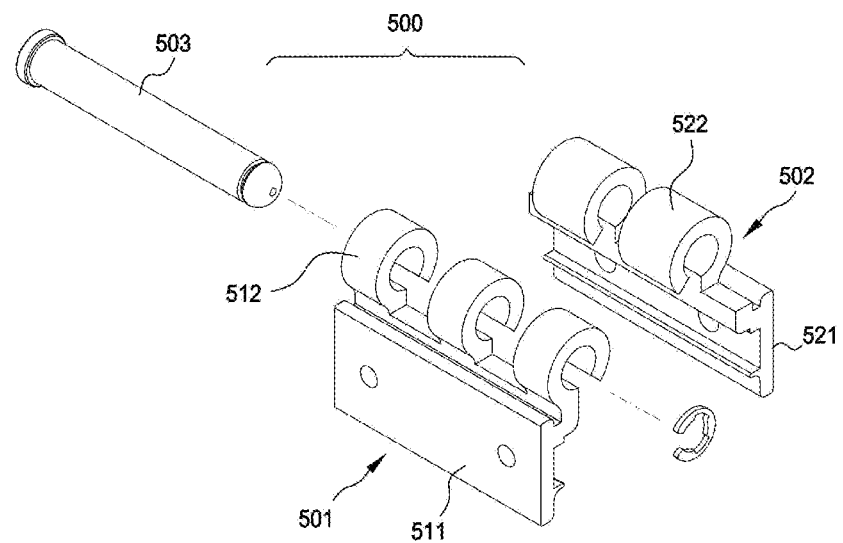
【FIG. 30a】
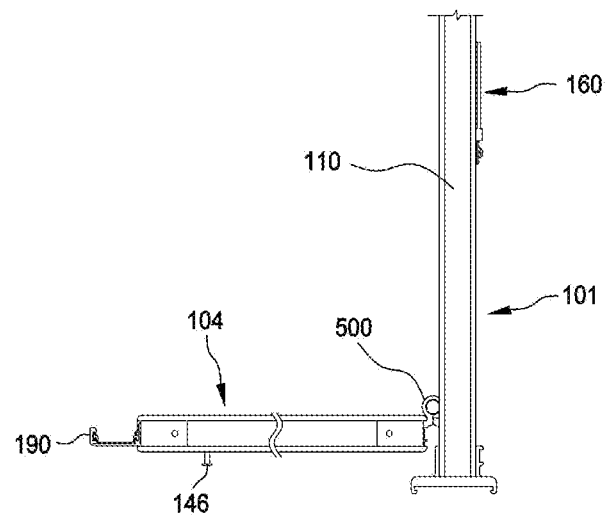

[FIG. 30b]
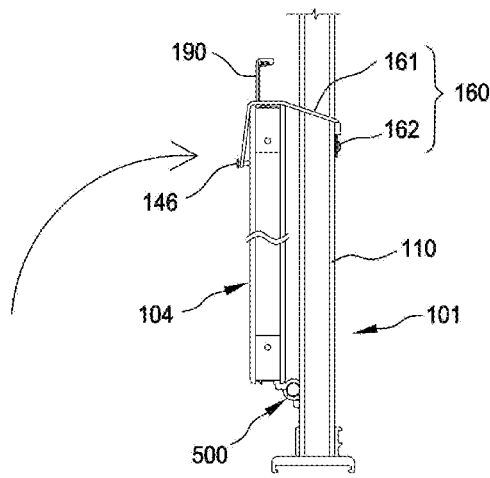
[FIG. 31]
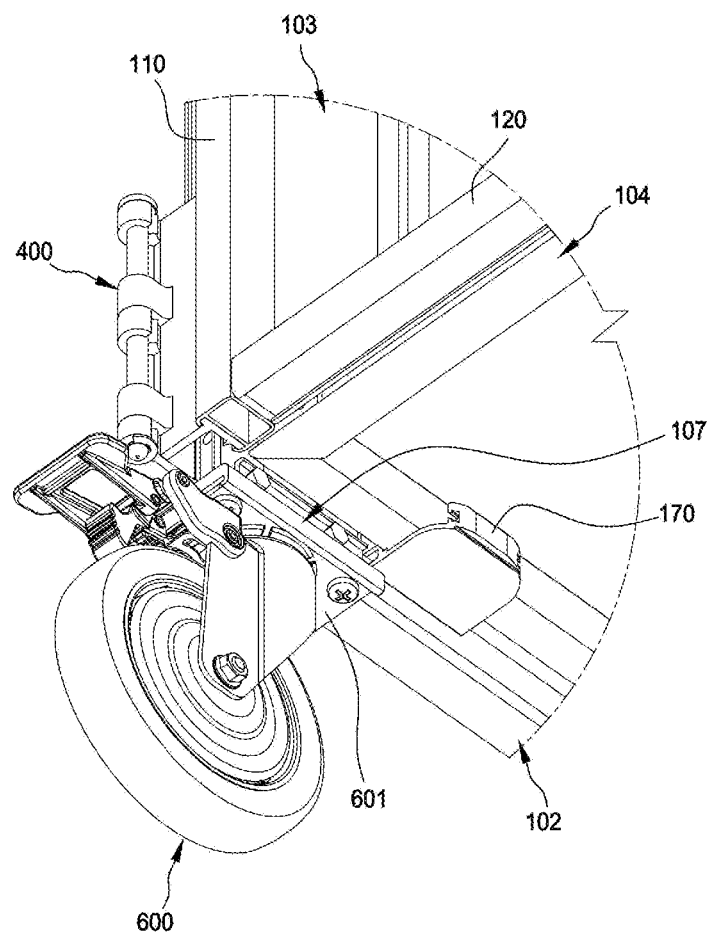

[FIG. 32]
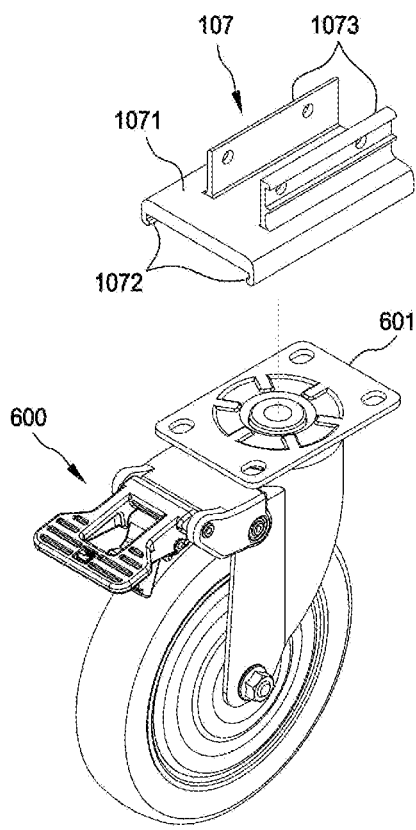

[FIG. 33]
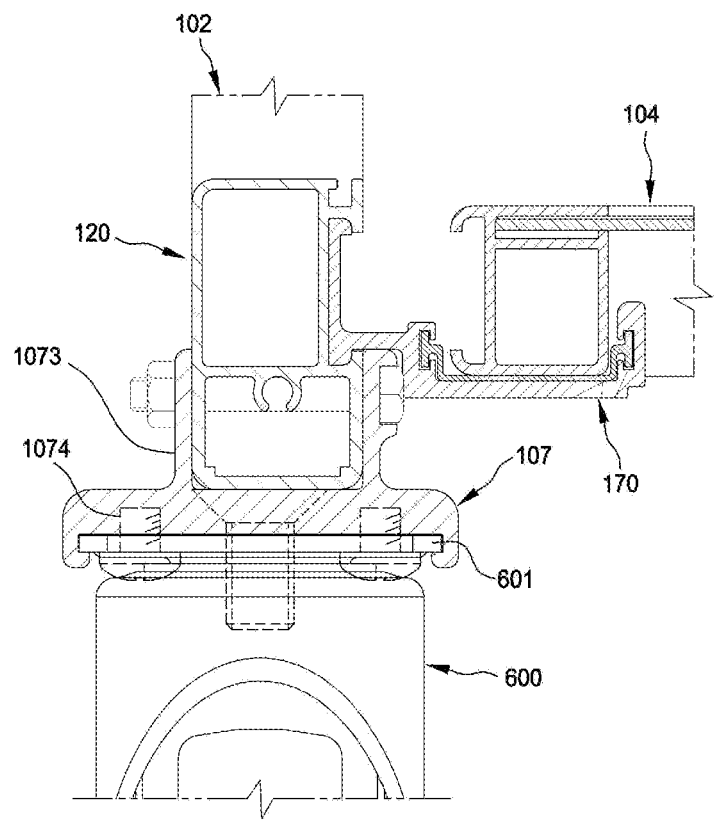

【FIG. 34a】
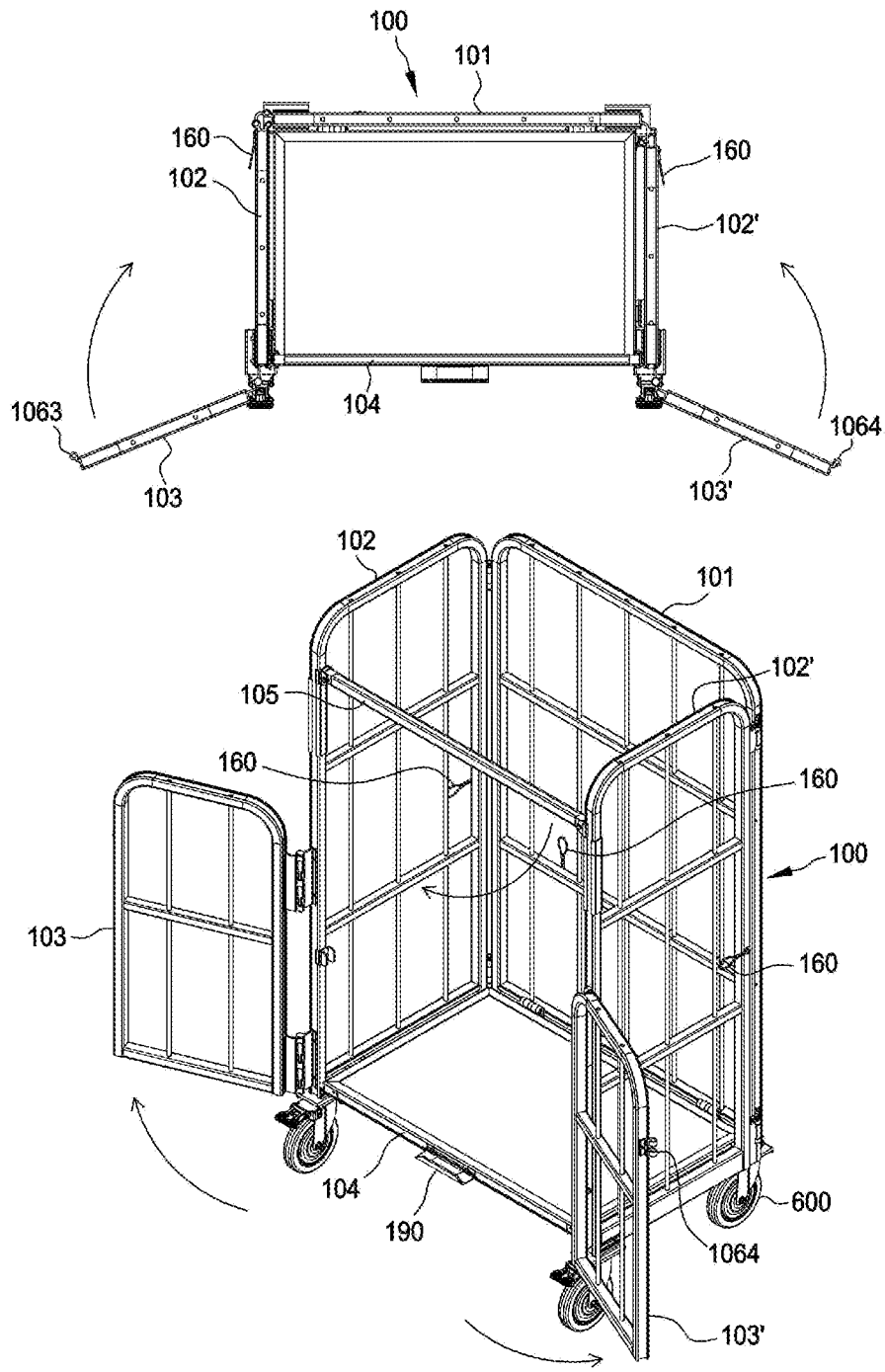

[FIG. 34b]
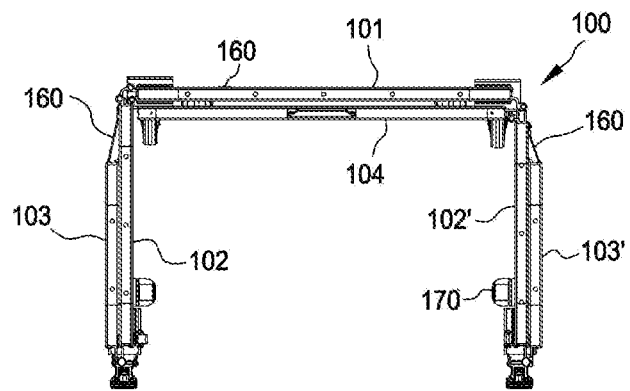
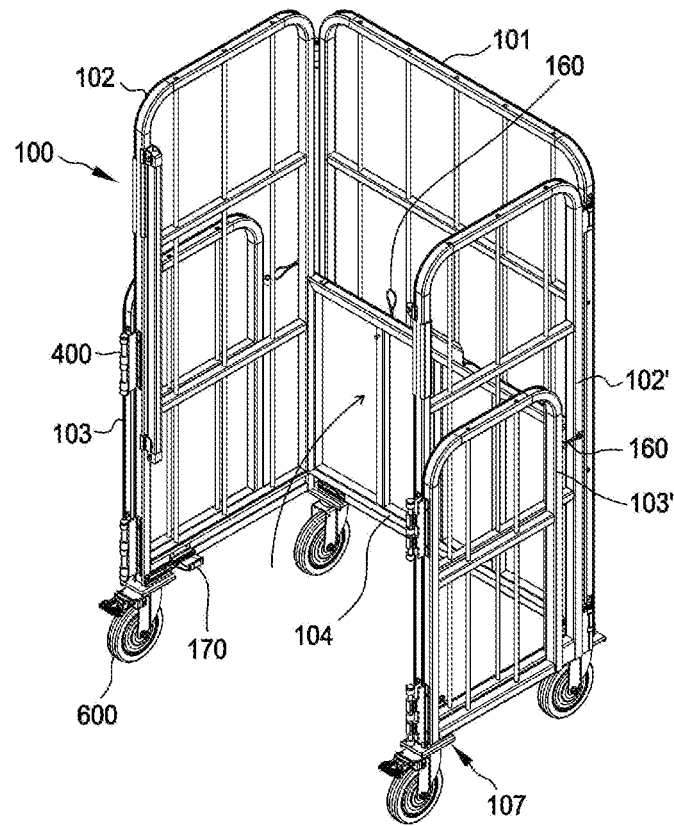

【FIG. 34c】
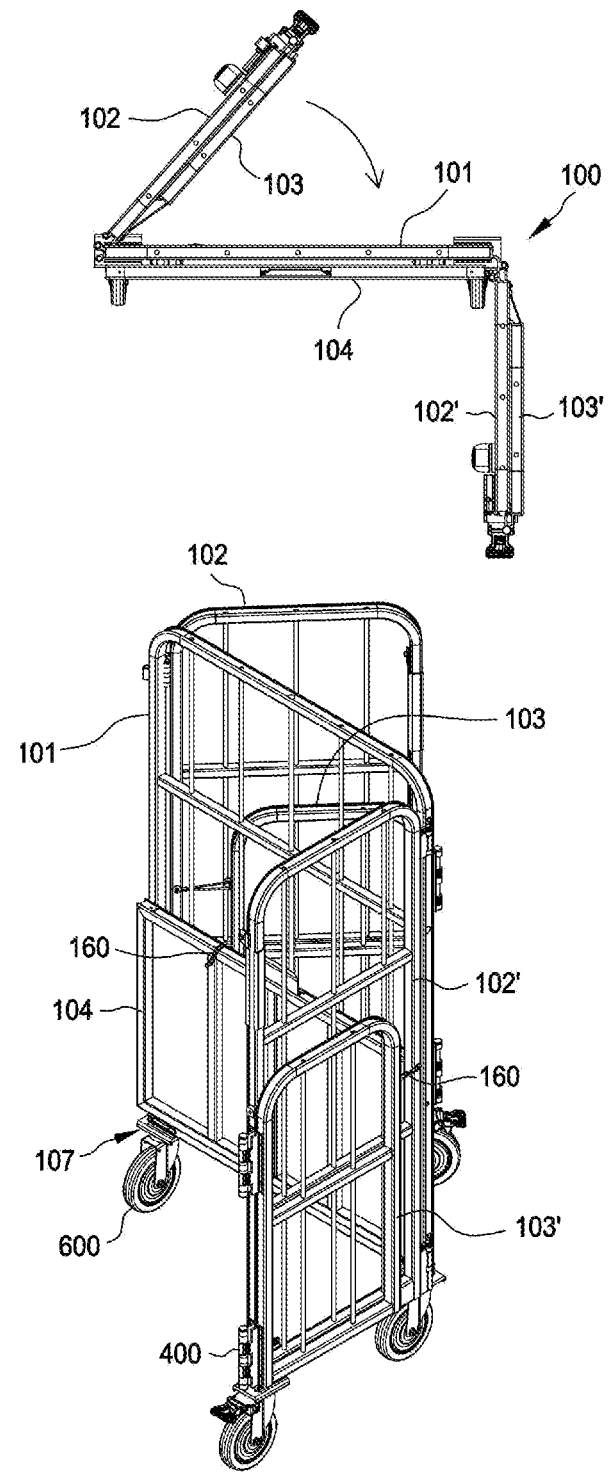

[FIG. 34d]
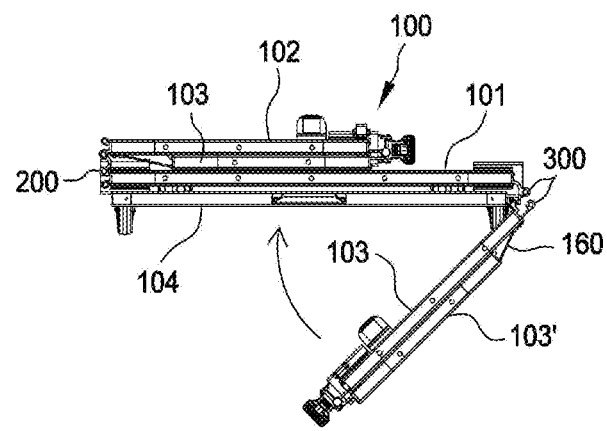
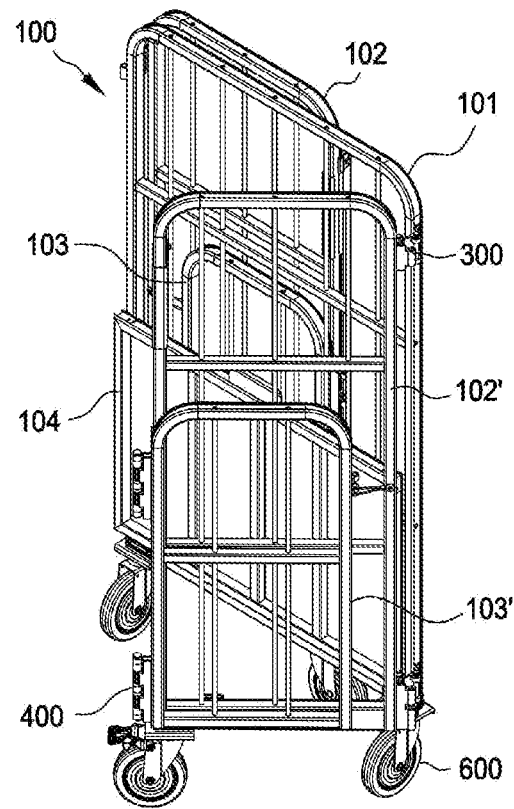

[FIG. 34e]
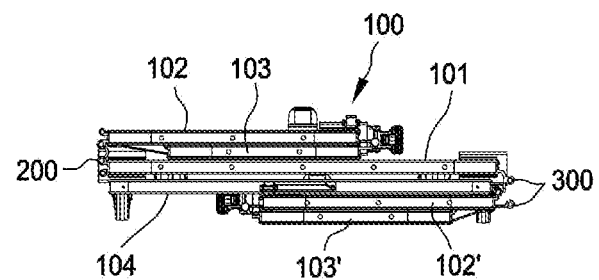
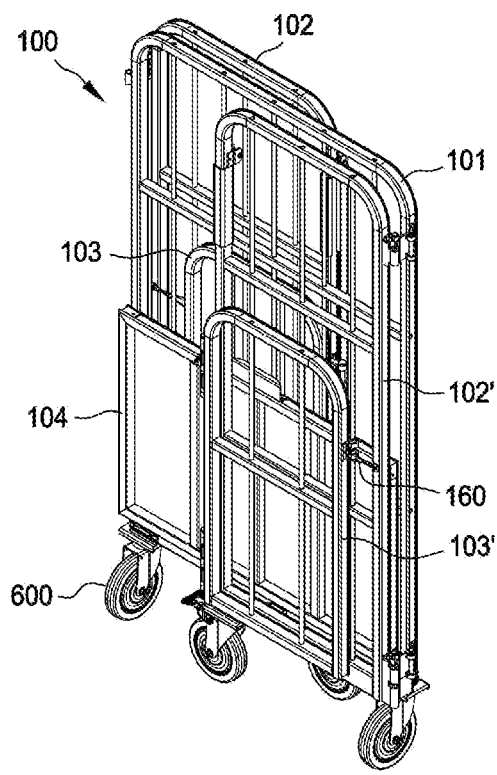

[FIG. 35]
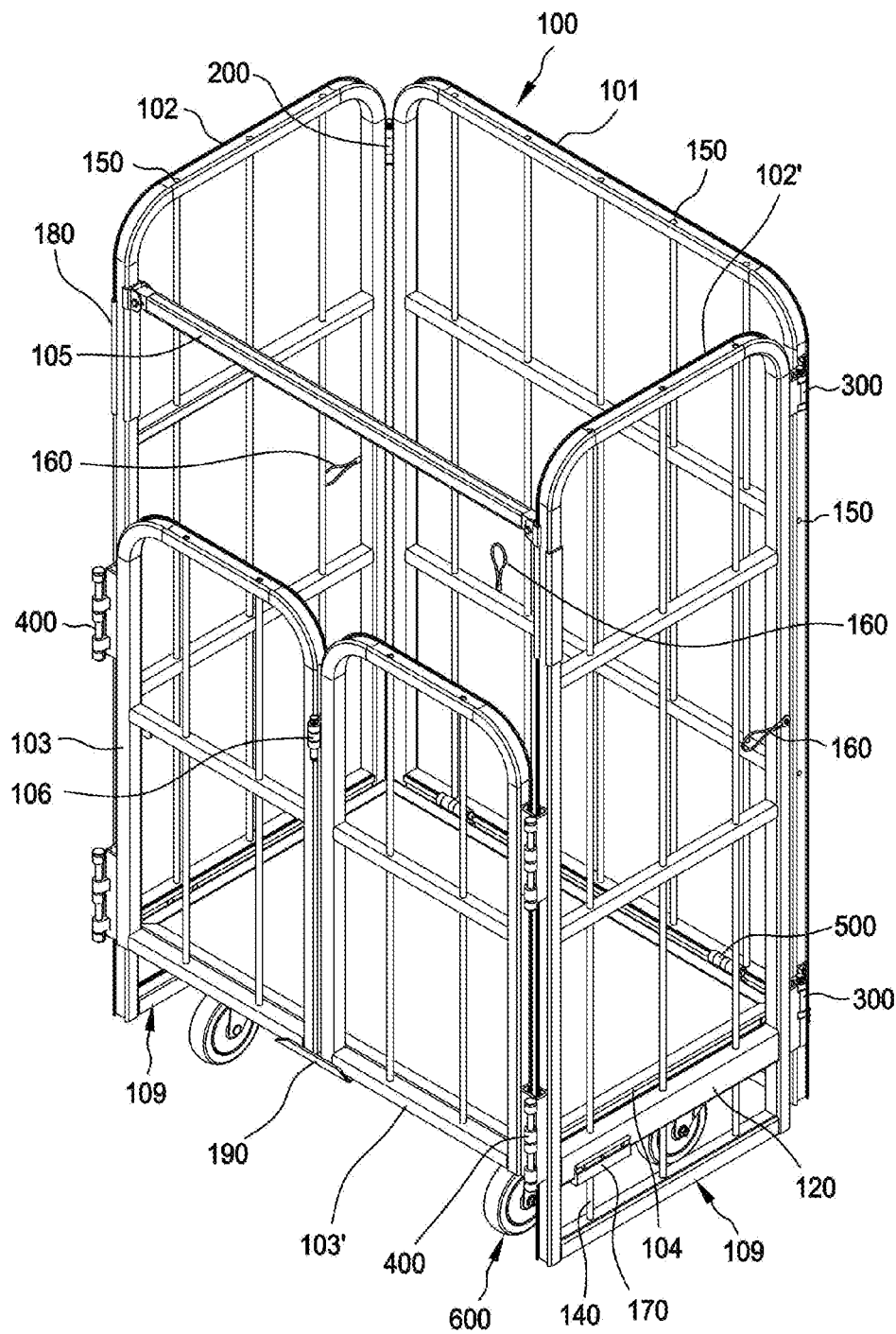

[FIG. 36]
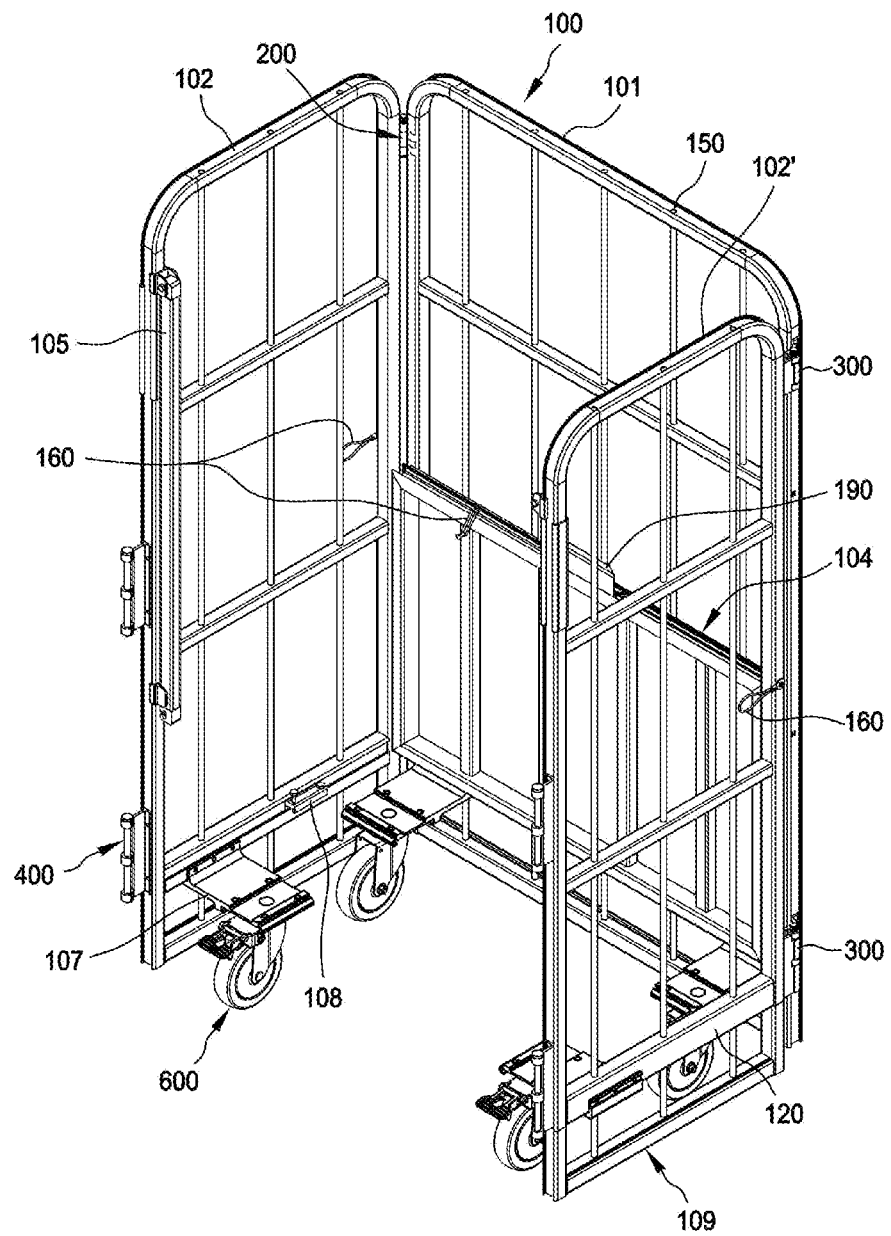

[FIG. 37]
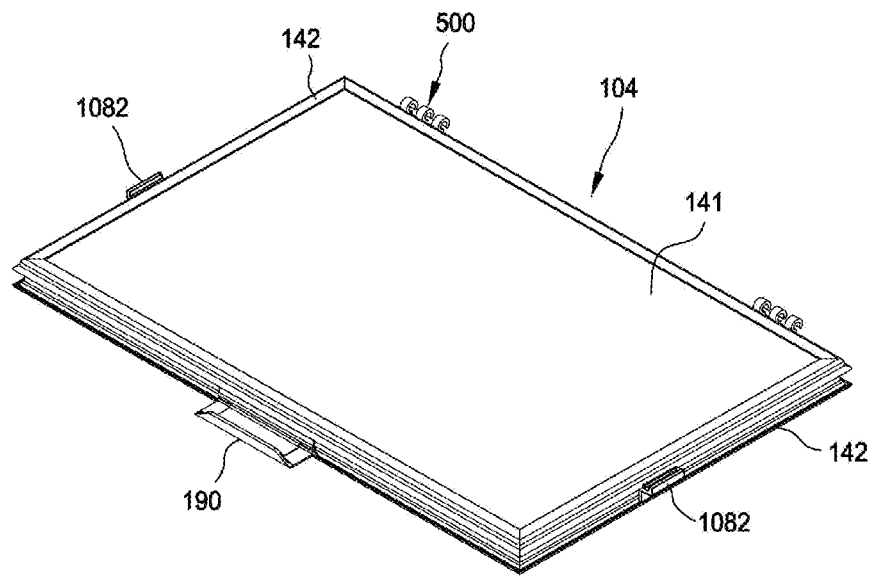
[FIG. 38]
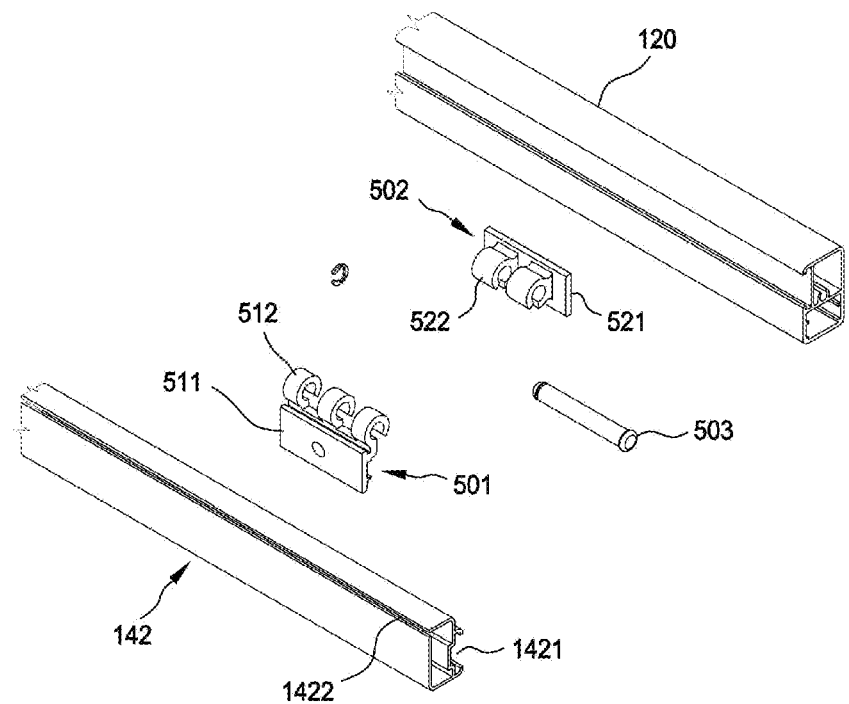

【FIG. 39a】
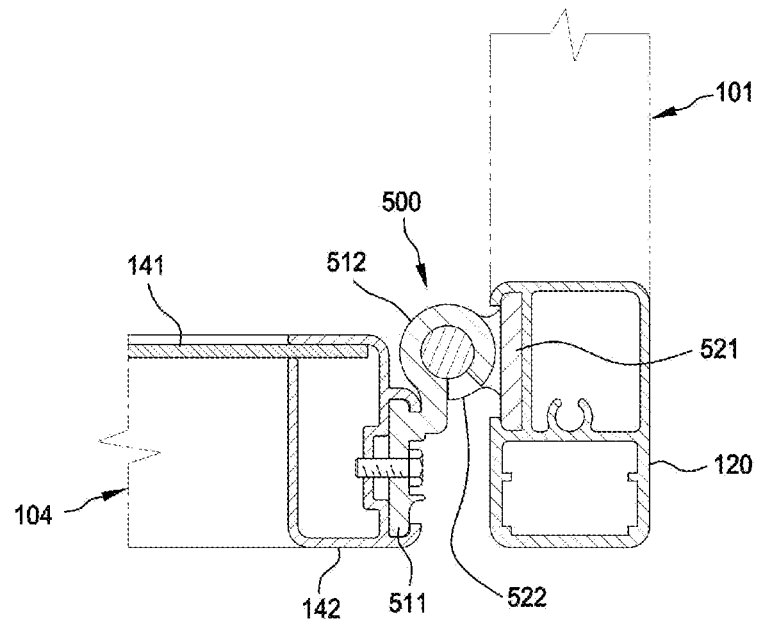
【FIG. 39b】
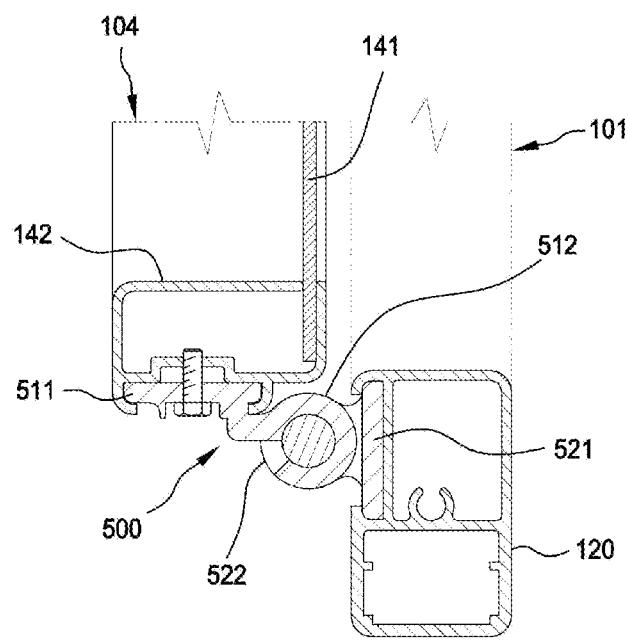

[FIG. 40]
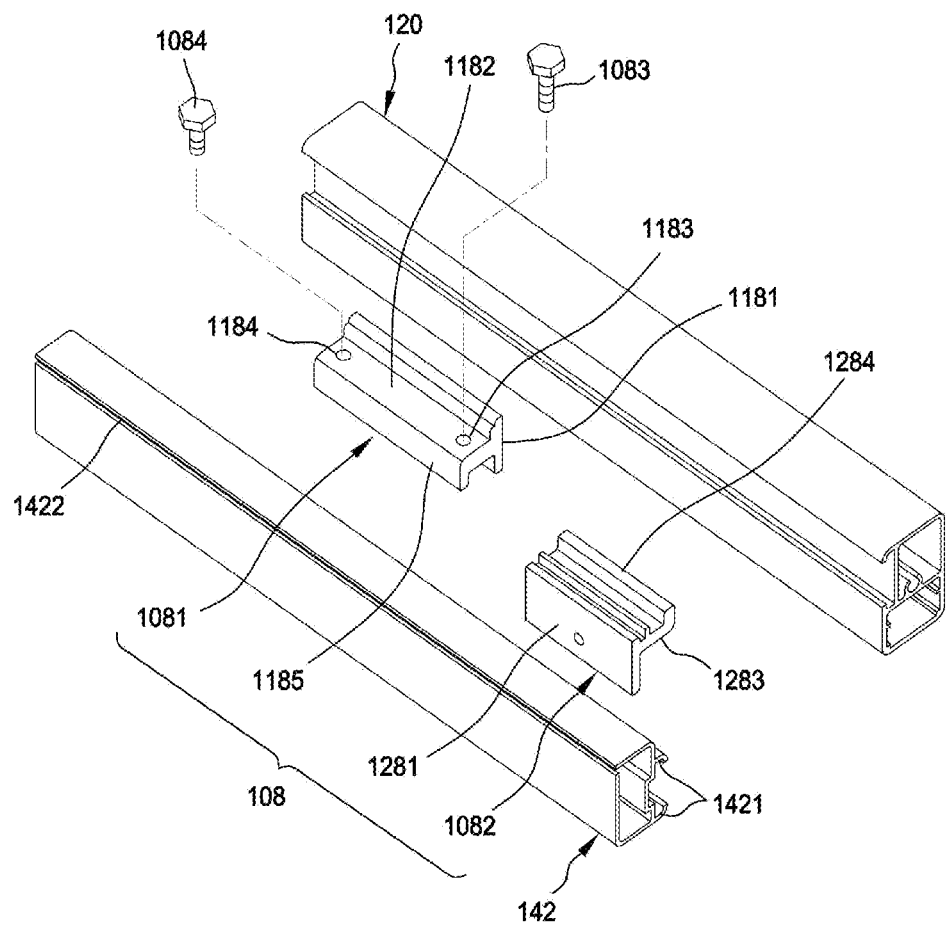

【FIG. 41a】
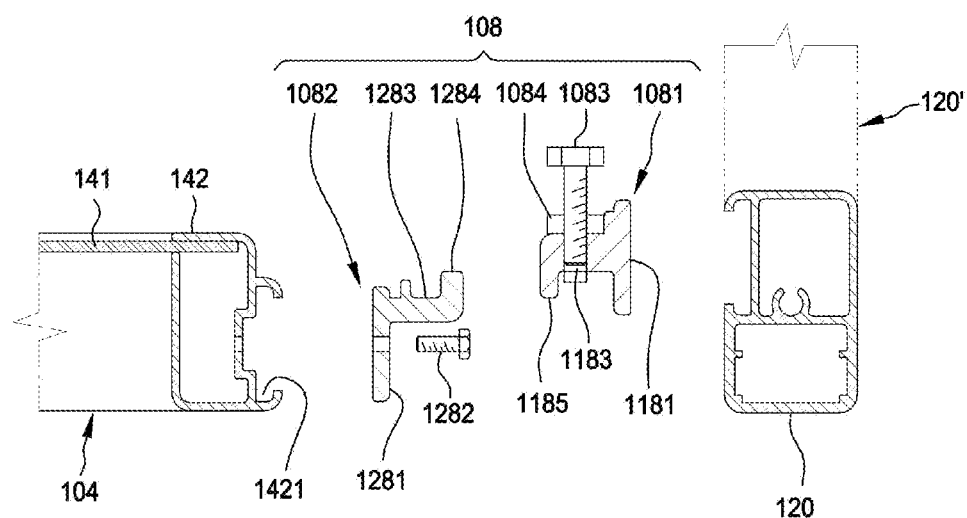
【FIG. 41b】
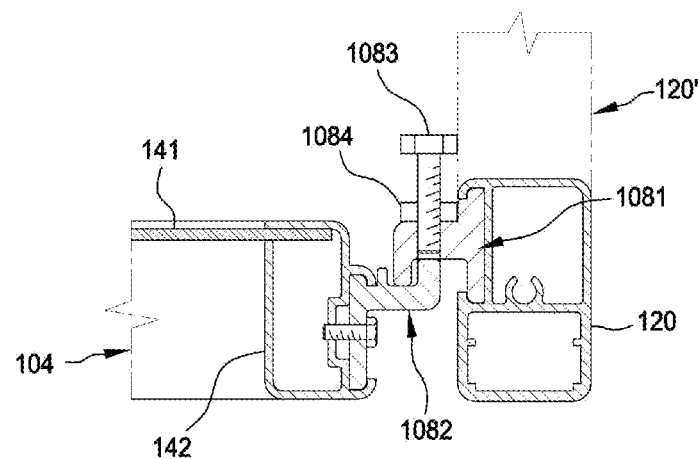

【FIG. 42a】
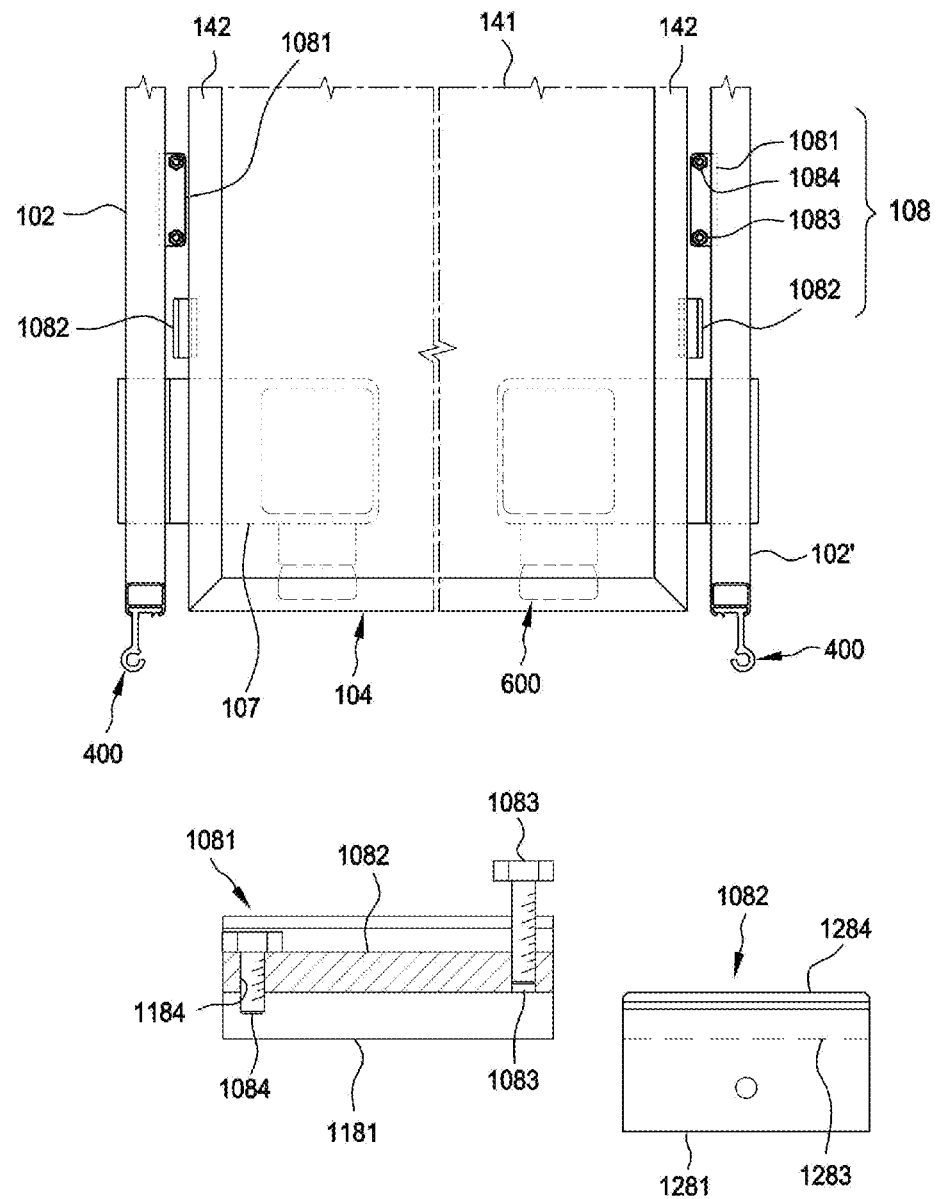

[FIG. 42b]
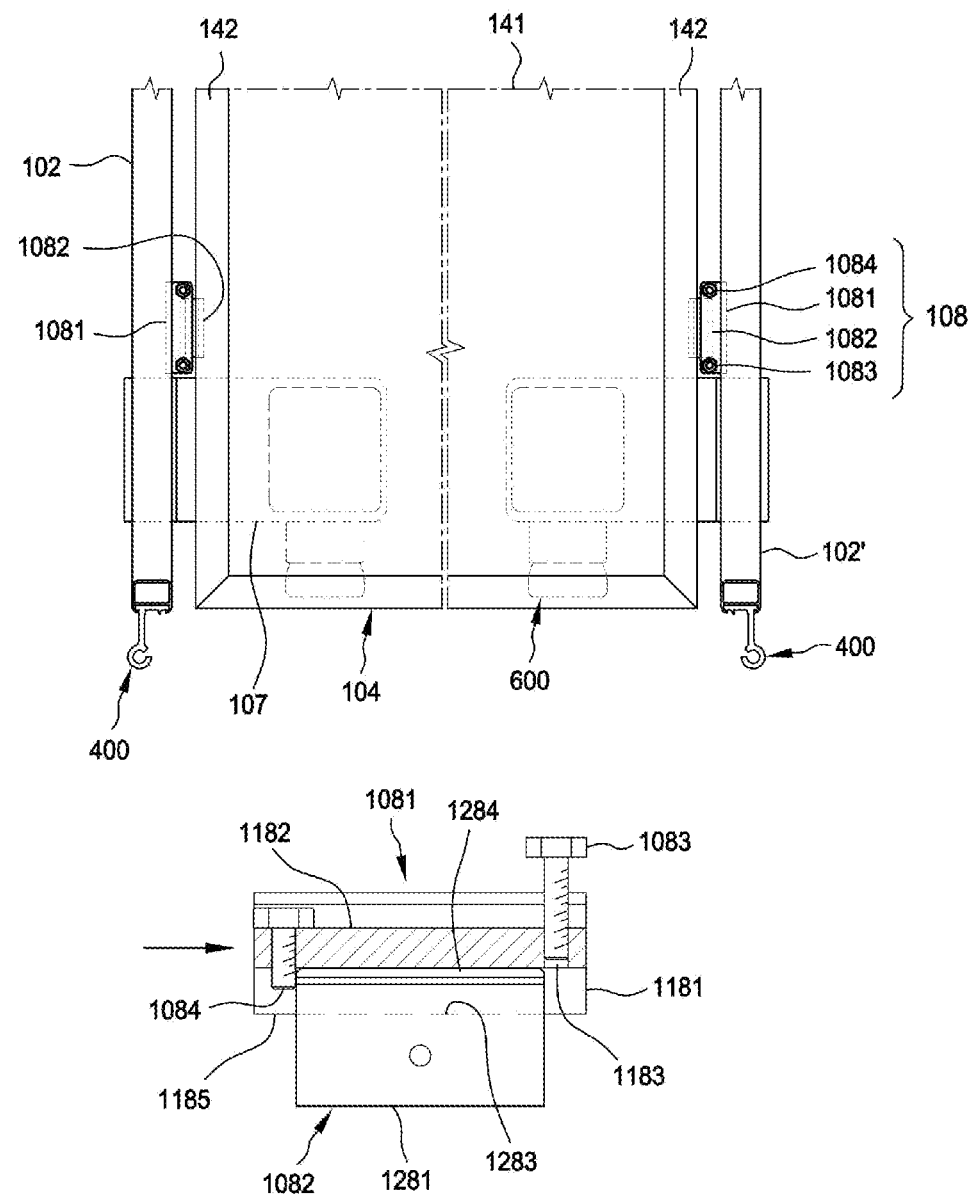

[FIG. 42c]
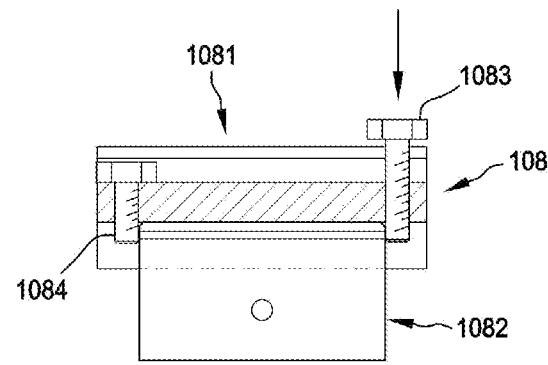
[FIG. 43]
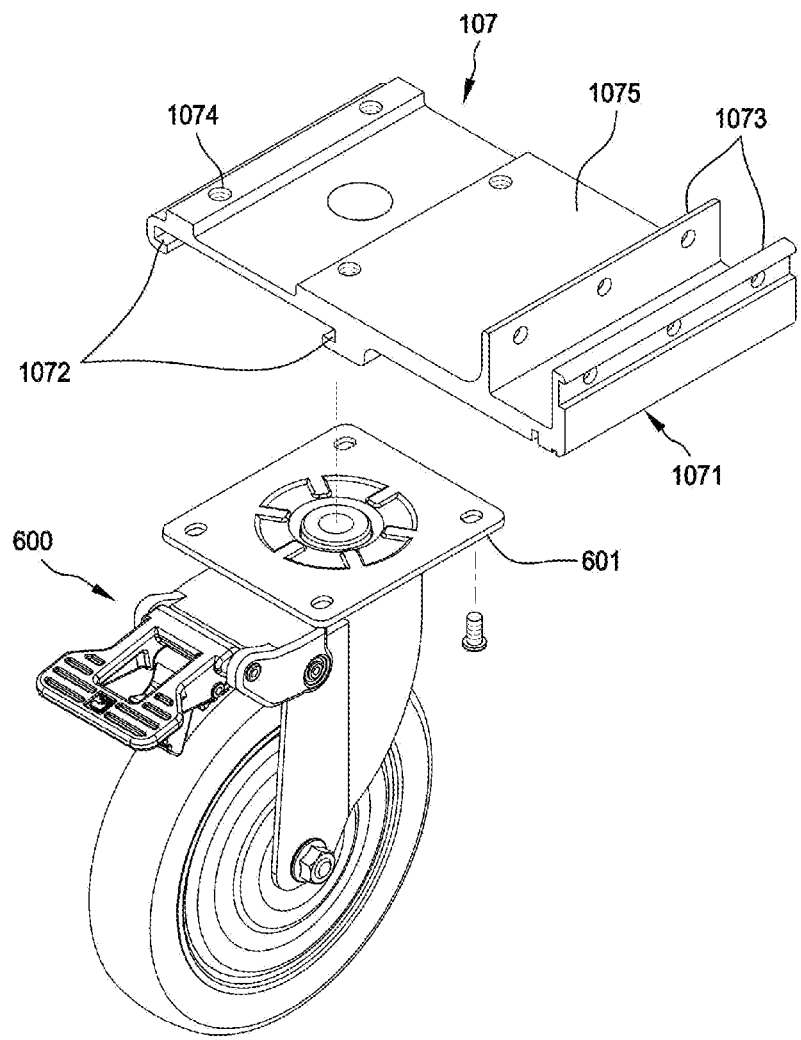

【FIG. 44a】
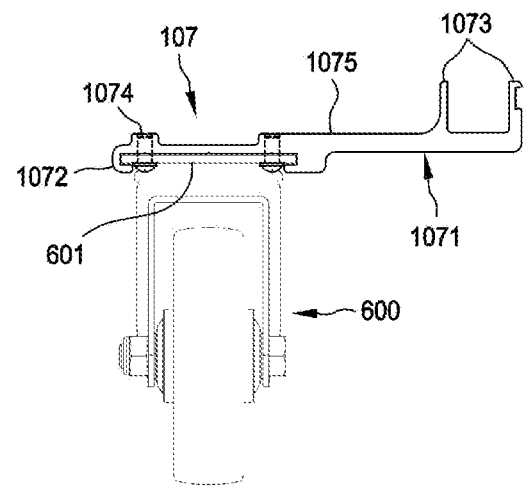
【FIG. 44b】
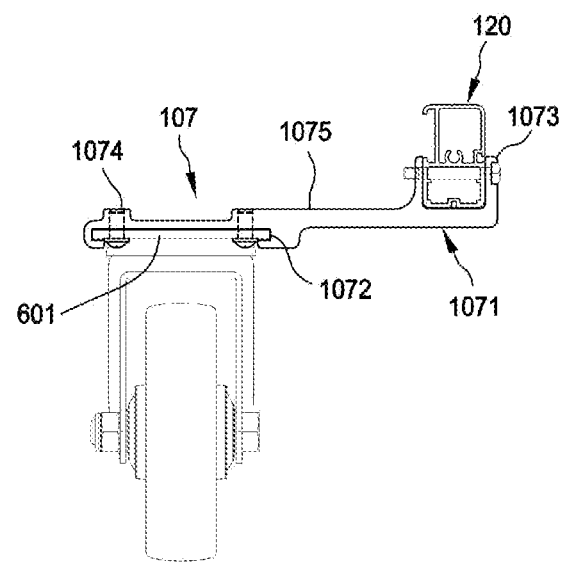

[FIG. 45]
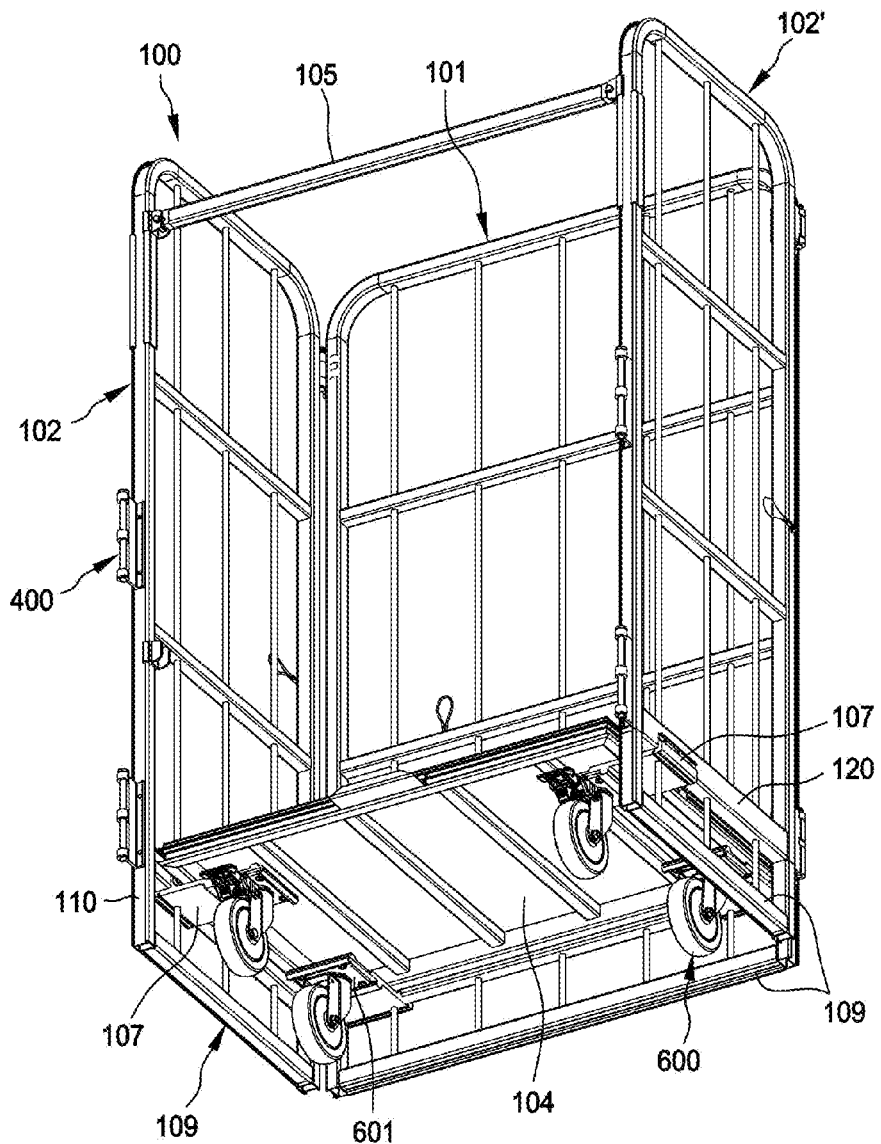

【FIG. 46a】
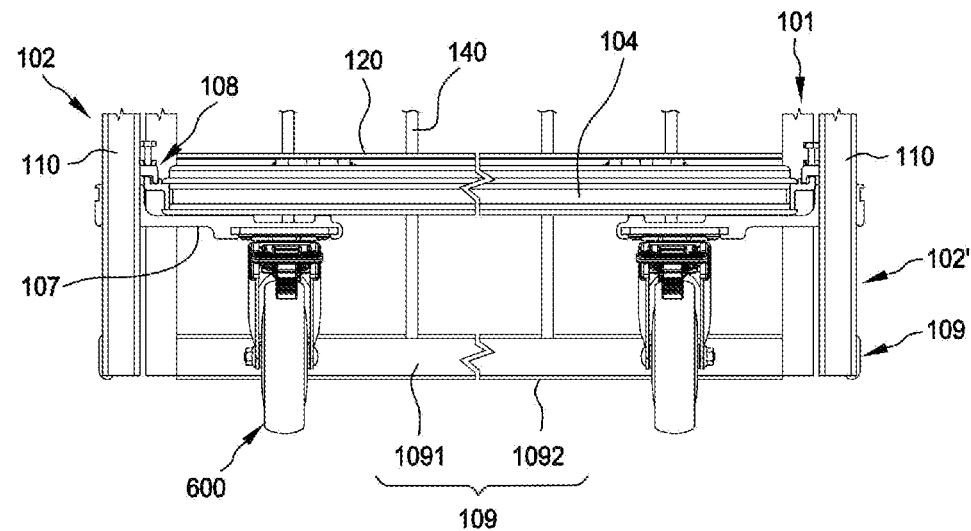
【FIG. 46b】
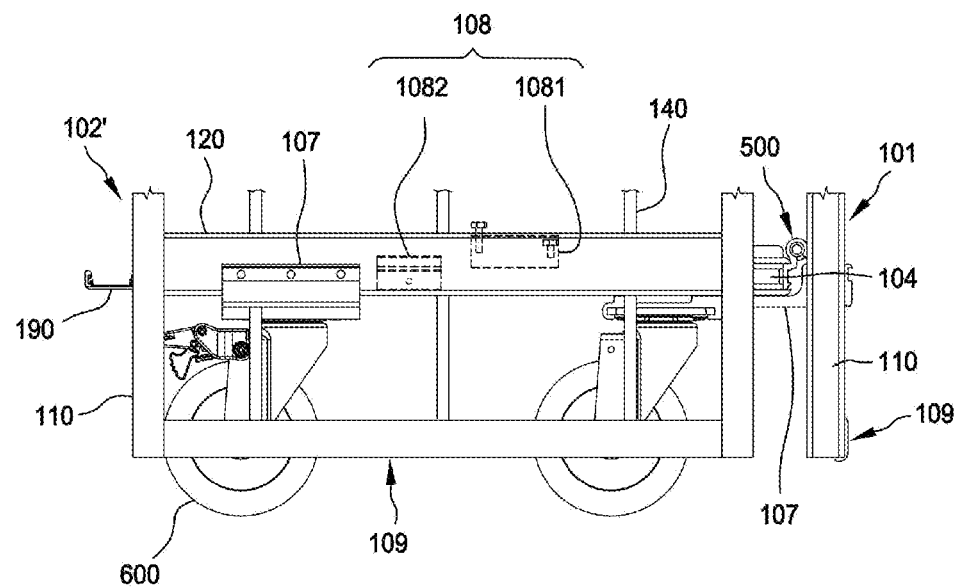

【FIG. 47a】
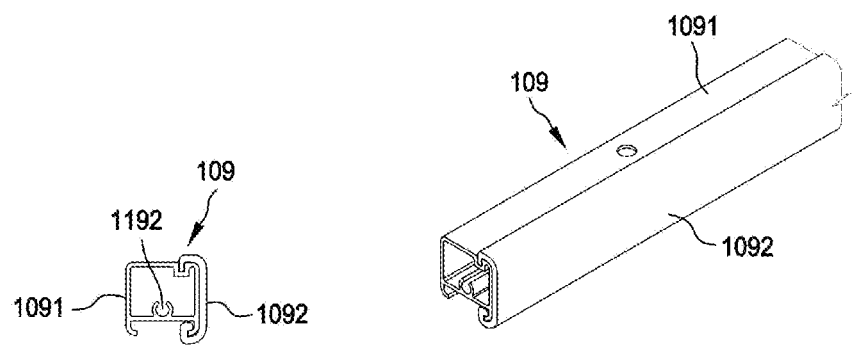
【FIG. 47b】
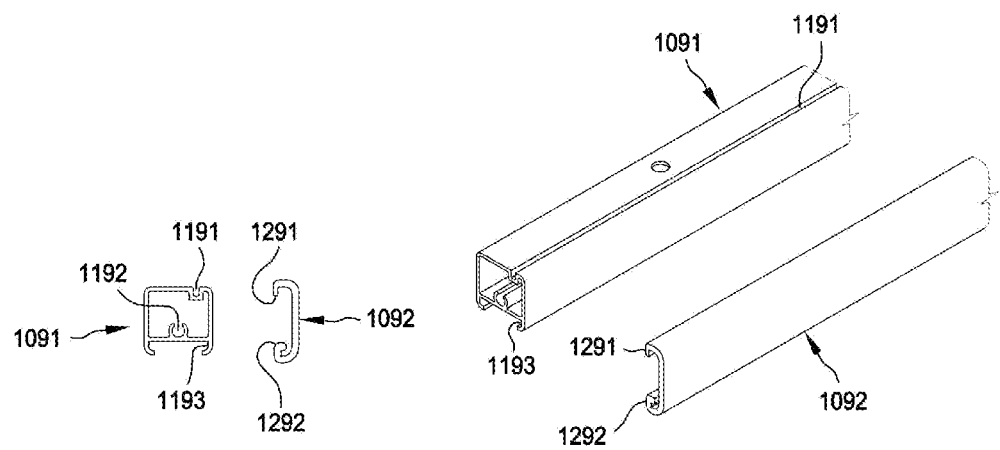
【FIG. 48a】
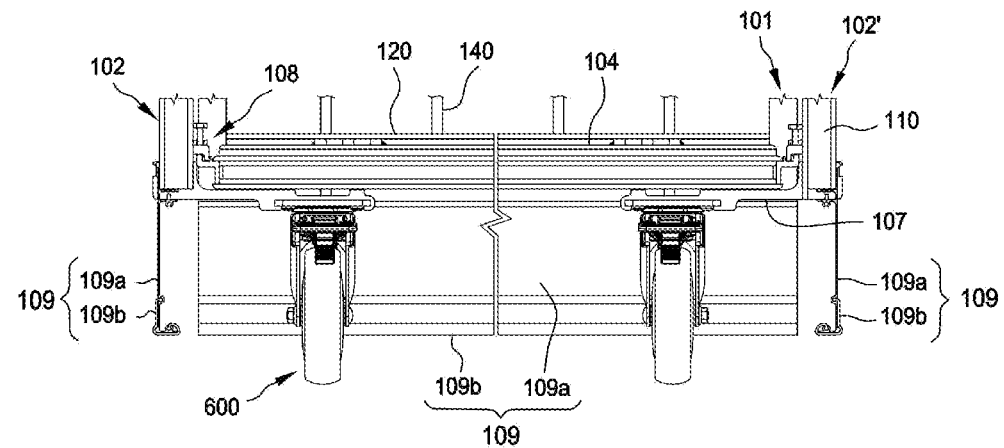

【FIG. 48b】
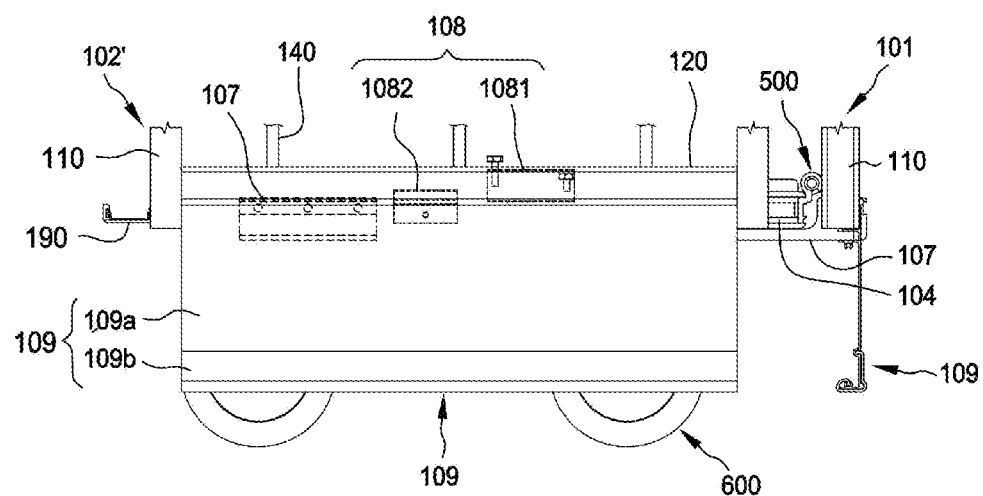
【FIG. 49a】
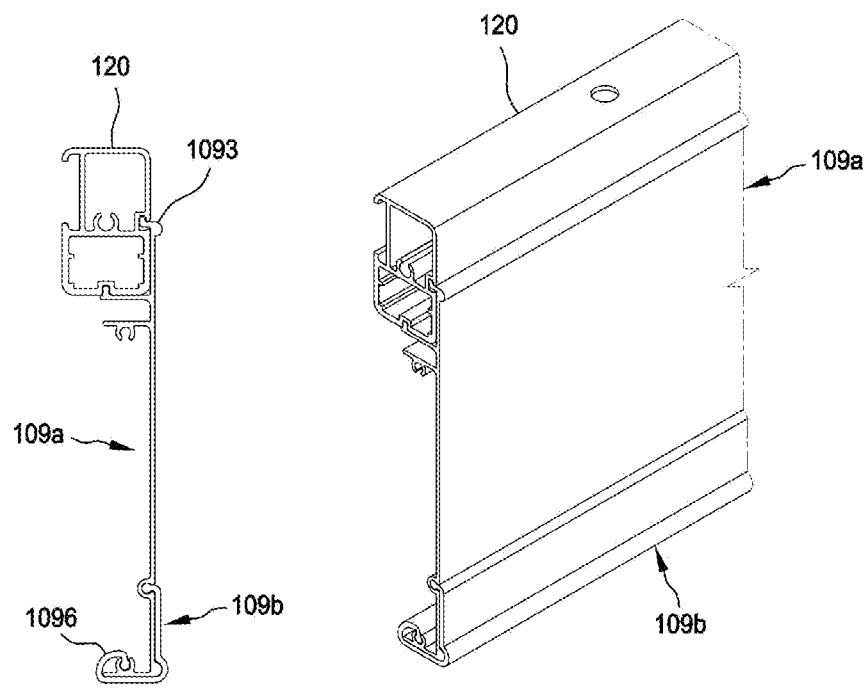

[FIG. 49b]
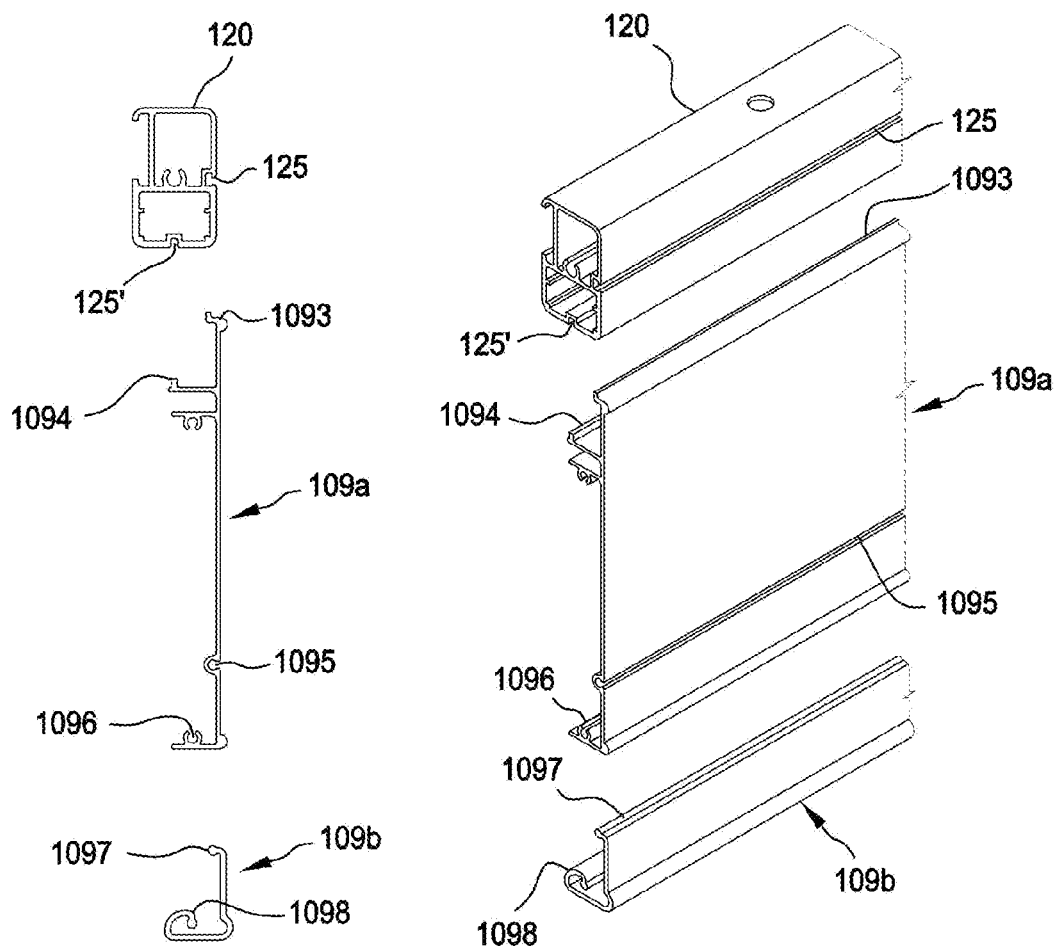

FOLDABLE LIGHTWEIGHT ROLL CONTAINER

CROSS-REFERENCE TO RELATED APPLICATIONS

This application claims the priority of the Korean Patent Applications NO 10-2021-0087040 filed on Jul. 2, 2021, and NO 10-2021-0094185 filed on Jul. 19, 2021, in the Korean Intellectual Property Office, the disclosure of which is incorporated herein by reference.

TECHNICAL FIELD

The present invention relates to a foldable lightweight roll container, and more particularly, to a foldable lightweight roll container which is lightweight, very easily cleaned and maintained, prevents shortening of the product's lifetime, and may be used to carry goods in various fields such as medicines and foods in addition to various industrial products.

BACKGROUND ART

Generally, a rolltainer is widely used in the logistics industry or in places such as a large mart or factory to move many articles. As illustrated in each of FIGS. 1 to 3, there is a foldable rolltainer configured to include a load frame 10 configured to include a border 11a formed by bending a steel pipe in a flat U-shaped form, a support 11b formed by bending or extruding the steel pipe so that a side surface has an approximately L-shaped form, and welding and attaching both vertical lower ends of the border to both top ends of a horizontal portion, a plurality of horizontal supports 11c which is formed by a steel plate so as to have a band form and of which both ends are welded to inner surfaces of both vertical portions of the border and attached to horizontally cross, a plurality of vertical supports 11d formed by a steel rod having a small diameter, and having an upper end welded and attached to a bottom of an upper horizontal portion of the border and a lower end vertically penetrating the plurality of horizontal supports and welded and attached to a top of the horizontal portion of the prop, and a lower plate member 14 which is formed by left and right frame members 12 and 12' and left and right door members 13 and 13', and the steel plate, and of which a rear end is rotatably coupled to a rear side frame member, hinge members 20 which are formed by bending a flat cross section, and while the corresponding vertical portions of each border are united to be interposed between narrow portions of both ends with two to correspond to each other and vertically penetrated, bolts and nuts are fastened to upper and lower fastening holes and tightened, and then narrows portions of one end are welded and attached to any one of both vertical portions of the border to be fixed so as not to arbitrarily move down at the corresponding vertical portion and narrow portions of the other end are coupled to the other vertical portion of the border to which the narrow portion of one end is not welded to be rotated; a latch member 30 is installed to close left and right door members, and then lock the door members; and four casters 40 are installed on left and right sides of a bottom surface of the rear surface member, and front ends of bottom surfaces of left and right frame members, respectively.

However, such a foldable rolltainer has problems such as very poor workability and significant lowering of productivity, and problems in that its weight is significantly heavy and it is very troublesome and uncomfortable to use and maintain because each component except for the caster 50 is made of steel and a coupling portion of each component containing the caster is welded and attached, and then painted for preventing corrosion.

Further, there is a problem in that paint is easily removed due to various factors such as frequent contact or collision with other objects in use or the collision of respective members with each other in the process of folding for storage or unfolding for use, and as a result, the corrosion prevention effect is reduced, and there are problems in that the rolltainer cannot be used for the moving or transporting of various articles such as medical supplies or foods, or as a precision instrument in which cleanliness is a top priority, and as a result, its use becomes limited.

Further, since coupling portions of the respective components are welded and attached, partial corrosion or damage can quickly compound. As an example, even if one caster is damaged, the caster cannot be repaired or replaced, and as a result, the lifespan of the product is shortened. It is also difficult to recycle, resulting in wastage of resources and increased costs.

Further, when the rolltainer is folded after use, left and right door members 13 and 13' are opened, and rotated and unfolded to outer surfaces of left and right frame members 12 and 12', and in this case, since a narrow portion of one end of each of the hinge members 20 that rotatably couple the left and right door members to the left and right frame members is welded and attached to each left and right vertical portion of the left and right door members, and a narrow portion of the other end is coupled to each front vertical portion of the left and right frame members, the left and right door members are not in close contact with each outer surface of the left and right frame members, but are included and widened outwards. Hence, there is a limit in minimizing a bent-back thickness due to an angle at which the left and right door members are included and widened, and as a result, more space is needed for transporting or keeping/storing the rolltainer.

DISCLOSURE

Technical Problem

The present invention is contrived by considering the points in the related art, and an object of the preset invention is to provide a foldable lightweight roll container to be widely applied for moving or transporting of articles in various fields such as medical supplies, or foods, or as a precise instrument in addition to general industrial products. Another object is to provide a roll container of small weight that is convenient and easy to use and maintain, and remarkably enhances workability and productivity and cleanliness.

Further, another object of the present invention is to provide a foldable lightweight roll container in which since thickness is minimized when the foldable lightweight roll container is folded, spatial utilization, provides easy separation, repair or replacement of a corresponding part is simple when partial damage occurs in use, and as a result, prevents life-span shortening and the wastage of resources as well as prevents increased costs by enabling the recycling of the roll container after disposal.

Further, yet another object of the present invention is to provide a foldable lightweight roll container which prevents accidents to the feet or ankles by providing a lower plate member when the rolltainer is moved by a forklift.

Technical Solution

In order to achieve the objectives, the present invention provides a foldable lightweight roll container including: a load frame 100 including a rear frame member 101 including a border portion 110 which is formed in a flat U-shape in which a fastening groove portion 111 having both ends bent to correspond to each other is formed on one surface, a lower border portion 120 which includes an insertion groove 121 dented at an inner end of the upper surface with an opened upper end, a side coupling groove portion 122 dented at a direct lower portion of the insertion groove of the inner side, a horizontal portion wall 123 partitioning an inner space up and down, and a first fastening port 124 which protrudes from the lower portion of the horizontal partition wall 123 so that a middle of the lower end is isolated to fasten screws to both ends, and is formed with a side section extruded in a pipe form and cut and used in the required length, a horizontal supporter 130 which includes a second fastening hole 131 which protrudes from the lower portion of the upper surface so that the middle of the lower end is isolated to fastened screws on both ends and is formed with a side section extruded in an approximately square-shaped pipe form and cut and used in the required length, and a vertical supporter 140 which is extruded in a pipe form having a small diameter and having a lower end which is supported on the internal bottom of the bottom surface of the lower border portion 120 on which a third coupling hole 125 is not perforated by penetrating a first coupling hole 112 and a second coupling hole 132 formed to vertically penetrate the upper and lower surfaces of a horizontal portion of the border portion 110 and the horizontal support 130, and the third coupling hole 125 perforated on the top surface of the lower border portion 120 and an upper end is coupled to be positioned between internal upper and lower surfaces of the horizontal portion of the border portion 110, left and right door members 103 and 103' including left and right frame members 102 and 102', the lower border portion 110, the horizontal supporter 130, and the vertical supporter 140 formed in the same as the rear frame member 101, and a lower border portion 120 having a side cross section with a rectangular pipe form, and attaching both ends to lower ends of inner surfaces of both vertical portions to cross the lower ends of both vertical portions of the border portion 110, and a lower plate member 104 including a lower plate material 141 installed to be vertically rotated by left and right lower plate hinge members 500 on a lower end portion of the inner surface of the rear frame member 101 and formed by a rectangular flat plate, four front and rear and left and right border materials 142 surrounding and coupling four surfaces of the lower plate material 141, a fastening material fastening four corners of the border material 142, and a lower plate member including a plurality of support materials which couple both ends to inner surfaces of two border materials 142 corresponding thereto so as to cross the bottom surface of the lower plate material 141, left and right lower plate support means 170 installed on a lower end portion of the inner surface of a lower border portion 120 of each of the left and right frame members 102 and 102'; a left hinge member 200 rotating the left frame member 102 forward and backward within a range of 270 degrees by coupling and installing a rear end of the left frame member 102 on a left end of the rear frame member 101; a right hinge member 300 rotating the right frame member 102' forward and backward within a range of 270 degrees by coupling and installing a rear end of the right frame member 102' on a right end of the rear frame member 101; left and right door hinge members 400 rotating the left and right door members 130 and 130' forward and backward at a predetermined interval within a range of 270 degrees and elevated within a predetermined interval by coupling and installing the left and right ends of each of the left and right door members 130 and 130' to a front end of each of the left and right frame members 102 and 102'; a door support means installed in a middle portion of the front surface of the lower plate member 104 so as to support lower end portions of the right end and the left end corresponding to each other by closing and moving down the left and right door members 103 and 103'; and a caster 600 having a fixation plate portion 601 provided on the top surface, and coupled to and installed in each of the left and right end portions of the bottom surface of the rear frame member 101 and the lower border portion 120 of the left and right frame members 102 and 102'.

Further, the foldable lightweight roll container is configured to further include an installation member changing the structure to prevent the caster from being exposed to the outside four corners of the load frame by installing the caster to be positioned at the inside of the four corners of the bottom surface of the load frame and support the lower plate member which is rotated downward horizontally, a fixation member fixing the lower plate member which is rotated downward from a vertical direction to a horizontal direction not to be arbitrarily loaded, and a safe member installed in the rear frame member, and on the lower end portion of each of the left and right frame members and preventing a safety accident such as injury which occurs due to insertion of a foot or an ankle between each bottom surface and a ground surface.

Advantageous Effect

In the foldable lightweight roll container according to the present invention, since components including a caster and a load frame, left and right hinge members, left and right door hinge members, and left and right lower plate hinge members are molded by aluminum and are assembled and manufactured without welding, weight is reduced by 40% or more. Use and maintenance are very convenient and easy, and workability and productivity are remarkably enhanced as well as cleanliness, and the foldable light weight roll container can be widely applied to the moving or transporting of various articles such as medical supplies, foods, or as a precise instrument in addition to general industrial products.

Further, since thickness is minimized when the foldable lightweight roll container is folded, storage and spatial utilization are very easy, and when partial damage occurs in use, a corresponding part may be simply separated, and repaired or replaced, and as a result, life-span shortening is prevented and recycling is additionally possible when disposing of damaged parts, thereby preventing the waste of enormous resources and cost.

Further, the foldable lightweight roll container can be safely used by preventing a phenomenon in which a lower plate member is uploaded when a rolltainer is moved by a forklift, thus preventing possible safety accidents to feet or ankles when inserted into a space between a border of a bottom surface of the rolltainer and a ground surface, and prevents injury due to carelessness when a worker pushes or pulls, and moves the rolltainer.

Further, a caster is installed not to be exposed to the outside of the four corners of a load frame to prevent an occurrence in which the caster is easily damaged due to a collision with another object, and as a result, life-span shortening is caused.

DESCRIPTION OF DRAWINGS

FIG. 1 is a perspective view showing an example of a conventional foldable roll container.

FIG. 2 is a plan view showing a state in which the roll container of FIG. 1 is folded.

FIG. 3 is a perspective view showing a state in which the roll container of FIG. 1 is completely folded.

FIG. 4A and FIG. 4B are a perspective view and a plan view of a foldable lightweight roll container according to a first embodiment of the present invention.

FIG. 5 is a perspective view separately showing the lightweight roll container of FIGS. 4A and 4B.

FIG. 6 is a perspective view separately enlarging a part of a rear frame member in FIG. 5.

FIG. 7 is a lateral cross-sectional view enlarging a part of an edge part in FIG. 6.

FIG. 8A and FIG. 8B are a perspective view and a lateral cross-sectional view enlarging a part of a lower edge part in FIG. 6.

FIGS. 9A and 9B are a perspective view and a lateral cross-sectional view enlarging a part of a horizontal supporter in FIG. 6.

FIG. 10A and FIG. 10B are a longitudinal cross-sectional view and a cross-sectional view enlarging the rear frame member of FIG. 6.

FIG. 11a is a perspective view separately enlarging parts of the left and right frame members in FIG. 5.

FIG. 11b is a perspective view enlarging a fastening means in FIG. 11a.

FIG. 11c is a perspective view separately enlarging a bottom support means in FIG. 11a.

FIG. 11d is a lateral cross-sectional view enlarging the coupled bottom support means of FIG. 11c.

FIG. 11e is a perspective view enlarging left and right grip means in FIG. 11a.

FIG. 11f is a perspective view enlarging a support member in FIG. 11a.

FIG. 12a is a perspective view enlarging left and right door members in FIG. 5.

FIG. 12b is a plan view showing a locked state by enlarging a door locking member in FIG. 12a.

FIG. 13a is a perspective view separately enlarging a bottom member in FIG. 5.

FIG. 13b is a lateral cross-sectional view enlarging an edge member in FIG. 13a.

FIG. 13c is a perspective view separately enlarging a door support means in FIG. 13a.

FIG. 13d is a lateral cross-sectional view enlarging the door support means in FIG. 13a.

FIGS. 14a and 14b are a front cross-sectional view and a lateral cross-sectional view enlarging an assembly state of the bottom member of FIG. 13.

FIG. 15 is a perspective view separately enlarging a left hinge member in FIG. 5.

FIG. 16 is a perspective view enlarging a part of an installation state of the left hinge member of FIG. 15.

FIG. 17a, FIG. 17b and FIG. 17c are plan views partially showing a used state of the left hinge member of FIG. 15.

FIG. 18 is a perspective view separately enlarging a right hinge member in FIG. 5.

FIG. 19 is a perspective view partially enlarging an installation state of the right hinge member of FIG. 18.

FIG. 20a, FIG. 20b and FIG. 20c are plan views partially enlarging a used state of the right hinge member of FIG. 18.

FIG. 21 is a perspective view separately enlarging a first embodiment of the left and right door hinge members in FIG. 5.

FIG. 22 is a perspective view partially enlarging the installation state of the left and right door hinge members of FIG. 21.

FIGS. 23a to 23b are plan views partially enlarging a used state of the left and right door hinge members of FIG. 22.

FIG. 24 is a plan view partially enlarging another used state of the left and right door hinge members of FIG. 22.

FIG. 25 is a perspective view separately enlarging a second embodiment of the left and right door hinge members in FIG. 5.

FIG. 26 is a perspective view partially enlarging the installation state of the left and right door hinge members of FIG. 25.

FIG. 27a and FIG. 27b are plan views partially enlarging the used states of the left and right door hinge members of FIG. 26.

FIG. 28 is a plan view partially enlarging another used state of the left and right door hinge members of FIG. 26.

FIG. 29 is a perspective view separately enlarging left and right bottom hinge members in FIG. 13.

FIG. 30a and FIG. 30b are side views partially enlarging a used state of the left and right bottom hinge members of FIG. 29.

FIG. 31 is a perspective view enlarging a portion in which a caster is installed in FIG. 5.

FIG. 32 is a perspective view separately enlarging a caster and an installation member in FIG. 31.

FIG. 33 is a lateral cross-sectional view enlarging a part of the portion in which the caster is installed in FIG. 31.

FIG. 34a, FIG. 34b, FIG. 34c, FIG. 34d and FIG. 34e are plan views and perspective views showing a process of folding the lightweight roll container of FIGS. 4a and 4b.

FIG. 35 is a perspective view schematically showing a foldable lightweight roll container according to another embodiment of the present invention.

FIG. 36 is a perspective view of FIG. 35 partially omitted.

FIG. 37 is a perspective view enlarging a bottom member in FIG. 35.

FIG. 38 is a perspective view separately enlarging a bottom hinge member in FIG. 35.

FIG. 39a and FIG. 39b are lateral cross-sectional views enlarging a used state of the bottom hinge member of FIG. 38.

FIG. 40 is a perspective view separately enlarging a fixing member of the bottom member in FIG. 35.

FIG. 41a and FIG. 41b are lateral cross-sectional views showing separation and assembly states of the fixing member of FIG. 40.

FIG. 42a, FIG. 42b and FIG. 42c are a plan view and partially cutout side views enlarging a state of fixing the bottom member by the fixing member of FIG. 40.

FIG. 43 is a perspective view enlarging a caster and an installation member in FIG. 35.

FIG. 44a is a front view showing a state of coupling the caster and the installation member in FIG. 43.

FIG. 44b is a front view showing a state of attaching the installation member coupled with the caster to a lower edge part in FIG. 44a.

FIG. 45 is a perspective view showing a state in which the caster is installed inside four edges of a lower surface of the roll container by the installation member of FIG. 43.

FIG. 46a and FIG. 46b are a front view and a side view enlarging a part of a state in which a safety member is installed in FIG. 35.

FIG. 47a is a front view and a perspective view enlarging the safety member in FIG. 46a.

FIG. 47b is a front view and a perspective view separately enlarging the safety member in FIG. 47a.

FIG. 48a and FIG. 48b are a front view and a side view enlarging a part of a state in which a safety member of another example applied to the roll container of FIG. 35 is installed.

FIG. 49a is a front view and a perspective view enlarging the safety member of another example in FIG. 48a.

FIG. 49b is a front view and a perspective view separately enlarging the safety member of another example in FIG. 49a.

MODES FOR THE INVENTION

Hereinafter, a foldable lightweight roll container according to the present invention will be described below in detail with reference to the accompanying drawings.

FIGS. 4a and b are a perspective view and a plan view of a foldable lightweight roll container according to the present invention and FIG. 5 is a perspective view separately showing the lightweight roll container of FIGS. 4a and 4b.

The lightweight roll container of FIGS. 4a and 4b and FIG. 5 is configured by including a loading frame 100 including a rear frame member 101, left and right frame members 102 and 102' coupled rotatably to left and right ends of the rear frame member 101, respectively, left and right door members 103 and 103' coupled rotatably to front ends of the left and right frame members, a bottom member 104 coupled to a lower end of an inner side of the rear frame member 101, a bottom support means 170 installed on each inner side of the left and right door members to support the bottom member, and door locking members 106 installed on the left and right door members 103, 103', a left hinge member 200 installed to rotatably couple the left frame member 102 to a left end of the rear frame member 101, a right hinge member 300 installed to rotatably couple the right frame member 102' to a right end of the rear frame member 101, left and right door hinge members 400 installed to couple the left and right door members 103, 103' to front ends of the left and right frame members 102, 102' so as to be rotatable and ascend in a predetermined interval, left and right bottom hinge members 500 installed to couple the bottom member to a lower end of the front surface of the rear frame member 101 so as to be rotatable up and down, and casters 600 coupled to left and right ends of the lower surface of the rear frame member and the front ends of the lower surfaces of the left and right frame members, respectively.

Meanwhile, except for the casters 600, the loading frame 100, the hinge members 200 and 300, the door hinge members 400, and the bottom hinge members 500 all are made of aluminum.

FIG. 6 is a perspective view separately enlarging a part of a rear frame member 101 in FIG. 5, FIG. 7 is a lateral cross-sectional view enlarging a part of an edge part in FIG. 6, FIGS. 8a and 8b are a perspective view and a lateral cross-sectional view enlarging a part of a lower edge part in FIG. 6, FIGS. 9a and 9b are a perspective view and a lateral cross-sectional view enlarging a part of a horizontal supporter in FIG. 6, and FIGS. 10a and 10b are a longitudinal cross-sectional view and a cross-sectional view enlarging the rear frame member of FIG. 6.

The rear frame member 101 includes an edge part 110, a lower edge part 120 having both ends attached to lower ends of the inner sides of both vertical portions of the edge part, a horizontal supporter 130 having both ends attached to inner sides of both vertical portions of the edge part 110, a plurality of vertical supporters 140 having an upper end coupled by vertically passing through upper end lower surfaces of a horizontal portion of the edge part 110 and a lower end inserted into the lower edge part 120 by vertically passing through the upper and lower surfaces of the horizontal supporter 130 and the upper surface of the lower edge part 120, a sealing cap 150, and a fastening means 160.

The edge part 110 is formed in a flat U-shape in which a fastening groove portion 111 having both ends bent to correspond to each other is formed on one surface (as shown in the lateral cross-sectional view of FIG. 7) and a side section is extruded in an approximately square-shaped pipe form (shown in FIG. 7) to be cut and bent in a required length.

The lower edge part 120 includes an insertion groove 121 dented at an inner end of the upper surface with an opened upper end, a side coupling groove portion 122 dented at a direct lower portion of the insertion groove of the inner side in an open rectangle shape with open edges bent in a required length (as shown in FIG. 8a and lateral cross sectional view of FIG. 8b), a horizontal portion wall 123 partitioning an inner space up and down, and a first fastening port 124 which protrudes from the lower portion of the horizontal partition wall in a C-shape (as shown in the lateral cross sectional view of FIG. 8b) so that a middle of the lower end is isolated to fasten screws to both ends, and is formed with a side section extruded in a pipe form (as shown in the cross sectional view of FIG. 8b) and cut and used in a required length.

The horizontal supporter 130 includes a second fastening hole 131 which protrudes from the lower portion of the upper surface in a C-shape (as shown in the lateral cross sectional view of FIG. 9b) so that the middle of the lower end is isolated to fasten screws to both ends and is formed with a side section extruded in an approximately square-shaped pipe form having the C-shaped second fastening hole 131 (as shown in FIG. 9b) and cut and used in a required length.

The vertical supporter 140 is extruded in a pipe form having a small diameter to be cut and used in a required length.

The sealing cap 150 is formed of a synthetic resin and includes a cap portion 151 having a circular plate form, and an elastic fastening portion 152 formed with a plurality of elastic pieces which extends downward from a center of the lower surface of the cap portion and formed so that an interval from the lower end to the upper side is larger than an inner diameter of an upper coupling hole of first coupling holes 112 perforated by passing through upper and lower surfaces of the horizontal portion of the edge part 110 up and down as described below.

Referring to FIG. 11b, the fastening means 160 includes a fastening rope portion 161 which is woven in a rope form with a high-elastic polyurethane-based synthetic fiber with excellent abrasion resistance and elasticity to be cut in a required length, and a fixing piece portion 162 having one end fastened by pressing both ends of the fastening rope portion and the other end with a perforated screw hole.

The fastening means 160 attaches a support disk 163 with a perforated screw hole to each desired portion of the rear frame member 101 and the left and right frame members 102 and 102' by a bolt 164 as described above.

When the rear frame member 101 is assembled to the edge part 110, the lower edge part 120, the horizontal supporter 130, and the vertical supporter 140 formed as such, first, the edge part is bent in a flat U-shape so that the fastening groove portion 111 becomes an outer peripheral surface and cut in a length at which both ends of the lower edge portion and the horizontal supporter are in contact with the inner sides of the both vertical portions of the edge part.

Thereafter, a plurality of first and second coupling holes 112, 132 are perforated in the horizontal portion of the edge part 110 and the horizontal supporter 130 so as to vertically pass through the upper and lower surfaces in proportional to the number to vertically couple the vertical supporter 140, a third coupling hole 125 is vertically perforated only in the upper surface in the lower edge part 120 in response to the coupling holes, and first and second fastening holes 113 and 114 are perforated in a lower portion and an upper portion attached by contacting the lower edge part of both vertical portions of the edge part and both end of the horizontal supporter, respectively, so as to horizontally pass through inner and outer surfaces in response to the lower edge part and the first fastening port 124 and the second fastening hole 131 of the horizontal supporter.

Meanwhile, the inner diameter of the first coupling hole perforated to vertically pass through the upper surface of the horizontal portion among the first coupling holes 112 perforated to vertically pass through the upper and lower surfaces of the horizontal portion of the edge part 110 is larger than the outer diameter of the vertical supporter 140. However, the inner diameter of the first coupling hole 112 perforated in the lower surface of the horizontal portion is perforated in response to the outer diameter of the vertical supporter 140, so that the sealing cap 150 is coupled to the first coupling hole 112 perforated in the upper surface as described below.

Further, the inner diameters of the first and second coupling holes 112, 132 perforated to horizontally pass through the inner surface of the vertical portion among the first and second fastening holes 113, 114 perforated to horizontally pass through the inner and outer surfaces of both vertical portions of the edge part 110 are perforated in response to each inner diameter of the first fastening port 124 of the lower edge part 120 and the second fastening ports 131 of the horizontal supporter 130. However, the inner diameters of the first and second coupling holes 112, 132 perforated in each outer surface of both vertical portions are perforated to be larger than each inner diameter of the first fastening port and the second fastening ports to couple the sealing cap 150 as described below.

Further, as described below, in upper and lower sides of each of both vertical portions of the edge part 110, bolt fastening holes 115 are perforated in a pair of upper and lower sides by horizontally passing through the inner and outer surfaces so as to attach left and right hinge members 200, 300 and the left and right door hinge members 400, 400' that rotatably connect the rear frame member 101 and the left and right frame members 102, 102' and the left and right frame members and the left and right door members 103, 103'.

Further, in upper sides of the left and right portions of the front surface of the lower edge part 120, bolt holes 126 are perforated in a pair to fix the left and right bottom hinge members 500 rotatably coupling the bottom member 104 with a bolt.

Further, in respective lower ends of both vertical portions of the edge part 110 and the left and right ends of the lower edge part 120 corresponding thereto, as described below, outer and inner fastening holes 116, 127 for attaching the casters 600 with bolts and nuts are perforated in a pair to pass through the front and rear surfaces, respectively.

Next, while both ends of the horizontal supporter 130 are in contact with the respective inner surfaces of both vertical portions perforated with the first fastening holes 113 of the edge part 110, the horizontal supporter is fastened to both ends of the second fastening port 131 of the horizontal supporter through each outer end of the first fastening holes with a screw to horizontally attach the inner surfaces of both vertical portions.

In addition, while both ends of the lower edge part 120 are in contact with the lower ends of the respective inner surfaces of both vertical portions perforated with the second fastening holes 114 of the edge part 110, the lower edge part is fastened to both ends of the first fastening port 124 of the lower edge part through each outer end of the second fastening holes with a screw to horizontally attach the lower inner surfaces of both vertical portions of the horizontal supporter.

As assembled above, the first and second coupling holes 112 and 132 perforated in the horizontal portion of the edge part 110 and the horizontal supporter 130, respectively, and the third coupling holes 125 perforated only in the upper surface of the lower edge part 120 all coincide with each other on a vertical line.

In this state, the respective lower ends of the vertical supporters 140 are coupled to the inner bottom of the lower surface in which the third coupling holes of the lower edge part 120 are not perforated by vertically passing through the first to third coupling holes 112, 132, and 125 on each vertical line sequentially from the upper side.

When coupled as such, the respective upper ends of the vertical supporters 140 are installed between the inner, upper, and lower surfaces of the horizontal portion of the edge part 110 perforated with the first coupling hole 112 to be vertically passed.

In this state, when the sealing cap 150 is coupled to the first coupling hole 112 of the upper surface, while a middle portion of the elastic fastening portion 152 with the plurality of elastic pieces formed so that the intervals are formed larger than the inner diameter of the first coupling hole from the lower end to the upper side passes through the first coupling hole of the upper surface, the intervals of the plurality of elastic pieces are narrowed and then separated by the self-elasticity when passing through the first coupling hole to be hooked to the lower end of the first coupling hole of the upper surface, and the lower end of the fastening portion is in contact with the respective upper ends of the vertical supporters 140 located between the upper and lower surfaces of the horizontal portion of the edge part 110.

Accordingly, the sealing cap 150 is firmly fixed to the first coupling hole 112 of the upper surface so as not to be arbitrarily separated and seals the first coupling hole and the inner portion thereof so as to prevent foreign materials from being introduced thereinto and maintain the cleanliness and aesthetics of the roll container even in long-term use. In addition, the lower end of the elastic fastening portion 152 is in contact with the respective upper ends of the vertical supporters 140 to prevent the vertical supporter from being moved vertically or separated by vibration or impact during the use of the roll container.

Then, the edge part 110 and the lower edge part 120 and the horizontal supporter 130 and the vertical supporters 140 are firmly assembled with each other without welding to obtain the rear frame member 101.

FIG. 11a is a perspective view separately enlarging parts of the left and right frame members 102, 102' in FIG. 5. However, upper and lower lengths of the left and right frame members 102 and 102' are the same as the rear-side frame member 101, while the front and rear widths are also preferably made to be smaller than the left and right widths of the rear-side frame member, and fastening means 160 is configured to further include left and right bottom support means 170 and a left and right grip means 180 coupled to a rear-side vertical portion of the border portion 110 and installed in the left and right frame members, respectively.

FIG. 11b is a perspective view enlarging a fastening means in FIG. 11a. The fastening means 160 includes a fastening strap portion 161 having a required length, which is knitted by a highly elastic polyurethane fiber, and a fixation piece portion 162 in which both ends of the fastening strap portion are together fastened to one end portion, and a screw hole is perforated at a center of the other end portion, and are attached to and installed in required portions of the rear-side frame member 101 and the left and right frame members 120 and 120' with a screw.

FIG. 11c is a perspective view separately enlarging a bottom support means in FIG. 11a and FIG. 11d is a lateral cross-sectional view enlarging the coupled bottom support means of FIG. 11c.

The left and right bottom support means 170 includes a support plate 171 formed to be used by cutting extruded aluminum to a required length, and a bumper plate 172 formed by an elastic body such as urethane, and coupled to an inner surface of the support plate.

The support plate 171 includes a bottom piece 1711, fastening portions 1712 vertically formed in a form of an open rectangle shape with open edges bent in a required length (as shown in the cross sectional view of FIG. 11c) to correspond to both ends of the bottom piece, a support piece 1713 horizontally extended with a predetermined length on one end of the bottom piece, a horizontal piece 1714 horizontally extended in parallel longer than the support piece at a predetermined interval from the top of the outer surface of the fastening portion to which the support piece is horizontally extended to a lower end among the fastening portions, a vertical piece 1715 vertically extended so that a top end is coupled to a top end portion of a side surface coupling groove portion 122 on an outer end of the horizontal piece, and a coupling piece 1716 extended downward to be coupled to the lower end portion of the side surface coupling groove portion on the lower end of the vertical piece, and as a result, a side cross section is configured in a form as shown in the cross sectional view of FIG. 11d.

The buffer plate 172 includes a bottom portion 1721 seated on the top surface of the bottom piece 1711 and a coupling portion 1722 extended symmetrically in a form of approximately a T-shape to face the outside on each top end and coupled to fastening portions 1712, and the side cross section is configured in a form as shown in the cross-sectional view of FIG. 11d.

When the coupling portions 1722 are inserted into the respective fastening portions in a lateral direction of the support plate 171 and the bottom surface of the bottom portion is coupled to be the top surface of the bottom piece 1711 to be supported, the buffer plate 172 is assembled to be in close contact with the support plate by autonomous elasticity.

In the assembled bottom support means 170, before a lower border portion 120 is assembled to a lower end of each border portion 110 of the left and right door members 103 and 103', the top end of the vertical piece 1715 and the coupling piece 1716 are inserted and coupled into upper and lower end portions of the side surface coupling groove portion 122 in a lateral direction of the lower border portion and located at a desired portion of the side surface coupling groove portion, the vertical piece and a screw are fastened to a screw hole perforated, and attached.

Since the installed bottom support means 170 firmly supports left and right portions of the bottom member when the bottom member 104 is set in a horizontal state, the bottom support means 170 may stably load and transport the article despite long-time use.

FIG. 11E is a perspective view enlarging left and right grip means in FIG. 11A.

The left and right grip means includes a body portion 181 in which a flat cross section is formed in a form of a flat U-shape by high-elastic urethane rubber so that a side cross section is fastened in a state to cover the border portion 110, and both-sides settlement portions 182 vertically and horizontally bent and extended inward in two stages to correspond to each other on both ends of the body portion and coupled to cover both ends of a fastening groove portion 111 of the border portion, and the flat cross section which is extruded is cut with a required length to be coupled to the vertical portion of the border portion by using autonomous elasticity.

The grip means 180 couples the left and right frame members 102 and 102' which everyone may conveniently and easily grip when moving the rolltainer to an upper portion of a front end-side vertical portion among both vertical portions of each border portion 110 to grip and move a cold border portion without wearing gloves in cold weather.

FIG. 11f is a perspective view enlarging a support member in FIG. 11a.

The support member 105 is installed to horizontally cross an upper portion of a vertical portion which becomes a front end of each of the left and right frame members so as to prevent a phenomenon in which when the left and right door members 103 and 103' are made to be lower than the left and right frame members 102 and 102', if the left and right frame members 102 and 102' are rotated at 90 degrees on left and right ends of the rear-side frame member 101 and made to be perpendicular to each other to become left and right surfaces of the load frame 100, a front surface between the top ends of the left and right frame members and the top ends of the left and right door members is opened in proportion to a height difference, and as a result, articles are poured out through the top ends of the left and right door members with carelessness when the articles are loaded on the load frame and moved higher than the top ends of the left and right door members.

The support member 105 is configured to include a support fixture 1051 made of aluminum and having a rectangular pipe form, a hinge portion 1052 attached to any one of the upper portions of the vertical portion of the border portion 111 which becomes the front end of each of the left and right frame members 102 and 102' and axially installing the support fixture to be vertically rotated, a suspension pin portion 1053 attached to the upper portion of the other vertical portion to which the hinge portion is not attached to correspond to the hinge portion, a bearing portion 1054 attached to one end of the support fixture and axially coupled to the hinge portion, a ring portion 1055 attached to the other end of the support fixture and suspended on the suspension pin portion, and a support fixture fastening portion 1056 having a flat cross section with a flat U-shaped form, and attached to a lower portion of the vertical portion to which the hinge portion is attached and rotated downward on the hinge portion as the axis and coupled with the other end portion when not using the support fixture to be fastened to fix the support fixture not to be arbitrarily separated.

FIG. 12a is a perspective view enlarging left and right door members in FIG. 5.

The left and right door members 103 and 103' include the border portion 110 which is extruded in a rectangular pipe form having a form with a cross section as shown in FIG. 7 and cut and bent with a required length and has a form of a flat U-shape, a horizontal support fixture 130 which is extruded in a rectangular pipe form with a form as shown in FIG. 9b and is cut and used with a required length, a vertical support fixture 140 which is extruded in a pipe form having a small diameter and cut and used with a required length, and a sealing cap 150, and the left and right door members 103 and 103' are the same as the rear-side frame member 101, and the left and right frame members 102 and 102' in that the left and right door members 103 and 103' are firmly assembled and configured without welding.

However, vertical lengths of the left and right door members 103 and 103' are equal to or shorter than those of the rear-side frame member 101, and the left and right frame members 102 and 102' as necessary, and the left and right door members 103 and 103' are different from rear-side frame member 101, and the left and right frame members 102 and 102' in that the horizontal widths of the left and right door members 103 and 103' are widths acquired by dividing the horizontal width of the rear-side frame member into two, and as the lower border portion 120, the same border portion as the border portion 110 in which the side cross section is extruded in a form as shown in FIG. 7 is used and a fastening groove portion 111 is assembled and configured downward.

When the same border portion as the border portion 110 is used as the lower border portion 120, a third coupling hole 125 is perforated and a lower end portion of the vertical support fixture 140 is coupled only to an upward bottom surface of the lower border portion.

Further, a bolt fastening hole 115 is perforated which is used for making upper and lower portions of a left end at both vertical portions of the border portion 110 of the left door member 103 and upper and lower portions of a right end at both vertical portions of the border portion of the right door member 103' become a pair, and a bolt fastening hole is also perforated which is used for attaching the door lock member 106 even to the upper portion of the vertical portion to correspond to both vertical portions of the border portion of the left and right door members corresponding to each other.

The number of coupled horizontal support fixtures in the rear-side frame member 101, and the left and right frame members 102 and 102' and the left and right door members 103 and 103' may be 1 or 2 or more according to a specification of the load frame 100 and the number of vertical support fixtures 140 may be 2 or 3 or more.

FIG. 13a is a perspective view separately enlarging a bottom member in FIG. 5, FIG. 13b is a lateral cross-sectional view enlarging an edge member in FIG. 13a, FIG. 13c is a perspective view separately enlarging a door support means in FIG. 13a, FIG. 13d is a lateral cross-sectional view enlarging the door support means in FIG. 13a, and FIGS. 14a and 14b are a front cross-sectional view and a lateral cross-sectional view enlarging an assembly state of the bottom member of FIG. 13.

The bottom member 104 is configured to include a bottom material 141 having a rectangular flat plate, four front and rear and left and right border materials 142 coupled to cover four surfaces of the bottom material, a fastening material 143 fastening four corners of the border material, and a plurality of support materials 144 coupling both ends to a lower side of an inner surface of two border materials corresponding thereto to cross the bottom surface of the bottom material.

The border material 142 includes an outer-surface settlement groove portion 1421 in which the side cross section has a form of an elongated C-shape, and an insertion groove portion 1422 horizontally dented at a vertical interval corresponding to a thickness of the bottom material 141 so that a rear end is opened to an upright portion of the top surface, and the side cross section which is extruded in a rectangular pipe form (as shown in the cross sectional view of FIG. 13b) is cut and used with a required length.

The fastening material 143 includes first fastening pieces 1431 and 1432 connected to be orthogonal to each other and having a flat cross section with a form of an L-shape, and having a vertical width and a thickness corresponding to those of the settlement groove portion 1421.

The support material 144 is formed in the rectangular pipe form similarly to the horizontal support fixture 130 having a first fastener 131.

When the bottom material 141, four border materials 142 and four fastening materials 143, and a plurality of support materials 144 are assembled, rectangular inserters 1421 are perforated at a predetermined interval to correspond to the number of support materials 144 and the side cross section on the inner surface of each of front and rear-side border materials corresponding to each other among the four border materials, and screw holes 145 are perforated which fasten screws to both end portions of the border material and the first and second fastening pieces 1431 and 1432 corresponding thereto.

Thereafter, the first and second fastening pieces 1431 and 1432 are coupled to the front side corresponding to two corners and both end portions of each settlement groove portion 1421 of the left and right border materials on the side while coupling three except for the rear border material among four border materials 142 so that four surfaces of the bottom material 141 is inserted into each insertion groove portion 1422 and fixed to the screw holes 145 through fastening of the screws.

Then, while in a state in which the left and right border materials 142 are coupled to the bottom material 141 and the front side is reversed and the plurality of support materials 144 are arranged to cross in close contact with the bottom surface of the bottom material 141, the front end portion of each of the support materials is inserted and coupled into each settlement groove portion 1421 perforated in the front border material.

In addition, first and second fastening pieces 1431 and 1432 corresponding to one fastening materials 143 are coupled to the left and right ends of the rear border material 142 and fixed by the screw, and then first and second fastening pieces which are not fastened to the rear border material among the fastening materials are coupled to the other ends of the left and right border materials which are not coupled to both ends of the front border materials, and the rear end portion of each of the plurality of support materials is inserted into each of the insertion holes 1421 of the rear border material.

By the coupling, other first and second fastening pieces 1431 and 1432 which are not fixed to both ends of the rear border material 142 are coupled to the respective other end portions of the left and right border materials 142 and the respective perforated screw holes 145 match each other, and as a result, when the screws are fastened to the screw holes 145 and fixed, the lower plate member 104 assembled firmly is acquired.

Meanwhile, a suspension pin 146 is fastened to a desired position on the bottom of the front border material 142 or the bottom of any one of the support materials 144 to correspond to the fastening means installed in the rear frame member 101.

The suspension pin 146 pulls and suspends a fastening tie portion 161 of the fastening means 160 while vertically rotating the lower plate member 104 and contacting the lower plate member 104 to the lower portion of the inner surface of the rear frame member 101 in order to fold the rolltainer as described below to closely attach and fix the folded lower plate member to the lower portion of the inner surface of the rear frame member 101, thereby preventing an inverse rotation or folding state from being arbitrarily released.

The door support means 190 is configured to include a support plate material 191 formed to be used by cutting extruded aluminum to a required length, and a bumper plate material 192 formed by an elastic body such as urethane, and coupled to an inner surface of the support plate.

The support plate material 191 includes fastening groove portions 1912 vertically formed on front and rear ends of the bottom plate to correspond to each other in the form of an open rectangle shape with open edges bent in a required length (as shown in FIG. 13c), a top coupling protrusion portion 1913 vertically extended on the top of one fastening groove portion of both fastening groove portions to be coupled to the top portion of the side coupling groove portion 122 of the lower border portion 120, and protruded on the top in a rectangular shape, and a bottom coupling protrusion portion 1924 protruded on a corner at which the bottom of one vertical portion and one end of the bottom piece are orthogonal to be coupled to the bottom portion of the side coupling groove portion in the rectangular form corresponding to the top coupling protrusion portion, and a side cross section is configured in the form as shown in FIG. 13d.

The buffer plate member 172 includes a bottom plate portion 1921 seated on the top surface of the bottom plate 1911, both vertical piece portions 1922 of the bottom plate portion, and coupling piece portions 1723 symmetrically extended in a T-shaped form toward the outside on the top end of each of the both vertical piece portions and coupled to fastening grooves 1912, and the side cross section is configured in a form as shown in the cross sectional view of FIG. 13d.

In the case of the buffer plate material 102, when the coupling piece portions 1923 are inserted into the respective fastening grooves 1912 portions in a lateral direction of the support plate material 191, and the bottom surface of the bottom plate portion 1921 is supported and coupled to be the top surface of the bottom plate 1911, the buffer plate material is assembled to be in close contact with the support plate 191 by autonomous elasticity.

The door support means 190 is firmly attached when tightening screws to a plurality of screw holes perforated in a vertical portion upper part and in the settlement groove portion corresponding thereto horizontally at a predetermined interval while positioning a top coupling protrusion portion 1913 and a bottom coupling protrusion portion 1914 are coupled to the settlement groove portion to be inserted into upper and lower ends of the settlement groove portion 1421 on the front surface of the front border material in the lateral direction before assembling the front end of each of the left and right border materials 142 to both left and right ends of the front border material 142.

In the door support means 190, as described above, lower end portions of a right end and a left end corresponding to each other are interposed between the bottom plate 1911 of the support plate material 191 and both fastening groove portions 1912 while closing and moving down the left and right door members 103 and 103' and the bottom surface of the corresponding part is seated when being stably supported by elastic and buffering actions, and as a result, the door members are not to be arbitrarily opened and friction or metal sound is prevented from being generated due to external shock while moving.

Meanwhile, since the buffer plate 172 and the buffer member 192 are configured to be coupled to or separated from the support plate 171 and the support plate material 191, respectively in the lateral direction, when the buffer plate 172 and the buffer member 192 are abraded or damaged due to long-term use, the buffer plate 172 and the buffer member 192 may be easily replaced.

Further, the door lock members 106 are installed in the left and right door members 103 and 103' to prevent the left and right door members from being arbitrarily opened when the left and right door members are closed.

FIG. 12B is a plan view showing a locked state by enlarging a door locking member in FIG. 12A. The door lock member 106 is configured to include left and right coupling pieces 1061 and 1062 which couple each of both vertical parts of right and left ends corresponding to each other to the upper part of the fastening groove portion 111 when closing the front surface of the load frame 100 with the left and right door members 103 and 103', left and right ring portions 1063 and 1064 combined to be vertically communicated when extending to the front end of each of the left and right coupling pieces in a pipe form so that inner and outer diameters are equal to each other and closing the left and right door members, and a lock pin 1065 having plane cross sections which are symmetric with each other in the form of a hook, and coupled to left and right ring portions combined to be communicated vertically from the upper side to prevent the left and right ring portions from being separated and lock the left and right door members not to be arbitrarily opened.

The lock pin 1065 includes a pin portion 1065a having a diameter with a predetermined length corresponding to the inner diameter of the left and right ring portions 1063 and 1064, a head portion 1065b formed on the top of the pin portion to be larger than the inner diameter of the pin portion, and a grip portion 1065c vertically extended to the top of the head portion in the form of a "T".

Accordingly, the lock pin 1065 may be coupled to or separated from the left and right ring portions 1063 and 1064 conveniently and easily with the grip portion 1065c.

FIG. 15 is a perspective view separately enlarging a left hinge member in FIG. 5, FIG. 16 is a perspective view enlarging a part of an installation state of the left hinge member of FIG. 15, and FIGS. 17a to 17c are plan views partially showing a used state of the left hinge member of FIG. 15.

The left hinge member 200 is configured to include first and second left hinge pieces 201 and 202 including first and second left plate bodies 211 and 221 each coupled to the fastening groove portion 111 having a side cross section, and first and second left fixation bearing portions 212 and 222 protruded and extended to correspond to front end portions of inner and outer surfaces of each of the first and second left plate bodies and first and second left bearing portions 213 and 223 protruded and extended to rear end portions of the inner and outer surfaces of the first and second left plates bodies to correspond to the first and second left fixation bearing portions, includes first and second left hinge pieces 201 and 202 having a plane cross section with a form of two circles with tangents connected by a line (as shown in FIG. 15) and a similar form symmetric thereto, a third left plate body 231 having a plane cross section with an arc form, a third left hinge piece 203 including third left and right bearing portions 232 and 233 having the same diameter as the first and second left bearing portions 213 and 223 on both ends of the third left plate body to have a plane cross section with a form of two circles connected by an arc (as shown in FIG. 15), a first left pin 204 axially installing the first left bearing portion and the third left bearing portion to be rotated, a second left shaft pin 205 axially installing the second left bearing portion and the third right bearing portion to be rotated, and a left fixation shaft pin 206 axially coupling and fixing the first left fixation bearing portion and the second left fixation bearing portion.

The first left hinge piece and the first left fixation bearing portion 212 are provided in two pieces which are separated and protruded to upper and lower portions of the front part of the inner surface of the first left plate body 211, for example, and the second left hinge piece 202 and the second left fixation bearing portion 222 are interposed between two first left fixation bearing portions, and provided in one which is protruded to a middle portion of the front portion of the outer surface of the second left plate body 221.

Meanwhile, the first and second left bearing portions 213 and 223 of the first and second left hinge pieces 201 and 202 are produced in each three at a predetermined interval in upper, middle, and lower portions of the inner surfaces of the first and second left plate bodies 211 and 221, as an example.

Diameters of the first and second left fixation bearing portions 212 and 222 are equal to those of the first and second left bearing portions 213 and 223, while thicknesses of the first and second left fixation bearing portions are made to be smaller than those of the first and second left bearing portions and the outer diameters of the first and second left fixation bearing portions are made to be smaller than those of the first and second left bearing portions, and as a result, inner ends of outer peripheries of the first and second left fixation bearing portions are positioned on the same line as inner ends of inner peripheries of the first and second left bearing portions.

Further, the center of each of the first and second left fixation bearing portions 212 and 222 is positioned on the same line as the front-end surfaces of the first and second left plate bodies 211 and 221, and the center of each of the first and second left bearing portions 213 and 223 is positioned on a line separated in a rear direction from each rear-end at a predetermined interval.

The third left hinge piece 203 includes a third left plate body 231 having the plane cross section with the arc form, and third left and right end bearing portions 232 and 233 having the same diameter as the second left front and rear bearing portions 213 and 223 on both ends of the third left plate body.

As an example, when the first and second left bearing portions 213 and 223 are provided in three in the upper, middle, and lower portions, the third left and right end bearing portions 232 and 233 are formed to be separated in each of two vertically in both ends of the third left plate body 231, and interposed between the first and second left bearing portions which are provided in each of three in the upper, middle, and lower portions.

Further, first and second shaft pins 204 and 205 include a head having a larger diameter than a shaft hole on the top end and a fastening groove of the E-ring surrounded on the outer periphery of the bottom end portion, and the left fixation shaft pin 206 may include a head 216 having a larger diameter than the shaft hole on the top end and a handle 226 vertically extended in the form of a "T" on the top end.

When a rear end of the left frame member 102 is pivotably coupled to and installed in a left end of the rear frame member 101 with two left hinge members 200 configured as above, one of two left hinge members sequentially coupled to the first left plate body 211 of the first left hinge piece 201, moved, and first coupled through the bottom end of the fastening groove portion 111 of a right vertical part of both vertical parts of the border portion 110 of the left frame member is attached by matching bolt holes perforated in upper and lower portions in the middle of the first left plate body with a pair of upper and lower upper bolt fastening holes 115 perforated to horizontally penetrate the inner and outer surfaces on the upper side of the rear vertical part and tightening the bolt and the nut, and the other one which is coupled later is attached by matching the bolt holes perforated in the upper and lower portions in the middle of the first left plate body with a pair of upper and lower bottom bolt fastening holes perforated to horizontally penetrate the inner and outer surfaces on the bottom of the rear vertical part, and fastening the bolt and the nut.

Further, the second left plate bodies 221 of two second left hinge pieces 202 are sequentially coupled and moved to the fastening groove portion 111 of the left vertical part of both vertical parts of the border portion 110 of the rear frame member 101 through the bottom end, and one which is first coupled is attached by matching fastening bolt holes perforated in upper and lower portions in the middle of the second left plate body with a pair of upper and lower fastening holes perforated to horizontally penetrate the inner and outer surfaces on the upper side of the left end vertical part and fastening the bolt and nut, and the other one which is coupled later is attached by matching bolt holes perforated in upper and lower portions in the middle of the second left plate body with a pair of upper and lower bottom bolt fastening holes perforated to horizontally penetrate the inner and outer surfaces on the lower side of the left end vertical part, and fastening the bolt and the nut.

When the first and second left hinge pieces 201 and 202 are attached to rear upper and lower portions of the left frame member 102 and left upper and lower portions of the rear frame member 101, respectively, the first and second left fixation bearing portions 212 and 222 and the first and second left bearing portions 213 and 223 of each of the first and second left hinge pieces correspond to each other.

In such a state, while the third left bearing portions 232 of the third left hinge piece 203 are interposed between the first left bearing portions 213 of the first left hinge piece 201 attached to the rear upper and lower portions of the left frame member 102 and shaft holes thereof are vertically communicated, the first shaft pin 204 is penetrated and inserted in the upper side is pivotably axially installed by fastening an E-ring to the fastening groove formed on a lower end portion exposed to the lower portion, and the third right end bearing portions 233 of the third left hinge piece are interposed between the second left bearing portions 223 of the second left hinge piece 202 attached to the upper and lower portions of the left end of the rear frame member 101 and axially installed to be pivotable to the second left pin 205, respectively.

If the left frame member 102 axially installed as such is rotated from the left end of the rear frame portion 101 using the first and third left hinge pints 201 to 203 and the first and second left pins 204 and 205, the arc-form third left plate body is pivoted at 90 degrees on the second left pin as the axis, and the second left fixation bearing portion 222 of the second left plate body 221 is inserted and interposed between the first left fixation bearing portions 212 of the first left plate body 211 and the outer peripheral surface of the first left fixation bearing portion is supported on the left end of the border portion of the rear frame and the outer peripheral surface of the second left fixation bearing portion is supported on the rear end of the border portion of the left frame member, and as a result, pivoting is stopped.

Since the first left fixation bearing portions 212 and the shaft holes of the second left fixation bearing portion interposed there between are vertically communicated, when the left fixation shaft pin 206 is inserted and axially coupled on the upper side by penetrating the shaft holes, the first and second left bearing portions 213 and 223 and the third left and right end bearing portions 232 and 233 axially coupled with the first and second left pints 204 and 205, respectively are not pivoted, and as a result, the left frame member 102 is pivoted at 90 degrees to the front side from the left end of the rear frame portion 101 and fixed while being perpendicular to each other to become a left surface of the load frame 100.

In such a state, when the left fixation shaft pin 206 axially coupled to the first and second left fixation bearing portions 212 and 222, the fixation state is released, and as a result, the left frame member 102 may be rotated to the left rear side of the rear frame member 101, and at this time, a range in which the left frame member is rotated forward and backward is 270 degrees at which by an action in which from a position at which the left frame member is rotated to the front side from the left end of the rear frame portion and perpendicular to each other, the left and right widths of the third left plate body 231, and the first and second right shaft ins 204 and 205 and the first and second left bearing portions 213 and 223, and the third left and right end bearing portions 232 and 233 are linked and rotated, the left frame member is rotated to the left side of the rear surface of the rear frame member and the left surface of the left frame member is thus parallel to the rear surface of the rear frame member.

When the left surface of the left frame member 102 and the left side of the rear surface of the rear frame member 101 are parallel to each other as such, a space receiving the left door member 103 installed so that a range rotated forward and backward by the left and right door hinge members 400 becomes 270 degrees on the front end of the left frame member is formed between the left surface of the left frame member and the rear surface of the rear frame member as described below, and as a result, the rear frame member and the left frame member, and the left door member are folded while being overlapped in parallel to each other, therefore, the folding thickness is minimized.

In this process, the left fixation shaft pin 206 separated from the first and second fixation bearing portions 212 and 22 is coupled to any one of the first and second left fixation bearing portions, the left fixation shaft pin 206 need not be separately kept, ensuring convenience and that there need be no concern about loss.

FIG. 18 is a perspective view separately enlarging a right hinge member in FIG. 5, FIG. 19 is a perspective view partially enlarging an installation state of the right hinge member of FIG. 18, and FIGS. 20a to 20c are plan views partially enlarging a used state of the right hinge member of FIG. 18.

The right hinge member 300 is configured to include a first right hinge piece 301 including a first right plate body 311 having a plane cross section with a form of a straight line with a curved line starting from an end (as shown in FIG. 18), and a rear piece coupled and fixed to the fastening groove portion 111, a first right bearing portion 312 protruded and extended to the front end of the inner surface of the front piece of the first right plate body toward the inner side, and a first right fixation bearing portion 313 protruded and extended to the rear side of the outer surface of the front piece, and having the plane cross section (as shown in FIG. 18), a second right hinge piece 302 including a second right plate body 321 coupled to the fastening groove portion 111, a second right bearing portion 322 extended to the end portion of a bending piece of the rear side of the outer surface of the second right plate body, and a second right fixation bearing portion 323 extended to an outer end of a straight-line piece of the front side of the outer surface of the second right plate body, and having the plane cross section (as shown in FIG. 18), and a right shaft pin 303 axially installing the first and second right bearing portions to be rotated, and a right fixation shaft pin 304 axially coupling the first and right fixation bearing portions not to be rotated.

Further, like the first and second shaft pins 204 and 205, the right shaft pin 303 and 205 include a head having a larger diameter than a shaft hole on the top end and a fastening groove of the ring surrounded on the outer periphery of the bottom end portion, and like the left fixation shaft pin 206, the right fixation shaft pin 304 may include a head having a larger diameter than the shaft hole on the top end and a handle vertically extended in the form of a "T" on the top end.

Meanwhile, as an example, each of the first right bearing portion 312 and the first right fixation bearing portion 313 of the first right hinge piece 301 separated and protruded to the upper and lower portions is provided in two, the second right bearing portion 322 of the second right hinge piece 302 separated and protruded to the upper, middle, and lower portions is provided in three, and two first right bearing portions are interposed therebetween, and the second right fixation bearing portion 323 is provided in one to be interposed between two first right fixation bearing portions.

When a rear end of the right frame member 102 is pivotably coupled to and installed in a right end of the rear frame member 101 with two right hinge members 300 configured as above, one of two right hinge members sequentially coupled to the second right plate body 321 of the second right hinge piece 302, moved, and first coupled through the bottom end of the fastening groove portion 111 of a right vertical part of both vertical parts of the border portion 110 of the left frame member is attached by matching bolt holes perforated in upper and lower portions in the middle of the first left plate body with a pair of upper and lower upper bolt fastening holes perforated to horizontally penetrate the inner and outer surfaces on the upper side of the rear vertical part and tightening the bolt and the nut, and the other one which is coupled later is attached by matching the bolt holes perforated in the upper and lower portions in the middle of the second right plate body with a pair of upper and lower bottom bolt fastening holes perforated to horizontally penetrate the inner and outer surfaces on the bottom of the rear vertical part, and fastening the bolt and the nut.

Further, the first right plate bodies 311 of two second right hinge pieces 301 are sequentially coupled and moved to the fastening groove portion 111 of the right vertical part of both vertical parts of the border portion 110 of the rear frame member 101 through the bottom end, and one which is first coupled is attached by matching fastening bolt holes perforated in upper and lower portions in the middle of the first right plate body with a pair of upper and lower fastening holes perforated to horizontally penetrate the inner and outer surfaces on the upper side of the left end vertical part and fastening the bolt and nut, and the other one which is coupled later is attached by matching bolt holes perforated in upper and lower portions in the middle of the first right plate body with a pair of upper and lower bottom bolt fastening holes perforated to horizontally penetrate the inner and outer surfaces on the rear end vertical part, and fastening the bolt and the nut.

When the first and second right hinge pieces 301 and 302 are attached to rear upper and lower portions of the right frame member 102 and right upper and lower portions of the rear frame member 101, respectively, the first and second right fixation bearing portions 313 and 323 and the first and second right bearing portions 312 and 322 of each of the first and second right hinge pieces correspond to each other.

In such a state, while the first right bearing portions 312 of the first right hinge piece 301 are interposed between the second right bearing portions 322 of the second right hinge piece 302 attached to the upper and lower portions of the rear end of the right frame member 102' and shaft holes thereof are vertically communicated, the right shaft pin 303 is penetrated and inserted on the upper side and is axially installed to be pivoted by fastening the E-ring to the fastening groove formed on the lower end portion exposed to the lower portion.

When the right frame member 102' axially installed as such is pivoted at 90 degrees counterclockwise to be perpendicular to the right end of the rear frame portion 101 on the first and second right hinge pieces 301 and 302 and the right shaft pin 303 as the axis, the second right fixation bearing portion 323 of the second right hinge piece is interposed between the first right fixation bearing portions 313 of the first right hinge piece and an outer end part of the second right fixation bearing portion is supported on the first right plate body 311 between the first right fixation bearing portions, and as a result, the outer end part is stopped and not pivoted any longer.

By such an operation, since the shaft holes of the second right fixation bearing portion 323 interposed between the upper and lower first right fixation bearing portions 313 are vertically communicated, when the right fixation shaft pin 304 is inserted and axially coupled on the upper side to penetrate the shaft hole, the right frame member 102' is pivoted at 90 degrees to the front side from the right end of the rear frame portion 101 and fixed to be perpendicular to each other to become the right surface of the load frame 100.

In such a state, when the right fixation pin 304 axially coupled to the first and second right fixation bearing portions 313 and 323 is separated, the fixation state is released and the right frame member 102' is rotated counterclockwise to be parallel to the front surface of the rear frame member 101 and in this case, a range in which the right frame member is rotated forward and backward becomes 90 degrees at which the right frame member is parallel to the front surface of the rear frame member from a position of being perpendicular to the right end of the rear frame member.

When the left surface of the right frame member 102' is parallel to the front surface of the rear frame member 101, a space receiving the lower plate member 103 vertically erected by upward rotation in a horizontal state is formed between the left surface of the right frame member and the front surface of the rear frame member as described below, the rear frame member and the right frame member, and the lower plate member are folded while being overlapped in parallel to each other, the folding thickness is minimized.

In this process, the right fixation shaft pin 304 separated from the first and second right fixation bearing portions 313 and 323 is coupled to any one of the first and second right fixation bearing portions, the left fixation shaft pin 206 need not be separately kept, ensuring convenience and that there need be no concern about loss.

FIG. 21 is a perspective view separately enlarging a first embodiment of the left and right door hinge members in FIG. 5, FIG. 22 is a perspective view partially enlarging the installation state of the left and right door hinge members of FIG. 21, FIGS. 23A to 23C are plan views partially enlarging a used state of the left and right door hinge members of FIG. 22, and FIG. 24 is a plan view partially enlarging another used state of the left and right door hinge members of FIG. 22.

The left and right door hinge members 400 according to the first embodiment of FIG. 21 is configured to include a first hinge portion 401 including a first hinge plate body 411 coupled and fixed to the fastening groove portion 111 of the border portion 110, a first hinge piece 412 perpendicularly extended to the left end side of the front surface of the first hinge plate body, and first upper, middle, and lower bearing portions 413, 414, and 415 extended to be separated on the front end of the first hinge piece at an equal interval, and having the plane cross section having a L-shaped form with a C-shaped hook at an end of the horizontal leg of the L-shape (as shown in FIG. 21), a second hinge portion 402 including a second hinge plate body 421 coupled and fixed to the fastening groove portion, a second hinge piece 422 extended to the front end side of the outer surface of the second hinge plate body to be perpendicular with the same vertical length and extension width as the first hinge piece, and a second upper bearing portion 423 and a second lower bearing portion 424 of which each lower end is supported on the top ends the first middle bearing portion and the first lower bearing portion and each upper end is supported on the lower end of each of the first middle bearing portion and the first lower middle bearing portion, and having the plane cross section with a L-shaped form with a C-shaped hook at an end of the horizontal leg of the L-shape (as shown in FIG. 21), and a door hinge shaft 403 axially coupling the first upper, middle, and lower bearing portions and the second upper and lower bearing portions to be vertically matched.

When the left end of the left door member 103 is installed on the left end of the left frame member 102 with the left and right door hinge member 400 configured as such, while among both vertical parts of the border portion 110 of the left frame member, one which is first coupled by sequentially coupling and moving the first hinge plate body 411 of the first hinge portion 401 of each of two door hinge members through the lower end of the fastening groove portion 111 is positioned on the upper side of the front vertical part and the other one which is coupled later is positioned on the lower side of the front vertical part, a pair of upper and lower bolt fastening holes perforated to horizontally penetrate the inner and outer surfaces of the upper and lower sides of the front vertical part and a pair of upper and lower bolt holes perforated on the first hinge plate body corresponding thereto are matched and attached by tightening the bolt and the nut, next, while one which is first coupled by sequentially coupling and moving the second hinge plate body 421 of the second hinge portion 402 of each of two door hinge members to the lower end of the fastening groove portion of the left vertical part of the left door member is positioned on the upper side of the left vertical part and the other one which is coupled later is positioned on the lower side of the left vertical part, a pair of upper and lower bolt fastening holes perforated to horizontally penetrate the inner and outer surfaces of the upper side and the lower side of the left vertical part and a pair upper and lower bolt fastening holes perforated on the second hinge plate body corresponding thereto are matched and attached by tightening the bolt and the nut, and thereafter, while the lower end of the second upper bearing portion 423 of the second hinge plate body is coupled to be supported on the upper end of the middle bearing portion 414 of the first hinge plate body and the lower end of the second lower bearing portion 424 is coupled to be supported on the upper end of the first bearing portion 415 and the shaft holes of the first upper bearing portion 413 and the middle and lower bearing portions and the second upper and lower bearing portions are vertically communicated, when the door hinge shaft 403 is coupled on the upper side and the E-ring is fastened to the lower end exposed downward, the left door member is axially installed on the front end of the left frame member by the first and second hinge portions.

In this case, the first hinge piece 412 of the first hinge portion 401 is coupled toward the front side on the outer side of the front end of the left frame member 102 and the second hinge portion 422 of the second hinge portion 402 is coupled toward the left side on the front side of the left end of the left door member 103.

When the left door member 103 which is axially installed is rotated counterclockwise on the front end side of the left frame member 102, the left end of the second hinge plate body 421 is supported on the right surface of the front end of the first hinge plate body 411 and is not thus rotated any longer, and as a result, while the left door member is orthogonal to the front end of the left frame member at 90 degrees, the left door member is parallel to the front surface of the rear frame member 101 to close the left side of the front surface of the load frame 100.

When the left door member 103 is rotated clockwise in such a state, the left door member is rotated at 270 degrees while being parallel to the rear frame member 101 and folded to be in close contact with the left surface of the left frame member 102.

In this case, when the fastening tie portion 161 of the fastening means 160 attached to the rear vertical portion of both vertical parts of the border portion 110 of the left frame 102 is pulled and suspended on the left ring portion 1063 of the door lock member 106 installed in the left door member 103, the left door member is fastened to the left surface of the left frame member and fixed not to be arbitrarily rotated.

The lower end of each of the second upper bearing portion 423 and the second lower bearing portion 424 of the second hinge portion 402 attached to the left door member 103 is axially coupled to be supported on the upper end of each of the first middle bearing portion 414 and the first lower bearing portion 415 of the first hinge portion 401, the upper end of the second upper bearing portion and the lower end of the first upper bearing portion 413 positioned on a direct upper side thereof, and the upper end of the second lower bearing portion and the lower end of the first middle bearing portion positioned on a direct upper side thereof are separated at an equal interval, and the second hinge portion is attached to the left end of the left door member, while the first hinge portion is attached to the left frame member axially installed not to be elevated to the left hinge member 200, and as a result, the second hinge portion may be elevated in proportion to an interval between the upper end of each of the second upper and lower bearings and the lower end of each of the first upper and middle bearing portions.

Accordingly, the left door member 103 is installed to be elevated together with the second hinge portion 402, and in this case, an interval between the bearing portions of the second hinge portion, which corresponds to an interval at which the left door member is elevated is a degree at which from a position when the left door member is closed and moved down and the lower end of the left door member is seated on the top surface of the left part of the door support means 190, the left door member is moved up for opening and the left door member is opened or closed while the lower end of the left door member is not suspended on the upper end of the upper end coupling protrusion portion 1913 on the front surface of the door support means.

Further, when the right door member 103' is installed on the front end of the right frame member 102' with the left and right door hinge member 400, while among both vertical parts of the border portion 110 of the right frame member, one which is first coupled by sequentially coupling and moving the first hinge plate body 411 of each of two door hinge members through the lower end of the fastening groove portion 111 is positioned on the upper side of the front vertical part and the other one which is coupled later is positioned on the lower side of the front vertical part, a pair of upper and lower bolt fastening holes perforated to horizontally penetrate the inner and outer surfaces of the upper and lower sides of the front vertical part and a pair of upper and lower bolt holes perforated on the first hinge plate body corresponding thereto are matched and attached by tightening the bolt and the nut, next, while one which is first coupled by sequentially coupling and moving the second hinge plate body 421 of the second hinge portion 402 of each of two door hinge members to the lower end of the fastening groove portion of the right vertical part of the right door member is positioned on the upper side of the right vertical part and the other one which is coupled later is positioned on the lower side of the right vertical part, a pair of upper and lower bolt fastening holes perforated to horizontally penetrate the inner and outer surfaces of the upper side and the lower side of the right vertical part and a pair upper and lower bolt fastening holes perforated on the second hinge plate body corresponding thereto are matched and attached by tightening the bolt and the nut, and thereafter, while the lower end of the second upper bearing portion 423 of the second hinge plate body is coupled to be supported on the upper end of the middle bearing portion 414 of the first hinge plate body and the lower end of the second lower bearing portion 424 is coupled to be supported on the upper end of the first bearing portion 415 and the shaft holes of the first upper bearing portion 413 and the middle and lower bearing portions and the second upper and lower bearing portions are vertically communicated, when the door hinge shaft 403 is coupled on the upper side and the E-ring is fastened to the lower end exposed downward, the right door member is axially installed to be rotated and elevated on the front end of the right frame member by the first and second hinge portions.

In this case, the first hinge piece 412 of the first hinge portion 401 is coupled toward the front side on the outer side of the front end of the right frame member 102 and the second hinge portion 422 of the second hinge portion 402 is coupled toward the right side on the front side of the right end of the right door member 103.

When the right door member 103' which is axially installed is rotated counterclockwise on the front end side of the right frame member 102', the right end of the second hinge plate body 421 is supported on the left surface of the front end of the first hinge plate body 411 and is not thus rotated any longer, and as a result, while the right door member is orthogonal to the front end of the right frame member at 90 degrees, the left door member is parallel to the front surface of the rear frame member 101 to close the right side of the front surface of the load frame 100.

When the right door member 103' is rotated counterclockwise in such a state, the right door member is rotated at 270 degrees while being parallel to the rear frame member 101 and folded to be in close contact with the right surface of the right frame member 102'.

In this case, when the fastening tie portion 161 of the fastening means 160 attached to the rear vertical portion of both vertical parts of the border portion 110 of the right frame member 102' is pulled and suspended on the right ring portion 1064 of the door lock member 106 installed in the right door member 103', the right door member is fastened to the right surface of the right frame member and fixed not to be arbitrarily rotated.

Meanwhile, the lower end of each of the second upper bearing portion 423 and the second lower bearing portion 424 of the second hinge portion 402 attached to the right door member 103' is axially coupled to be supported on the upper end of each of the first middle bearing portion 414 and the first lower bearing portion 415 of the first hinge portion 401, the upper end of the second upper bearing portion and the lower end of the first upper bearing portion 413 positioned on a direct upper side thereof, and the upper end of the second lower bearing portion and the lower end of the first middle bearing portion positioned on a direct upper side thereof are separated at an equal interval, and the second hinge portion is attached to the right end of the right door member, while the first hinge portion is attached to the right frame member 102 axially installed not to be elevated to the right hinge member 300, and as a result, the second hinge portion may be elevated in proportion to an interval between the upper end of each of the second upper and lower bearing portions and the lower end of each of the first upper and middle bearing portions.

Accordingly, the right door member 103' is installed to be elevated together with the second hinge portion 402, and in this case, an interval between the bearing portions of the second hinge portion, which corresponds to an interval at which the right door member is elevated is a degree at which from a position when the right door member is closed and moved down and the lower end of the left door member is seated on the top surface of the right part of the door support means 190, the right door member is moved up for opening and the right door member is opened or closed while the lower end of the right door member is not suspended on the upper end of the upper end coupling protrusion portion 1913 on the front surface of the door support means.

The left and right frame members 102 and 102' may be elevated at an equal interval, and opened and closed by the left and right door hinge members 400 configured as such, and when the left and right frame members 102 and 102' are closed, and then moved down, lower parts corresponding to each other in the left and right frame members are seated on the door support means 190 and when upper parts are closed with the door lock member 106, the closed state is stably maintained and a phenomenon in which the left and right frame members 102 and 102' are arbitrarily opened while moving does not occur.

FIG. 25 is a perspective view separately enlarging a second embodiment of the left and right door hinge members in FIG. 5, FIG. 26 is a perspective view partially enlarging the installation state of the left and right door hinge members of FIG. 25, FIGS. 27A and 27B are plan views partially enlarging the used states of the left and right door hinge members of FIG. 26, and FIG. 28 is a plan view partially enlarging another used state of the left and right door hinge members of FIG. 26.

According to the second embodiment of FIG. 25, the left and right door hinge members 400 are configured to include a first hinge portion 401 including a first hinge plate body 411 coupled to the fastening groove portion having the side cross section of the border portion 110, a first hinge piece 412 orthogonally extended to the outer end side of the front surface of the first hinge plate body, and first upper, middle, and lower bearing portions 413, 414, and 415 extended to be coupled to the front end of the first hinge piece at an equal interval, and having the plane cross section with a L-shaped form with a C-shaped hook at an end of the horizontal leg of the L-shape (as shown in FIG. 25), a second hinge portion including a second hinge plate body 421 coupled and fixed to the fastening groove portion, a second hinge piece 422 extended to the front end side of the outer surface of the second hinge plate body to be orthogonal to the first hinge piece with the same vertical length and extension width, and a second upper bearing portion 423 and a second lower bearing portion 424 interposed between the first upper bearing portion and the first middle bearing portion and between the first middle bearing portion and the first lower bearing portion, respectively in the upper and lower portions of the middle part of the outer end portion of the front surface of the second hinge piece, and extended to be vertically connected, and having the plane cross section with a L-shaped form with a C-shaped hook at an end of the horizontal leg of the L-shape (as shown in FIG. 25), and a door hinge shaft 403 vertically matching and axially coupling the first upper, middle, and lower bearing portions and the second upper and lower bearing portions, and a stopper 404 attached to an upper side separated from the upper end of the first hinge piece of the fastening groove portion to which the first hinge portion is coupled at a predetermined interval with the bolt.

When the right end of the right door member 103' is first installed on the front end of the right frame member 102' with the left and right door hinge members 400 configured as such, a pair of bolt holes are perforated on the upper side portion and the lower end portion of the vertical part of the right end of both vertical parts of the border portion 110 of the right door member, respectively, and a pair of upper and lower bolt holes are also perforated on the second hinge plate body 421 of each of the second hinge portions 402 of each of two door hinge members to correspond to the pair of bolt holes, and then the second hinge plate body of each of two door hinge members is sequentially coupled to the fastening groove portion 111 through the lower end of the vertical part of the right end, and moved, and the bolt holes perforated on one second hinge plate body which is first coupled are matched with the bolt holes perforated on the upper portion of the vertical part of the right end and attached by tightening the bolt, and the bolt holes which are perforated on the other one second hinge plate body which is later coupled are matched with the bolts perforated on the lower end portion of the vertical part of the right end and attached by tightening the bolt.

By such a configuration, two second hinge portions 402 are fixed to and installed in the upper portion and the lower end portion of the vertical part of the right end of both vertical parts of the border portion 110 of the right door member 103', respectively, and in this case, the second hinge piece 422 of the second hinge portion is coupled toward the right side on the front end of the outer surface of the second hinge plate body 421.

Thereafter, while the second hinge portion 402 and the second upper bearing portion 423 are coupled to be interposed between the first upper and middle bearing portions 413 and 414 of the first hinge portion 401 and the second lower bearing portion 424 is coupled to be interposed between the first middle bearing portion and the first lower bearing portions 415, and the shaft holes of the bearing portions are vertically communicated, the door hinge shaft 403 is coupled on the upper side and the E-ring is fastened to the lower end exposed to the lower side to axially couple the first hinge portion to the second hinge portion.

By such a configuration, two door hinge members 400 are installed in the upper portion and the lower end portion of the vertical part of the right end of both vertical parts of the border portion 110 of the right door member 103'.

Next, when the first hinge plate body 411 of the first hinge portion 401 of each of two door hinge members 400 is sequentially inserted and moved through the lower end of the vertical part of the front end of both vertical parts of the border portion 110 of the right frame member 102' and the lower end of the first hinge plate body of the lower hinge member of two door hinge members is positioned on the same horizontal line as the lower end of the vertical part of the front end, an installation member 107 installing a caster 600 on a front end portion of the bottom surface of the right frame member 102' is attached to the lower border portion 120 with the bolt and the lower end of the vertical part of the front end is sutured and the lower end of the first hinge portion is thus supported on the top surface of the installation member not to be removed.

Accordingly, the first hinge plate body 411 of the first hinge portion 401 is not attached to the vertical part of the front end of the right frame member 102', but is coupled to and installed in the fastening groove portion 111 to be slidably elevated, and as a result, the right door member 103' is installed on the front end of the right frame member 102' to be rotated and elevated by the door hinge member 400.

A range in which the right door member 103' installed as such is elevated is in proportion to an interval between the stopper 404 fixed to the vertical part of the front end of the right frame member 102' and the upper end of the first hinge plate body 411 when the right door member is moved down, and in this case, the first hinge piece 412 is installed to face the front side on the outer side of the front surface of the first hinge piece and installed to face the right side on the outer end of the outer surface of the second hinge plate body 421.

Further, an interval in which the right door member 103' is elevated together with the first hinge portion 401 is a degree at which from a position when the right door member is closed and moved down and the lower end of the left door member is seated on the top surface of the right part of the door support means 190, the right door member is moved up for opening and the right door member is opened or closed while the lower end of the right door member is not suspended on the upper end of the upper end coupling protrusion portion 1913 on the front surface of the door support means.

When the right door member 103' which is axially installed is rotated clockwise on the front end side of the right frame member 102', the right end of the second hinge piece 422 is supported on the right surface of the front end of the first hinge plate body 411 and is not thus rotated any longer, and as a result, while the right door member is orthogonal to the front end of the right frame member at 90 degrees, the left door member is parallel to the front surface of the rear frame member 101 to close the right side of the front surface of the load frame 100.

When the right door member 103' is rotated counterclockwise in such a state, the right door member is rotated at 270 degrees while being parallel to the rear frame member 101 and folded to be in close contact with the left surface of the right frame member 103'.

In such a state, when the fastening tie portion 161 of the fastening means 160 attached to the rear vertical portion of both vertical parts of the border portion 110 of the right frame member 102' is pulled and suspended on the right ring portion 1063 of the door lock member 106 installed in the right door member 103', the right door member is fastened to the left surface of the right frame member and fixed not to be arbitrarily rotated.

Further, when the left end of the left door member 103 is installed on the front end of the left frame member 102 with the left and right door hinge members 400 configured as such, a pair of bolt holes are perforated on the upper side portion and the lower end portion of the vertical part of the left end of both vertical parts of the border portion 110 of the left door member, respectively, and a pair of upper and lower bolt holes are also perforated on the second hinge plate body 421 of each of the second hinge portions 402 of each of two door hinge members to correspond to the pair of bolt holes, and then the second hinge plate body of each of two door hinge members is sequentially coupled to the fastening groove portion 111 through the lower end of the vertical part of the right end, and moved, and the bolt holes perforated on one second hinge plate body which is first coupled are matched with the bolt holes perforated on the upper portion of the vertical part of the right end and attached by tightening the bolt, and the bolt holes which are perforated on the other one second hinge plate body which is later coupled are matched with the bolts perforated on the lower end portion of the vertical part of the left end and attached by tightening the bolt.

By such a configuration, two second hinge portions 402 are fixed to and installed in the upper portion and the lower end portion of the vertical part of the left end of both vertical parts of the border portion 110 of the left door member 103, respectively, and in this case, the second hinge piece 422 of the second hinge portion is coupled toward the left side on the front end of the outer surface of the second hinge plate body 421.

Thereafter, while the second hinge portion 402 and the second upper bearing portion 423 are coupled to be interposed between the first upper and middle bearing portions 413 and 414 of the first hinge portion 401 and the second lower bearing portion 424 is coupled to be interposed between the first middle bearing portion and the first lower bearing portions 415, and the shaft holes of the bearing portions are vertically communicated, the door hinge shaft 403 is coupled on the upper side and the E-ring is fastened to the lower end exposed to the lower side to axially couple the first hinge portion to the second hinge portion.

By such a configuration, two door hinge members 400 are installed in the upper portion and the lower end portion of the vertical part of the left end of both vertical parts of the border portion 110 of the left door member 103.

Next, when the first hinge plate body 411 of the first hinge portion 401 of each of two door hinge members 400 is sequentially inserted and moved through the lower end of the vertical part of the front end of both vertical parts of the border portion 110 of the left frame member 102 and the lower end of the first hinge portion of the lower hinge member of two door hinge members is positioned on the same horizontal line as the lower end of the vertical part of the front end, an installation member 107 installing a caster 600 on a front end portion of the bottom surface of the left frame member 102 is attached to the lower border portion 120 with the bolt and the lower end of the vertical part of the front end is sutured and the lower end of the first hinge portion is thus supported on the top surface of the installation member not to be removed.

Accordingly, the first hinge plate body 411 of the first hinge portion 401 is not attached to the vertical part of the front end of the left frame member 102, but is coupled to and installed in the fastening groove portion 111 to be slidable, and as a result, the left door member 103 is installed on the front end of the left frame member to be rotated and elevated by the door hinge member 400.

In this case, a range in which the first hinge portion 401 is elevated is in proportion to an interval between the stopper 404 fixed to the vertical part of the front end of the left frame member 102 with the bolt and the upper end of the first hinge plate body 411 when the left door member is moved down.

Further, an interval in which the left door member 103 is elevated together with the first hinge portion 401 is a degree at which from a position when the left door member is closed and moved down and the lower end of the left door member is seated on the top surface of the left part of the door support means 190, the right door member is moved up for opening and the left door member is opened or closed while the lower end of the right door member is not suspended on the upper end of the upper end coupling protrusion portion 1913 on the front surface of the door support means.

When the left door member 103 which is axially installed is rotated counterclockwise on the front end side of the left frame member 102, the left end of the second hinge piece 422 is supported on the left surface of the front end of the first hinge plate body 411 and is not thus rotated any longer, and as a result, while the left door member is orthogonal to the front end of the left frame member at 90 degrees, the left door member is parallel to the front surface of the rear frame member 101 to close the left side of the front surface of the load frame 100.

When the left door member 103 is rotated counterclockwise in such a state, the left door member is rotated at 270 degrees while being parallel to the rear frame member 101 and folded to be in close contact with the left surface of the left frame member 103.

In such a state, when the fastening tie portion 161 of the fastening means 160 attached to the rear vertical portion of both vertical parts of the border portion 110 of the left frame 102 is pulled and suspended on the left ring portion 1063 of the door lock member 106 installed in the left door member 103, the left door member is fastened to the left surface of the left frame member and fixed not to be arbitrarily rotated.

FIG. 29 is a perspective view separately enlarging left and right bottom hinge members in FIG. 13 and FIGS. 30A and 30B are side views partially enlarging a used state of the left and right bottom hinge members of FIG. 29.

The left and right lower plate hinge members 500 are configured to include a front hinge portion 501 including three front bearings 512 separated and extended to the upper end of the rear surface of the front hinge piece horizontally at a predetermined interval, a rear hinge portion 502 interposed among the rear hinge piece 521 and three front bearings and separated and extended to the upper end of the front surface of the rear hinge piece, and a hinge shaft 503 axially installing the front and rear hinge portions by fastening the E-ring to an end portion exposed to the other side by coupling a shaft hole which is to be horizontally communicated at one side by coupling the front and rear bearings.

The front hinge portion 501 of the left and right lower plate hinge members 500 is attached to left and right sides of the rear surface of the lower plate member 104 and the rear hinge portion 502 is attached to left and right sides of the inner surface of the lower border portion 120 of the rear frame member 101 to axially install the lower plate member to be horizontally and vertically rotated, and when the fastening means 160 pulls a fastening tie 161 and suspends the fastening tie 161 on the suspension pin 146 provided in the lower plate member while the lower plate member is vertically rotated, the lower plate member is closely fixed to the lower portion of the front surface of the rear frame member.

FIG. 31 is a perspective view enlarging a portion in which a caster is installed in FIG. 5, FIG. 32 is a perspective view separately enlarging a caster and an installation member in FIG. 31, and FIG. 33 is a lateral cross-sectional view enlarging a part of the portion in which the caster is installed in FIG. 31.

According to FIG. 31, the caster 600 is a general use caster, however, in the present invention, the caster is not installed by welding and attaching the caster on four corners of the bottom surface of the load frame 100, but instead the caster may be easily detached by using a separate installation member 107 made of aluminum.

The installation member 107 includes an installation plate portion 1071, an installation groove portion 1072 bent in two stages at the left and right sides of the bottom surface of the installation plate portion and formed so that the bent portions face each other, left and right fixation piece portions 1073 separated at an interval which is in proportion to the widths of the left and right surfaces of the lower border portion 120 at the left and right sides of the top surface of the installation plate portion and vertically extended in parallel to each other, and a fastening groove 1074 formed at four corner portions of the bottom surface of the installation plate portion, and is configured to have a side cross section with a form as shown in FIG. 33.

The installation member 107 is attached to the lower border portion by tightening the bolt and the nut so as to penetrate the bolt holes perforated to correspond to the left and right fixation piece portions and the lower border portion while the lower border portion 120 is coupled to be inserted between the left and right fixation piece portions 1073.

In addition, left and right end portions of the fixation plate portion 601 provided on the top surface of the caster 600 are inserted and coupled into the installation groove portions 1072 formed at the left and right sides of the bottom surface of the installation plate portion 107 and the bolt holes perforated on the fixation plate portion are matched with the fastening grooves 1074 dented on the bottom surface of the installation plate portion 1071 and attached by tightening the bolts, respectively.

Accordingly, when the caster which is in use is damaged, if only a bolt fastened to the fastening groove 1074 is released, the rolltainer may be continuously used by easily replacing the caster, and as a result, a phenomenon is prevented in which the caster may not be used only due to damage to the caster and life-span shortening is caused like in conventional rolltainers in which the caster is welded and attached.

FIGS. 34A to 34E are plan views and perspective views showing a process of folding the lightweight roll container of FIGS. 4A and 4B.

When the foldable lightweight roll container according to the present invention is folded, as an example, in the same state as in FIG. 4a, as in FIG. 34a, the left and right door members 103 and 103' are first opened and rotated to the outer surface side (left and right surface side) of the left and right frame members 102 and 102', respectively.

Thereafter, as illustrated in FIG. 34b, while the left and right door members 103 and 103' are in close contact with the outer surfaces of the left and right frame members 102 and 102', respectively, the fastening tie portion 161 of the corresponding fastening means 160 is pulled and suspended on the left and right ring portions 1063 and 1064 of the left and right door members to closely attach and fix the left and right door members to the outer surfaces of the left and right door members, and the support member 105 separates and rotates downward the ring portion 1054 from the suspension pin portion 1053 in the horizontal fixation state and fastens a lower end portion to the fastening portion 1055 and fixes the lower end portion to the left frame member in the vertical state, and then pulls the fastening tie of the corresponding fastening means and suspends the fastening tie to the suspension pin 146 to be closely attached and fixed onto the inner surface of the rear frame member while rotating upward the lower plate member 104 and closely attaching the lower plate member 104 onto the inner surface of the rear frame member 101.

Thereafter, when the left frame member 102 in which the left door member 103 is closely attached and fixed to the outer surface is rotated at 270 degrees clockwise as illustrated in FIG. 34c, the left door member is folded to be interposed between the left door member and the left rear surface of the rear frame member 101 to be closely attached in parallel to each other.

In such a state, when the right frame member 102' in which the right door member 103' is closely attached and fixed to the outer surface is rotated at 90 degrees clockwise as illustrated in FIG. 34d, the right door member is closely attached to the bottom surface of the lower plate member 104 closely attached to the right inner surface of the rear frame member 101, and as a result, while the lower plate member is interposed between the right frame member and the rear frame member, the right door member, the right frame member, and the lower plate member are folded to be closely attached to the inner surface of the rear frame member in parallel to each other.

When the rolltainer is folded as such, the left and right frame members 102 and 102', the lower plate member 104, and the left and right door members 103 and 103' are folded while being closely attached to the rear surface and the inner surface of the rear frame member 101, and as a result, the folding thickness of the rolltainer is minimized, thereby allowing for the storage or loading of multiple rolltainers even in a narrow space.

Meanwhile, when the folded rolltainer is intended to be used, the rolltainer is unfolded in a reverse order to folding the rolltainer.

In the foldable lightweight roll container according to the present invention configured as such, since all components including a caster are molded by aluminum and are assembled and manufactured without welding, weight is reduced by 40% or more. The use and maintenance of the rolltainer is very convenient and easy, and workability and productivity are remarkably enhanced, cleanliness is easily upkept, and the foldable light weight roll container can be widely applied to the moving or transporting of various articles such as medical supplies, foods, or as a precise instrument in addition to general industrial use.

Further, since thickness is minimized when the foldable lightweight roll container is folded, storage and spatial utilization are very easy, and when partial damage occurs in use, a corresponding part may be simply separated, and repaired or replaced, and as a result, life-span shortening is prevented and recycling of the affected parts is possible, thereby preventing the waste of enormous resources and cost.

FIG. 35 is a perspective view schematically showing a foldable lightweight roll container according to another embodiment of the present invention and FIG. 36 is a perspective view of FIG. 35 partially omitted.

The foldable lightweight roll container according to another embodiment of the present invention in FIGS. 35 and 36 includes a load frame 100 including a rear frame member 101 including a border portion 110 formed in a form of flat U-shape by bending the side cross section in a rectangular pipe form (as shown in the lateral cross sectional view of FIG. 7), a lower border portion 120 having the side cross section with a pipe form (as shown in the cross sectional view of FIG. 8b), a horizontal support 130 having the side cross section with a pipe form of (as shown in FIG. 9b), a vertical support 140 formed by a pipe having a small diameter, a sealing cap 150 made of a synthetic resin, and a fastening means 160, left and right frame members 102 and 102' coupled to and installed in the left and right ends of the rear frame member to be rotatable, respectively, left and right rear members 103 and 103' coupled to and installed in the front ends of the left and right frame members to be rotatable, respectively, a lower plate member 104 coupled to and installed in the lower end of the inner surface of the rear frame member, and a door lock member 106 installed in the left and right door members, a left hinge member 200 coupled to and installed in the left end of the rear frame member to rotate the left frame member, a right hinge member 300 coupled to and installed in the right end of the rear frame member to rotate the right frame member, left and right door hinge members 400 coupling and installing the left and right door members to and in the front ends of the left and right frame members to be rotated and elevated at a predetermined interval, left and right lower hinge members 500 coupling and installing the lower plate member to and in the lower end of the front surface of the rear frame member to be vertically rotated, and a caster 60) coupled to and installed in left and right end portions of the bottom surface of the rear frame member and the front end portion of the bottom surface of each of the left and right frame members, respectively, and is the same as the foldable lightweight roll container according to the present invention in FIGS. 1 and 2 in that the load frame, the hinge member, the door hinge member, and the lower hinge members except for the caster are all made of aluminum and in terms of a structure and an assembly state of each of the components.

However, the foldable lightweight roll container is configured to further include a fixation member 108 fixing the lower plate member 104 which is rotated downward from a vertical direction to a horizontal direction not to be arbitrarily loaded, an installation member 107 changing a structure to prevent the caster from being exposed to the outside four corners of the load frame by installing the caster 600 to be positioned at the inside of four corners of the bottom surface of four corners of the load frame 100 and support the lower plate member which is rotated downward horizontally, and a safe member 109 installed in the rear frame member 101, and on the lower end portion of each of the left and right frame members 102 and 102' and preventing a safety accident such as injury which occurs due to insertion of a foot or an ankle between each bottom surface and a ground surface.

FIG. 37 is a perspective view enlarging a bottom member in FIG. 35, FIG. 38 is a perspective view separately enlarging a bottom hinge member in FIG. 35, and FIGS. 39A and 39B are lateral cross-sectional views enlarging a used state of the bottom hinge member of FIG. 38.

The bottom member 104 is the lower plate member of FIG. 3 in that the bottom member is configured to include a bottom material 141 having a rectangular flat plate, four border materials 142 coupled to cover four surfaces of the bottom material, a fastening material 3 fastening four corners of the border material, and a plurality of support materials coupling both ends to a lower side of an inner surface of two border materials corresponding thereto to cross the bottom surface of the bottom material.

However, four border materials 142 include a settlement groove portion 1421 between the middle upper portion of the outer surface and the lower end and an insertion groove portion 1422 formed so that the lower plate material 141 is inserted into the upper end side of the inner surface, and has the side cross section (as shown in FIG. 38).

A fixation piece portion 1281 is attached by tightening a fixation bolt 1282 to a bolt hole perforated to a corresponding position by coupling the fixation piece portion 1281 of a stop means 1082 to the settlement groove portion 1421 of each of the left and right border materials 142 of the bottom member 104 through any one of both end portions as described below.

The left and right lower plate hinge members 500 are configured to include a front hinge portion 501 including three front bearings 512 separated and extended to the upper end of the rear surface of the front hinge piece horizontally at a predetermined interval, a rear hinge portion 502 interposed among the rear hinge piece 521 and three front bearings and separated and extended to the upper end of the front surface of the rear hinge piece, and a hinge shaft 503 axially installing the front and rear hinge portions by fastening the E-ring to an end portion exposed to the other side by coupling a shaft hole which is horizontally communicated to be horizontally communicated at one side by coupling the front and rear bearings.

The front hinge portion 501 the left and right lower plate hinge members 500 is attached to the left and right sides of the rear surface of the lower plate member 104, and the rear hinge portion 502 is attached to the left and right sides of the inner surface of the lower border portion 120 of the rear frame member 101 to axially install the lower plate member to be rotated horizontally and vertically.

FIG. 40 is a perspective view separately enlarging a fixing member of the bottom member in FIG. 35, FIGS. 41A and 41B are lateral cross-sectional views showing separation and assembly states of the fixing member of FIG. 40, and FIGS. 42A to 42C are a plan view and partially cutout side views enlarging a state of fixing the bottom member by the fixing member of FIG. 40.

The fixation member 108 fixes the lower plate member 104 which is placed horizontally not to be arbitrarily loaded by a fork when using the rolltainer, and includes a fixation means 1081, a stop means 1082, and first and second fixation bolts 1083 and 1084.

The fixation means 1081 includes a movement piece 1181 coupled to the side coupling groove portion 12 having a form of an open rectangle shape with open edges bent in a required length (as shown in FIG. 8a and lateral cross sectional view of FIG. 8b) on the upper side of the inner surface of each lower border portion 120 of the left and right frame members 102 and 102' to be movable forward and backward, a fixation piece 1182 horizontally extended inward in a middle portion of the inner surface of the movement piece, first and second spiral holes 1183 and 1184 vertically perforated at a front and rear portions on the same line of the fixation piece, and a support piece 1185 extended downward vertically on an inner end of the fixation piece.

The fixation means 1081 is coupled and installed to be moved to the inner surface of the lower border portion 120 by the movement piece 1181 coupled to the side coupling groove portion 122.

The stop means 1082 includes a fixation piece portion 1281 which is formed so that a front and rear width correspond to an interval between the first and second spiral holes 1183 and 1184, and having upper and lower ends coupled to the settlement groove portion 1421 formed at upper and lower portions of the outer surfaces of the left and right border materials among four front and rear and left and right border materials 142 in which the side cross section of the lower plate member 103 has a form as shown in FIG. 38, a fixation bolt attaching the fixation piece portion to the outer surfaces of the left and right border materials by tightening a spiral hole perorated in the fixation piece portion and a spiral hole perforated on the outer surface between upper and lower settlement groove portions to correspond thereto, a support piece 1283 horizontally extended to the outer side on the upper end of the outer surface of the fixation piece portion and formed to support the lower end of the support piece 1185 on the top surface, and a step piece 1284 extended upward vertically on the outer end of the support piece and formed to support the upper end surface on the bottom surface of the fixation piece where the first and second spiral holes perforated in front and rear portions on the same line while the upper end surface crosses the lower end of the support piece to the outside.

The stop means is attached to and installed in the left and right border materials 142 with the fixation bolt 1282 so that a rear end of the stop means 1082 is positioned in front of the front end of the fixation means 1081, and the fixation means is coupled to and installed in the coupling groove portion 122 of the lower border portion 120 so that a front end of the fixation means is positioned in the rear of the rear end of the stop means.

Further, when the front end of the fixation means 1081 is positioned in the rear of the rear end of the stop means 1082 as in FIG. 42a, the first fixation bolt 1083 is fastened so that a lower end of the first fixation bolt 1083 is not exposed to the lower portion of the first spiral hole 1183 and the second fixation bolt 1084 is completely fastened and the lower end portion is exposed to the lower portion of the second spiral hole 1184.

In such a state, a bottom surface on which the first and second spiral holes 1183 and 1184 of the fixation piece 1182 are perforated and the upper end surface of the stop piece 1284 are positioned at front and rear sides on the same horizontal line, and positions of the fixation means 1081 and the stop means 1082 deviate from each other, and as a result, the lower plate member 104 may be rotated backward from the horizontal direction to the vertical direction or rotated forward from the vertical direction to the horizontal direction.

Accordingly, when the fixation means 1081 is moved forward while the lower plate member 104 is in the horizontal state, the bottom surface on which the first and second spiral holes 1183 and 1184 are perforated among the bottom surfaces of the fixation piece 1182 is supported on the upper end surface of the stop piece 1284 and moves forward, and the lower end portion of the second fixation bolt 1084 exposed to the lower end portion of the second spiral hole is suspended on the rear end of the support piece as in FIG. 42*b* and in this case, forward movement is stopped.

In this case, since the lower end of the first spiral hole 1183 is positioned on a right upper portion of the front end of the stop piece 1284, the first fixation bolt 1083 is tightened, and as a result, the lower end portion is exposed to the lower portion of the first spiral hole to suspend the front end of the support piece.

By such a configuration, as in FIG. 42*c*, the stop means 1082 is supported by the fixation means 1081 and fixed not to arbitrarily move up and the fixation means is suspended on the stop means by the first and second fixation bolts 1083 and 1084 and not moved forward and backward, and as a result, when the rolltainer is in use, in particular, moved by a forklift, a phenomenon in which the lower plate member 104 is loaded by the fork does not occur.

Thereafter, when the lower plate member 104 is vertically rotated in order to stop keeping of the rolltainer, while only the first fixation bolt 1083 which is first tightened is released and the lower end is moved up not to be exposed to the lower portion of the first spiral hole 1183, the fixation means 1081 is moved backward to allow the front end to be positioned in the rear of the rear end of the stop means 1082, and then the lower plate member is vertically rotated backward.

FIG. 43 is a perspective view enlarging a caster and an installation member in FIG. 35, FIG. 44A is a front view showing a state of coupling the caster and the installation member in FIG. 43, FIG. 44B is a front view showing a state of attaching the installation member coupled with the caster to a lower edge part in FIG. 44A, and FIG. 45 is a perspective view showing a state in which the caster is installed inside four edges of a lower surface of the roll container by the installation member of FIG. 43.

The caster 600 is the same as the caster in the pre-application invention of the applicant, and the installation member 107 installing the caster installs the casters to be positioned on the inner side of four corner portions of the bottom surface of the lower plate member 104 other than four corners of the load frame 100 to prevent the caster from being exposed to the outside of four corners of the load frame and allow the caster to support the inner portions of four corners of the lower plate member by changing the structure of the pre-application of the present applicant.

The installation member 107 is configured to include an installation plate portion 1071 of which left and right width is formed wider than the installation plate portion of the pre-application invention, an installation groove portion 1072 in which left and right end portions of the fixation plate portion 601 installed on the top surface of the caster 600 are bent and extended in two stages to be inserted into and fastened to the left and right portions of the left portion of the bottom surface of the installation plate portion, respectively to face each other, left and right fixation piece portions 1073 separated at an interval which is in proportion to the widths of the inner and outer surfaces of the lower border portion 120 and vertically extended to the left and right portions of the right portion of the top surface of the installation plate portion in parallel to each other, fastening grooves 1074 formed at front and right and left and right sides of the left portion of the installation plate portion corresponding to between the installation groove portions, and a support surface portion 1075 formed so that a space between the left surface of the left fixation piece portion among the left and right fixation piece portions 1073 and the left end of the installation plate portion 1071 supports inner portions of four corners of the bottom surface of the lower plate member 104.

The installation member 107 is attached to the lower border portion by tightening the bolt and the nut so as to penetrate the bolt holes perforated to correspond to the left and right fixation piece portions and the lower border portion while the lower border portion 120 is coupled to be inserted between the left and right fixation piece portions 1073.

In addition, left and right end portions of the fixation plate portion 601 installed on the top surface of the caster 600 are inserted and coupled into the installation groove portions 1072 formed at the left portion of the bottom surface of the installation plate portion 107 and the bolt holes perforated on four corner portions of the fixation plate portion are matched with the fastening grooves 1074 dented on the left portion of the installation plate portion 1071 which is vertically matched with the bolt hole and attached by tightening the bolts, respectively.

When the caster 600 is installed in each of the rear frame member 101 and the lower border portion 120 of the left and right frame members 102 and 102' by using the installation member 107, the casters are positioned on the inner sides of four corner portions of the bottom surface of the lower plate member 104 not to be exposed to the outside of four corners of the load frame 100.

Accordingly, a phenomenon such as a collision of the caster 600 with feet or other objects with carelessness when moving the rolltainer is prevented, and the caster may be safely used.

Meanwhile, when the lower plate member 104 is rotated and is in the horizontal state, four corner portions of the bottom are supported on the top surfaces of the support surface portions 1075 and the casters 600 installed on the bottom surface of the left portion of the installation plate portions support the left portion of the installation plate portion, and as a result, when articles are loaded on the top surface of the lower plate member, even though a load is applied to the lower plate member, the lower plate member is supported by the casters which are positioned on the inner sides of four corners of the bottom surface, and as a result, the lower plate member is not drooped and maintains the horizontal state in spite of long-term use.

FIGS. 46*a* and 46*b* are a front view and a side view enlarging a part of a state in which a safety member is installed in FIG. 35, FIG. 47*a* is a front view and a perspective view enlarging the safety member in FIG. 46*a*, and FIG. 47*b* is a front view and a perspective view separately enlarging the safety member in FIG. 47*a*.

The safe member 109 according to the present invention in FIGS. 46*a* and 46*b* is configured to include a border portion 110 having a form of flat U-shape in which the rear frame member 101 and the lower ends of both vertical portions of the left and right frame members 102 and 102' are extended to be close to the ground surface, a safe bar 1091 attached to horizontally cross the inner surfaces of both vertical portions by fixing both ends to the inner surfaces of the lower ends of the both vertical portions, respectively, and a buffer pad 1092 is made of an elastic material such as rubber or urethane and fastened to the safe bar in a form to surround the outer surface of the safe bar.

The safe bar 1091 includes a first fastening groove 1911 dented on the outer portion of the top surface, a screw tightening hole 1192 which is protruded in a C-shaped form in the middle of the inner portion of the bottom surface and tightening the screws to both end portions when fixing both ends of the safe bar to the inner surfaces of the lower ends of both vertical portions, and a second fastening groove 1193 having a form of an open rectangle shape with open edges bent in a required length on the bottom surface, and has the side cross section with a pipe form as shown in FIG. 47b.

The buffer pad 1092 includes an upper fastening portion 1291 which has a vertical length corresponding to a vertical width of the outer surface of the safe bar 1091, and is bent and extended in two stages inward on the upper end and has an end portion fastened to the first fastening groove 1191 and a lower fastening portion 1292 bent and extended in two stages inward on the lower end and coupled to an outer end portion of the second fastening groove 1193, and has a side cross section with a form as shown in FIG. 47b.

When the buffer pad 1092 is fastened to the safe bar 1091, the buffer pad 1092 is coupled to the safe bar 1091 in a longitudinal direction while the upper fastening portion 1291 is matched with the first fastening groove 1191 and the lower fastening portion 1292 is matched with outer end portion of the second fastening groove 1193 at one side of the safe bar.

By such a configuration, the buffer pad 1092 is closed attached and fastened to the safe bar by elasticity thereof while surrounding the outer surface of the safe bar 1091 and upper and lower end portions thereof.

Meanwhile, the lower end of each of the vertical supports 140 is extended and installed in a space between the safe bar 1091 and the lower border portions 120 with a length to be supported on an internal floor of the safe bar by vertically penetrating the top and bottom surfaces of the lower border portion and the top surface of the safe bar.

Since the safe bar 1091 is installed so that the bottom surface of the safe bar 1091 is close to the ground surface, when a worker pushes or pulls the rolltainer and moves the rolltainer, a phenomenon in which a foot or ankle is inserted between the bottom surface of the safe bar and the ground surface with carelessness is prevented, and the rolltainer may be safely used.

Further, since outer corners of the front surface, and the top and bottom surfaces of the safe bar 1091 are covered by the safe bar 1091, an impact generated when other objects or feet collide is thus buffered, and as a result, the impact is not transferred to the loaded articles or foot in addition to the rolltainer itself.

FIGS. 48A and 48B are a front view and a side view enlarging a part of a state in which a safety member of another example applied to the roll container of FIG. 35 is installed, FIG. 49A is a front view and a perspective view enlarging the safety member of another example in FIG. 48A, and FIG. 49B is a front view and a perspective view separately enlarging the safety member of another example in FIG. 49A.

The safe member 109 according to another example in FIGS. 48a and 48b is configured to include a first safe panel 109a having a large vertical width and a second safe panel 109b having a smaller vertical width than the first safe panel and made of an elastic material such as rubber or urethane.

The first safe panel 109a includes first and second fastening piece portions 1093 and 1094 formed on inner ends of horizontal portions extended inward in an upper end and an upper portion of the inner surface to be fastened to first and second fastening grooves 125 and 125' dented in a middle portion of each of the outer surface and the bottom surface of the lower border portion 120, a first fastening hole portion 1095 dented inward in the lower portion, and a second fastening hole portion 1096 formed on the top surface of the horizontal portion which is horizontally extended inward on the lower end.

The second safe panel 109b includes a third fastening piece portion 1097 inserted into and fastened to the first fastening hole portion 1095 of the first safe panel 109a on the upper end and a fourth fastening piece portion 1098 bent upward on the inner end of the horizontal portion horizontally extended inward and having an end portion inserted into and fastened to the second fastening hole portion 1096 on the lower end.

When the first safe panel 109a is installed in the lower border portion 120, if the first and second fastening piece portions 1093 and 1094 are matched with the first and second fastening grooves 125 and 125' on one side of the lower border portion 120 and inserted and coupled in the longitudinal direction, the first and second fastening piece portions 1093 and 1094 are firmly vertically fastened to the first and second fastening grooves 125 and 125'.

Further, when the second safe panel 109b is coupled and connected to the first safe panel 109a, if the third and fourth fastening piece portions 1097 and 1098 are matched with the first and second fastening grooves 1095 and 1096 on one side of the first safe panel, respectively, and inserted and coupled in the longitudinal direction, the third and fourth fastening piece portions 1097 and 1098 are firmly vertically fastened to the first and second fastening hole portions 1095 and 1096.

By such an installation, since the lower end of the second safe panel 109b is installed to be close to the ground surface, when a worker pushes or pulls the rolltainer and moves the rolltainer, a phenomenon in which the foot or ankle is inserted between the bottom surface of the safe bar 109 and the ground surface with carelessness is prevented, and the rolltainer may be safely used.

Further, since the second safe panel 109b is made of the elastic material such as rubber or urethane, an impact generated when other objects or feet collide is thus buffered, and as a result, the impact is not transferred to the loaded articles or foot in addition to the rolltainer itself.

In the foldable lightweight roll container according to the present invention configured as such, the lower plate member is prevented from being arbitrarily loaded when moving the rolltainer with the forklift and the foot is prevented from being inserted between the bottom surface of the rolltainer and the ground surface when the worker pushes or pulls, and moves the rolltainer, and a phenomenon is also prevented in which since the caster is not exposed to the outside of the rolltainer, the caster collides with other objects and is easily broken, and as a result, the life-span is shortened.

EXPLANATION OF REFERENCE NUMERALS
AND SYMBOLS

100: load frame
101: rear frame member
102: left frame member
102': right frame member
103: left door member
103': right door member
104: lower plate member
105: support member
106: door lock member
107: installation member
108: fixation member
109: safe member
109a: first safe panel
109b: second safe panel
110: border portion
120: lower border portion
125: first fastening groove
125': second fastening groove
130: horizontal support
140: vertical support
150: sealing cap
160: fastening means
170: lower plate support means
180: left and right grip means
190: door support means
200: left hinge member
300: right hinge member
400: door hinge member
500: lower plate hinge member
600: caster
1071: installation plate portion
1075: support surface portion
1081: fixation means
1082: stop means
1083: first fixation bolt
1084: second fixation bolt
1091: safe bar
1092: buffer pad
109a: first safe panel
109b: second safe panel

The invention claimed is:

1. A foldable lightweight roll container comprising:
a load frame (100) including
  a rear frame member (101), the rear frame member (101) including
    a border portion (110) formed in a substantially flat U-shaped form in which a fastening groove portion (111) having the form of an open rectangle shape with both ends bent to correspond to each other is formed on one surface,
    a lower border portion (120) which includes an insertion groove (121) dented at an inner end of a upper surface with an opened upper end, a side coupling groove portion (122) dented at a direct lower portion of the insertion groove of the inner side in an open rectangle shape with open edges bent, a horizontal partition wall (123) partitioning an inner space up and down, and a first fastening port (124) which protrudes from a lower portion of the horizontal partition wall (123) in a C-shape so that a middle of the lower end is isolated to fasten screws to both ends, and is formed with a side section extruded in a pipe form and cut and used in a required length,
    a horizontal supporter (130) which includes a second fastening hole (131) which protrudes from a lower portion of an upper surface in a C-shape so that a middle of the lower end is isolated to fasten screws to both ends and is formed with a side section extruded in a square pipe form and cut and used in a required length, and
    a vertical supporter (140) which is extruded in a pipe form having a small diameter and having a lower end is supported on an internal bottom of the bottom surface of the lower border portion (120) on which a third coupling hole (125) is not perforated by penetrating a first coupling hole (112) and a second coupling hole (132) formed to vertically penetrate upper and lower surfaces of a horizontal portion of the border portion (110) and the horizontal support (130), and a third coupling hole (125) perforated on the top surface of the lower border portion (120) and an upper end is coupled to be positioned between internal upper and lower surfaces of the horizontal portion of the border portion (110),
  left and right door members (103, 103') including corresponding left and right frame members (102, 102'), and the lower border portion (120) having a side cross section with a rectangular pipe form, and attaching both ends to lower ends of inner surfaces of both vertical portions to cross the lower ends of both vertical portions of the lower border portion (110), and a lower plate member (104) including a lower plate material (141) installed to be vertically rotated by left and right lower plate hinge members (500) on a lower end portion of the inner surface of the rear frame member (101) and formed by a rectangular flat plate, front rear left and right border materials (142) surrounding and coupling four surfaces of the lower plate material (141), a fastening material fastening four corners of the border material (142), and a lower plate member including a plurality of support materials which couple both ends to inner surfaces of two border materials (142) corresponding thereto so as to cross the bottom surface of the lower plate material (141);
a left and a right lower plate support means (170) installed on a lower end portion of the inner surface of a lower border portion of each of the left and right frame members (102, 102');
a left hinge member (200) rotating the left frame member (102) forward and backward within a range of 270 degrees by coupling and installing a rear end of the left frame member (102) on a left end of the rear frame member (101);
a right hinge member (300) rotating the right frame member (102') forward and backward within a range of 270 degrees by coupling and installing a rear end of the right frame member (102') on a right end of the rear frame member (101);
left and right door hinge members (400) rotating the left and right door members (130, 130') forward and backward at a predetermined interval within a range of 270 degrees and elevated within a predetermined interval by coupling and installing the left and right ends of each of the left and right door members (130, 130') to a front end of each of the left and right frame members (102, 102');
a door support means installed in a middle portion of the front surface of the lower plate member (104) so as to support lower end portions of the right end and the left end corresponding to each other by closing and moving down the left and right door members (103, 103'); and a caster (600) having a fixation plate portion (601) provided on a top surface of the caster (600), and coupled to and installed in each of the left and right end portions of the bottom surface of the rear frame member (101) and the lower border portion (120) of the left and right frame members (102, 102').

2. The foldable lightweight roll container of claim 1, wherein the load frame (100) is configured to further include:

a door lock member (106) installed in the left and right door members (130, 130') so as to lock the left and right door members (130, 130') not to be arbitrarily opened;

an installation member (107) coupling and installing the caster (600) to the lower border portion (120);

a sealing cap (150) coupled to the first coupling hole (112) perforated on the top and bottom surfaces of horizontal portion of the lower border portion (110);

a fastening means (160) installed in each of the rear frame member (101) and the left and right frame members (102, 102') and fastening the lower end member (104) and the left and right door member (130, 130'); and a grip means (180) fastened to the lower border portion (110).

3. The foldable lightweight roll container of claim 2, wherein the door lock member (106) is configured to include:

left and right coupling pieces (1061, 1062) which couple each of both vertical parts of right and left ends corresponding to each other to an upper part of the fastening groove portion (111) when closing the front surface of the load frame (100) with the left and right door members (103, 103'), left and right ring portions (1063, 1064) combined to be vertically communicated when extending to the front end of each of the left and right coupling pieces (1061, 1062) in a pipe form so that inner and outer diameters are equal to each other and closing the left and right door members (103, 103'), and a lock pin (1065) having plane cross sections which are symmetric with each other in the form of a hook, and coupled to left and right ring portions (1063, 1064) combined to be communicated vertically from an upper side to prevent the left and right ring portions (1063, 1064) from being separated and lock the left and right door members (103, 103') not to be arbitrarily opened.

4. The foldable lightweight roll container of claim 2, wherein the installation member (107) includes:

an installation plate portion (1071), an installation groove portion (1072) bent in two stages at the left and right sides of the bottom surface of the installation plate portion (1071) and formed so that the bent portions face each other, left and right fixation piece portions (1073) separated at an interval which is in proportion to the widths of the left and right surfaces of the lower border portion (120) at the left and right sides of the top surface of the installation plate portion (1071) and vertically extended in parallel to each other; and a fastening groove (1074) formed at four corner portions of the bottom surface of the installation plate portion (1071), and is attached to the lower border portion (120) by tightening the bolt and the nut so as to penetrate the bolt holes perforated to correspond to the left and right fixation piece portions (1073) and the lower border portion (120) while the lower border portion (120) is coupled to be inserted between the left and right fixation piece portions (1073).

5. The foldable lightweight roll container of claim 1, wherein the sealing cap (150) includes:

a cap portion (151) having a circular plate form, and an elastic fastening portion (152) formed with a plurality of elastic pieces which extends downward from a center of the lower surface of the cap portion (151) and formed so that an interval from the lower end to the upper side is larger than an inner diameter of an upper coupling hole of first coupling holes (112) perforated by passing through upper and lower surfaces of the horizontal portion of the border portion (110) up and down.

6. The foldable lightweight roll container of claim 2, wherein the fastening means (160) includes:

a fastening rope portion (161) which is woven in a rope form with a high-elastic polyurethane-based synthetic fiber with excellent abrasion resistance and elasticity to be cut in a required length; and a fixing piece portion (162) having one end fastened by pressing both ends of the fastening rope portion (161) and the other end with a perforated screw hole.

7. The foldable lightweight roll container of claim 2, wherein the left and right grip means (180) includes:

a body portion (181) in which a flat cross section is formed by high-elastic urethane rubber so that a side cross section is fastened in a state to cover the border portion (110) having a flat U-shaped form, and both-sides settlement portions (182) vertically and horizontally bent and extended inward in two stages to correspond to each other on both ends of the body portion (110) and coupled to cover both ends of a fastening groove portion (111) of the border portion (110), and the flat cross section which is extruded long is cut with a required length to be coupled to the vertical portion of the border portion (110) by using autonomous elasticity.

8. The foldable lightweight roll container of claim 1, wherein the left and right lower plate support means (170) includes:

a support plate (171) which includes a bottom piece (1711), a fastening portion (1712) vertically formed in a form of an open rectangle with open ends bent in a required length to correspond to both ends of the bottom piece (1711), a support piece (1713) horizontally extended with a predetermined length on one end of the bottom piece (1711), a horizontal piece (1714) horizontally extended in parallel longer than the support piece (1713) at a predetermined interval from a top of an outer surface of the fastening portion (1712) to which the support piece (1713) is horizontally extended to a lower end among the fastening portion (1712), a vertical piece (1715) vertically extended so that a top end is coupled to a top end portion of the side coupling groove portion (122) on an outer end of the horizontal piece (1714), and a coupling piece (1716) extended downward to be coupled to a lower end portion of the side coupling groove portion (122) on a lower end of the vertical piece (1715); and a buffer plate (172) which includes a bottom portion (1721) seated on a top surface of the bottom piece (1711) and a coupling portion (1722) extended symmetrically in a T-shaped form to face the outside on each top end and coupled to the fastening portion (1712).

9. The foldable lightweight roll container of claim 1, wherein the left hinge member (200) is configured to include first and second left hinge pieces (201, 202) including:

first and second left plate bodies (211, 221) each coupled to the fastening groove portion (111) having a side cross section with the form of two circles with tangents connected by a line;

first and second left fixation bearing portions (212, 222) protruded and extended to correspond to front end portions of inner and outer surfaces of each of the first and second left plate bodies (211, 221);

first and second left bearing portions (213, 223) protruded and extended to rear end portions of inner and outer surfaces of the first and second left plates bodies (211, 221) to correspond to the first and second left fixation bearing portions (212, 222);

a third left plate body (231) having a plane cross section with an arc form, a third left hinge piece (203) including third left and right bearing portions (232, 233) having the same diameter as the first and second left bearing portions (213, 223) on both ends of the third left plate body (231) to have a plane cross section;

a first left pin (204) axially installing the first left bearing portion (213) and the third left bearing portion (232) to be rotated;

a second left shaft pin (205) axially installing the second left bearing portion (223) and the third right bearing portion (233) to be rotated;

a left fixation shaft pin (206) axially coupling and fixing the first left fixation bearing portion (212) and the second left fixation bearing portion (222); and the right hinge member (300) is configured to include:

a first right hinge piece (301) including a first right plate body (311) having a plane cross section with a form of a straight line with a curved line starting from an end, and a rear piece coupled and fixed to the fastening groove portion (111), a first right bearing portion (312) protruded and extended to a front end of an inner surface of front piece of the first right plate body (311) toward an inner side, and a first right fixation bearing portion (313) protruded and extended to a rear side of an outer surface of the front piece, and having a plane cross section;

a second right hinge piece (302) including a second right plate body (321) coupled to the fastening groove portion (111) having a plane cross section and a side cross section with a form of a straight line with a curved line starting from an end, a second right bearing portion (322) extended to an end portion of a bending piece of a rear side of an outer surface of the second right plate body (321), and a second right fixation bearing portion (323) extended to an outer end of a straight-line piece of a front side of an outer surface of the second right plate body (321), and having plane cross section in a form of a straight line with a curved line starting from an end;

a right shaft pin (303) axially installing the first and second right bearing portions (312, 322) to be rotated; and a right fixation shaft pin (304) axially coupling the first and second right fixation bearing portions (313, 323) not to be rotated.

10. The foldable lightweight roll container of claim 1, wherein the left and right door hinge members (400) is configured to include:

a first hinge portion (401) including a first hinge plate body (411) coupled and fixed to the fastening groove portion (111) of the border portion (110), a first hinge piece (412) perpendicularly extended to a left end side of a front surface of the first hinge plate body (411), and first upper, middle, and lower bearing portions (413, 414, 415) extended to be separated on a front end of the first hinge piece (412) at an equal interval, and having plane cross section in a L-shaped form with a C-shaped hook at an end of a horizontal leg of the L-shape;

a second hinge portion (402) including a second hinge plate body (421) coupled and fixed to the fastening groove portion (111), a second hinge piece (422) extended to a front end side of an outer surface of the second hinge plate body (421) to be perpendicular with same vertical length and extension width as the first hinge piece (412), and a second upper bearing portion (423) and a second lower bearing portion (424) of which each lower end is supported on top ends of the first middle bearing portion (414) and the first lower bearing portion (415) and each upper end is supported on lower end of each of the first middle bearing portion (414) and the first upper bearing portion (413), and having plane cross section in a L-shaped form with a C-shaped hook at an end of a horizontal leg of the L-shape; and a door hinge shaft (403) axially coupling the first upper, middle, and lower bearing portions (413, 414, 415) and the second upper and lower bearing portions (423, 424) to be vertically matched.

11. The foldable lightweight roll container of claim 1, wherein the door support means (190) is configured to include:

a bottom plate (1911) and a binding groove (1912) which is vertically formed;

a side-linked groove portion (1922) which is coupled to an upper end of the binding groove (1912) in an upper surface of the side-linked groove portion (1922), and an upper bonding stone portion (1913) protruding into an upper form to the top, the lower end-bonded stone portion (1914) protruding into a square shape of the lower end and the bottom of the vertical portion to the lower end of the binding groove (1912) and the bottom of the bottom portion is protruded in a square shape; and a bottom plate portion (1921) on the upper surface of the bottom plate (1911) and both ends of the bottom plate portion (1921) and outer side of the bottom plate portion (1921), and outer side at a top of each of the two-end vertical piece (1922), and be symmetrical and configured with a binding piece 1723 coupled to the binding groove (1912), and configured with a buffer plate member (192).

12. The foldable lightweight roll container of claim 1, wherein the load frame (100) is configured to further include:

a support member (105) installed to prevent a phenomenon in which when the left and right door members (103, 103') are made to be lower than the left and right frame members (102, 102'), if the left and right frame members (102, 102') are rotated at 90 degrees on left and right ends of the rear-side frame member (101) and made to be perpendicular to each other to become left and right surfaces of the load frame (100), a front surface between the top ends of the left and right frame members (102, 102') and the top ends of the left and right door members (103, 103') is opened in proportion to a height difference, and as a result, articles are poured out through the top ends of the left and right door members (103, 103') with carelessness when the articles are loaded on the load frame (100) and moved higher than the top ends of the left and right door members (103, 103').

13. The foldable lightweight roll container of claim 12, wherein the support member (105) is configured to include:
   a support fixture (1051) made of aluminum and having a rectangular pipe form;
   a hinge portion (1052) attached to any one of the upper portions of the vertical portion of the border portion (110) which becomes the front end of each of the left and right frame members (102, 102') and axially installing the support fixture to be vertically rotated;
   a suspension pin portion (1053) attached to the upper portion of the other vertical portion to which the hinge portion (1052) is not attached to correspond to the hinge portion (1052);
   a bearing portion (1054) attached to one end of the support fixture (1051) and axially coupled to the hinge portion (1052);
   a ring portion (1055) attached to the other end of the support fixture (1051) and suspended on the suspension pin portion (1053); and
   a support fixture fastening portion (1056) having a flat cross section with an open rectangle-shaped form, and attached to a lower portion of the vertical portion to which the hinge portion (1052) is attached and rotated downward on the hinge portion (1052) as the axis and coupled with the other end portion when not using the support fixture (1051) to be fastened to fix the support fixture (1051) not to be arbitrarily separated.

14. The foldable lightweight roll container of claim 1, wherein the load frame (100) is configured to further include:
   an installation member (107) changing a structure to prevent the caster (600) from being exposed to the outside of four corners of the load frame (100) by installing the caster (600) to be positioned at the inside of four corners of the bottom surface of four corners of the load frame (100) and support the lower plate member (104) which is rotated downward horizontally;
   a fixation member (108) fixing the lower plate member (104) which is rotated downward from a vertical direction to a horizontal direction not to be arbitrarily loaded; and
   a safe member (109) installed in the rear frame member (101), and on the lower end portion of each of the left and right frame members (102, 102') and preventing a safety accident such as injury which occurs due to insertion of a foot or an ankle between each bottom surface and a ground surface.

15. The foldable lightweight roll container of claim 14, wherein the installation member (107) is configured to include:
   an installation plate portion (1071) of which left and right width is formed wider than the installation plate portion of the pre-application invention, an installation groove portion (1072) in which left and right end portions of the fixation plate portion (601) installed on the top surface of the caster (600) are bent and extended in two stages to be inserted into and fastened to the left and right portions of the left portion of the bottom surface of the installation plate portion, respectively to face each other, left and right fixation piece portions (1073) separated at an interval which is in proportion to the widths of the inner and outer surfaces of the lower border portion (120) and vertically extended to the left and right portions of the right portion of the top surface of the installation plate portion in parallel to each other;
   fastening grooves (1074) formed at front and right and left and right sides of the left portion of the installation plate portion (1071) corresponding to between the installation groove portions (1072); and
   a support surface portion (1075) formed so that a space between the left surface of the left fixation piece portion among the left and right fixation piece portions (1073) and the left end of the installation plate portion (1071) supports inner portions of four corners of the bottom surface of the lower plate member (104).

16. The foldable lightweight roll container of claim 14, wherein the fixation member (108) is configured to include:
   a movement piece (1181) coupled to the side coupling groove portion (122) having an open rectangle-shaped form with open edges bent on the upper side of the inner surface of each lower border portion (120) of the left and right frame members (102, 102') to be movable forward and backward;
   a fixation piece (1182) horizontally extended inward in a middle portion of the inner surface of the movement piece;
   first and second spiral holes (1183, 1184) vertically perforated at a front and rear portions on the same line of the fixation piece; and
   a support piece (1185) extended downward vertically on an inner end of the fixation piece (1182),
   a fixation piece portion (1281) which is formed so that a front and rear width correspond to an interval between the first and second spiral holes (1183, 1184), and having upper and lower ends coupled to the settlement groove portion (1421) formed at upper and lower portions of the outer surfaces of the left and right border materials among four front and rear and left and right border materials (142) in which the side cross section of the lower plate member (103);
   a fixation bolt attaching the fixation piece portion (1281) to the outer surfaces of the left and right border materials by tightening a spiral hole perorated in the fixation piece portion (1281) and a spiral hole perforated on the outer surface between upper and lower settlement groove portions to correspond thereto;
   a support piece (1283) horizontally extended to the outer side on the upper end of the outer surface of the fixation piece portion (1281) and formed to support the lower end of the support piece (1185) on the top surface; and
   a step piece (1284) extended upward vertically on the outer end of the support piece and formed to support the upper end surface on the bottom surface of the fixation piece where the first and second spiral holes (1183, 1184) perforated in front and rear portions on the same line while the upper end surface crosses the lower end of the support piece to the outside.

17. The foldable lightweight roll container of claim 14, wherein the safe member (109) is configured to include:
   the border portion (110) having a flat U-shaped form in which the rear frame member (101) and the lower ends of both vertical portions of the left and right frame members (102, 102') are extended to be close to the ground surface;
   a safe bar (1091) attached to horizontally cross the inner surfaces of both vertical portions by fixing both ends to the inner surfaces of the lower ends of the both vertical portions, respectively;

a buffer pad (1092) is made of an elastic material such as rubber or urethane and fastened to the safe bar in a form to surround the outer surface of the safe bar (1091), the safe bar (1091) includes a first fastening groove (1911) dented on the outer portion of the top surface, a screw tightening hole (1192) which is protruded in a C-shaped form in the middle of the inner portion of the bottom surface and tightening the screws to both end portions when fixing both ends of the safe bar to the inner surfaces of the lower ends of both vertical portions;

a second fastening groove (1193) on the bottom surface, and has the side cross section with a pipe form; and a buffer pad (1092) includes an upper fastening portion (1291) which has a vertical length corresponding to a vertical width of the outer surface of the safe bar (1091), and is bent and extended in two stages inward on the upper end and has an end portion fastened to the first fastening groove (1191) and a lower fastening portion (1292) bent and extended in two stages inward on the lower end and coupled to an outer end portion of the second fastening groove (1193).

18. The foldable lightweight roll container of claim 14, wherein the safe member (109) is configured to include:

a first safe panel (109*a*) which includes first and second fastening piece portions (1093, 1094) formed on inner ends of horizontal portions extended inward in an upper end and an upper portion of the inner surface to be fastened to first and second fastening grooves (125, 125') dented in a middle portion of each of the outer surface and the bottom surface of the lower border portion (120), a first fastening hole portion (1095) dented inward in the lower portion, and a second fastening hole portion (1096) formed on the top surface of the horizontal portion which is horizontally extended inward on the lower end; and a second safe panel (109*b*) which includes a third fastening piece portion (1097) inserted into and fastened to the first fastening hole portion (1095) of the first safe panel (109*a*) on the upper end and a fourth fastening piece portion (1098) bent upward on the inner end of the horizontal portion horizontally extended inward and having an end portion inserted into and fastened to the second fastening hole portion (1096) on the lower end.

* * * * *